(12) United States Patent
Earhart et al.

(10) Patent No.: US 7,774,681 B2
(45) Date of Patent: Aug. 10, 2010

(54) DATA PROTECTION SYSTEM

(75) Inventors: Tod R. Earhart, Mead, CO (US); Mark Ayres, Boulder, CO (US); Will Loechel, Wheat Ridge, CO (US); Adrian Hill, Lyons, CO (US); Kenton Pharris, Longmont, CO (US); Kevin Curtis, Longmont, CO (US); William L. Wilson, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 174 days.

(21) Appl. No.: 12/100,690

(22) Filed: Apr. 10, 2008

(65) Prior Publication Data

US 2008/0195890 A1 Aug. 14, 2008

Related U.S. Application Data

(62) Division of application No. 11/139,806, filed on May 31, 2005.

(60) Provisional application No. 60/576,381, filed on Jun. 3, 2004.

(51) Int. Cl.
*G11C 29/00* (2006.01)
*H03M 13/00* (2006.01)

(52) U.S. Cl. .......................... 714/763; 714/755

(58) Field of Classification Search ............... 714/763, 714/755
See application file for complete search history.

(56) References Cited

U.S. PATENT DOCUMENTS

| | | | | |
|---|---|---|---|---|
| 3,578,836 A | * | 5/1971 | Hannan | 359/25 |
| 4,024,513 A | * | 5/1977 | Huignard et al. | 365/235 |
| 4,195,318 A | * | 3/1980 | Price et al. | 360/39 |
| 4,506,232 A | * | 3/1985 | Thompson | 331/16 |
| 5,058,124 A | | 10/1991 | Cameron et al. | |
| 5,424,549 A | * | 6/1995 | Feldman | 250/492.22 |
| 5,450,218 A | * | 9/1995 | Heanue et al. | 359/21 |
| 5,510,912 A | * | 4/1996 | Blaum et al. | 359/21 |
| 5,727,226 A | * | 3/1998 | Blaum et al. | 359/35 |
| 5,808,998 A | * | 9/1998 | Curtis et al. | 369/103 |
| 5,812,288 A | * | 9/1998 | Curtis et al. | 359/21 |
| 5,838,469 A | * | 11/1998 | Campbell et al. | 359/21 |
| 5,850,299 A | * | 12/1998 | Lande et al. | 359/1 |
| 5,907,581 A | * | 5/1999 | Ashley et al. | 375/242 |
| 5,959,672 A | * | 9/1999 | Sasaki | 375/240.23 |
| 5,978,954 A | * | 11/1999 | Ou et al. | 714/769 |
| 6,020,985 A | * | 2/2000 | McLeod et al. | 359/22 |
| 6,047,008 A | | 4/2000 | Funakawa | |

(Continued)

OTHER PUBLICATIONS

Press et al., "Numerical Recipes in C", *The Art of Scientific Computing*, $2^{nd}$ ed., (1988) pp. 280-290.

(Continued)

*Primary Examiner*—Joseph D Torres
(74) *Attorney, Agent, or Firm*—Vedder Price P.C.; Ajay A. Jagtiani

(57) ABSTRACT

The present invention provides systems and methods for logically organizing data for storage and recovery on a data storage medium using a multi-level format. The present invention also provides systems and methods for protecting data stored on data storage medium so that the data may be recovered without errors.

11 Claims, 24 Drawing Sheets

U.S. PATENT DOCUMENTS

| | | | |
|---|---|---|---|
| 6,064,586 A * | 5/2000 | Snyder et al. | 365/125 |
| 6,072,825 A * | 6/2000 | Betts et al. | 375/222 |
| 6,081,912 A * | 6/2000 | Richardson | 714/722 |
| 6,178,020 B1 * | 1/2001 | Schultz et al. | 359/107 |
| 6,301,558 B1 * | 10/2001 | Isozaki | 704/228 |
| 6,414,763 B1 * | 7/2002 | Hesselink et al. | 359/21 |
| 6,438,233 B1 * | 8/2002 | Yoshimune et al. | 380/241 |
| 6,449,627 B1 | 9/2002 | Baer et al. | |
| 6,482,551 B1 | 11/2002 | Dhar et al. | |
| 6,512,733 B1 * | 1/2003 | Kawano et al. | 369/110.01 |
| 6,614,566 B1 | 9/2003 | Curtis et al. | |
| 6,650,447 B2 | 11/2003 | Curtis et al. | |
| 6,687,860 B1 * | 2/2004 | Iijima et al. | 714/718 |
| 6,695,213 B2 | 2/2004 | Curtis | |
| 6,697,180 B1 | 2/2004 | Wilson et al. | |
| 6,700,686 B2 | 3/2004 | King et al. | |
| 6,721,076 B2 | 4/2004 | King et al. | |
| 6,735,002 B2 | 5/2004 | Ayres | |
| 6,743,552 B2 | 6/2004 | Setthachayanon | |
| 6,765,061 B2 | 7/2004 | Dhar et al. | |
| 6,780,546 B2 | 8/2004 | Trentler et al. | |
| 6,788,443 B2 | 9/2004 | Ayres et al. | |
| 6,798,547 B2 | 9/2004 | Wilson et al. | |
| 6,898,756 B1 * | 5/2005 | Fekri et al. | 714/786 |
| 7,053,933 B2 * | 5/2006 | Suzuki | 348/211.6 |
| 7,092,133 B2 | 8/2006 | Anderson et al. | |
| 7,145,588 B2 * | 12/2006 | Hawver | 347/236 |
| 7,302,111 B2 * | 11/2007 | Olsson et al. | 382/266 |
| 2002/0034296 A1 * | 3/2002 | Yoshimune et al. | 380/239 |
| 2003/0206320 A1 | 11/2003 | Cole et al. | |
| 2004/0027625 A1 | 2/2004 | Trentler et al. | |
| 2004/0179251 A1 | 9/2004 | Anderson et al. | |
| 2004/0194151 A1 | 9/2004 | Earhart | |
| 2005/0036182 A1 | 2/2005 | Curtis et al. | |

OTHER PUBLICATIONS

PCT/US2007/06094 International Search Report and the Written Opinion of the International Searching Authority, or the Declaration, mailed Aug. 22, 2008.

PCT/US2006/19906 International Search Report and the Written Opinion of the International Searching Authority, or the Declaration, mailed Sep. 16, 2008.

* cited by examiner

FIG. 12

TABLE A

1-Dimensional Polytopic Book Write Ordering

| Column/Radius -> | 1.0 | 1.1 | 1.2 | 1.3 | 2.0 | 2.1 | 2.2 | 2.3 | 3.0 | 3.1 | 3.2 | 3.3 | 4.0 | 4.1 | 4.2 | 4.3 | 5.0 | 5.1 | 5.2 | 5.3 | 6.0 | 6.1 | 6.2 | 6.3 | 7.0 | 7.1 | 7.2 | 7.3 | 8.0 |
|---|---|---|---|---|---|---|---|---|---|---|---|---|---|---|---|---|---|---|---|---|---|---|---|---|---|---|---|---|---|
| Track / Row 1.1 | 1 | 3 | 6 | 10 | 2 | 5 | 9 | 14 | 4 | 8 | 13 | 17 | 7 | 12 | 16 | 21 | 11 | 15 | 20 | 25 | 14 | 19 | 24 | X | 18 | 23 | X | X | 22 |
| 2.0 | 1 | 3 | 6 | 10 | 2 | 5 | 9 | 14 | 4 | 8 | 13 | 17 | 7 | 12 | 16 | 21 | 11 | 15 | 20 | 25 | 14 | 19 | 24 | X | 18 | 23 | X | X | 22 |

TABLE B

2-Dimensional Polytopic Book Write Ordering

| Column/Radius -> | 1.0 | 1.1 | 1.2 | 1.3 | 2.0 | 2.1 | 2.2 | 2.3 | 3.0 | 3.1 | 3.2 | 3.3 | 4.0 | 4.1 | 4.2 | 4.3 | 5.0 | 5.1 | 5.2 | 5.3 | 6.0 | 6.1 | 6.2 | 6.3 | 7.0 | 7.1 | 7.2 | 7.3 | 8.0 |
|---|---|---|---|---|---|---|---|---|---|---|---|---|---|---|---|---|---|---|---|---|---|---|---|---|---|---|---|---|---|
| Track / Row 1.1 | 1 | X | X | X | 2 | 5 | 9 | 14 | 4 | 8 | 13 | 33 | 7 | 12 | 32 | 43 | 11 | 31 | 42 | 54 | 30 | 41 | 53 | X | 40 | 52 | X | X | 51 |
|  | X | X | X | 10 | 29 | 39 | 50 | 62 | 38 | 49 | 61 | X | 48 | 60 | X | X | 59 | X | X | X | X | X | X | X | X | X | X | X | X |
| 2.0 | 15 | 17 | 20 | 24 | 16 | 19 | 23 | 28 | 18 | 22 | 27 | 37 | 21 | 26 | 36 | 47 | 25 | 35 | 46 | 58 | 34 | 45 | 57 | X | 44 | 56 | X | X | 55 |

In the tables above, X = an unused book location caused by the end of a session. All book locations marked X are fully cured, but have no useful data.

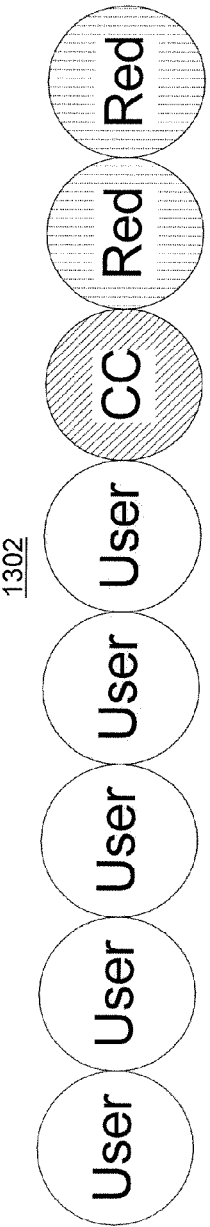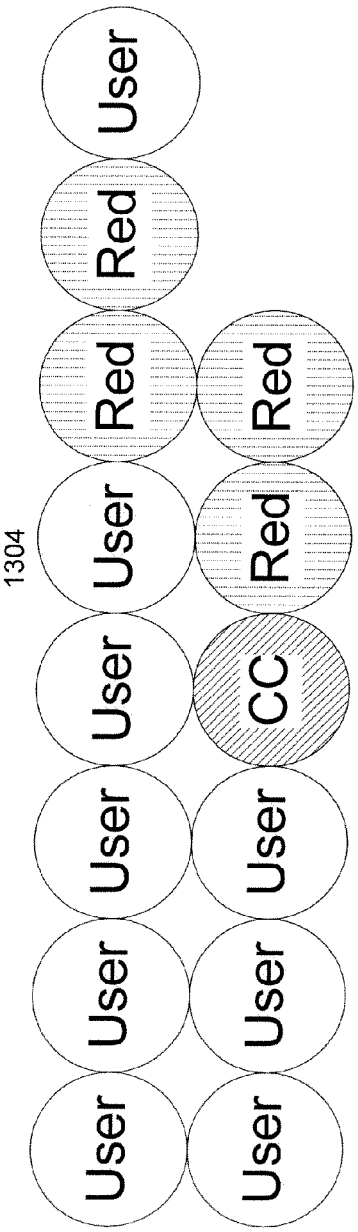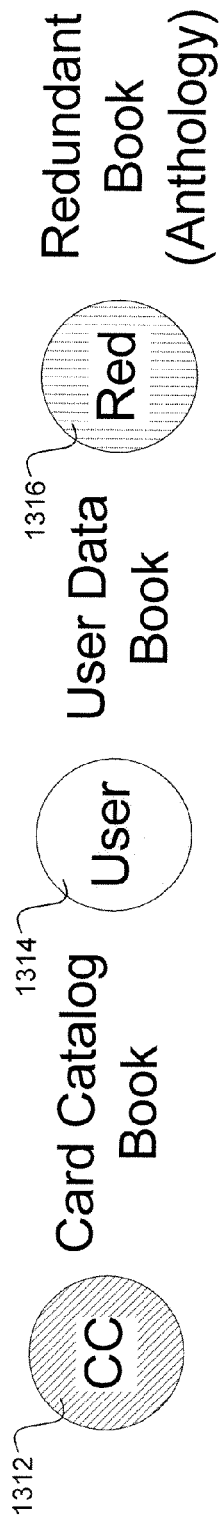
FIG. 13
Short Single Session User Data Example
Longer Single Session User Data Example

FIG. 15

Dark codewords have a detected error using CRC.

ROW AND COLUMN DESIGNATIONS ARE
WITHIN THE RESERVED BLOCK AREA

COLUMN

| ROW | | 0 | 1 | 2 | 3 | 4 | 5 | 6 | 7 |
|---|---|---|---|---|---|---|---|---|---|
| | 0 | R[0,30] | R[0,29] | R[0,28] | R[0,27] | !R[7,27] | !R[7,28] | !R[7,29] | !R[7,30] |
| | 1 | R[1,30] | R[1,29] | R[1,28] | R[1,27] | !R[6,27] | !R[6,28] | !R[6,29] | !R[6,30] |
| | 2 | R[2,30] | R[2,29] | R[2,28] | R[2,27] | !R[5,27] | !R[5,28] | !R[5,29] | !R[5,30] |
| | 3 | R[3,30] | R[3,29] | R[3,28] | R[3,27] | !R[4,27] | !R[4,28] | !R[4,29] | !R[4,30] |
| | 4 | R[4,30] | R[4,29] | R[4,28] | R[4,27] | !R[3,27] | !R[3,28] | !R[3,29] | !R[3,30] |
| | 5 | R[5,30] | R[5,29] | R[5,28] | R[5,27] | !R[2,27] | !R[2,28] | !R[2,29] | !R[2,30] |
| | 6 | R[6,30] | R[6,29] | R[6,28] | R[6,27] | !R[1,27] | !R[1,28] | !R[1,29] | !R[1,30] |
| | 7 | R[7,30] | R[7,29] | R[7,28] | R[7,27] | !R[0,27] | !R[0,28] | !R[0,29] | !R[0,30] |

EXAMPLE

The random generator produces the following 32 bit Binary Random Values (x=Don't Care):
R0=x1011x...x
R1=x0101x...x
R2=x0110x...x
R3=x1101x...x
R4=x0001x...x
R5=x0110x...x
R6=x1101x...x
R7=x1011x...x The pixel values are represented as:
1=White
0=Black

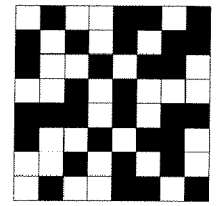

R[i,b] designates the bth bit in the ith Random 32 bit word within this Reserved block. The Bits are numbered from 31-0, where 31 is the msb and 0 is the lsb. A ! preceeding the value indicates the bit is logically inverted.

Format Generation 0x00 Initial Format

Format Generation 0x00 Initial Session

Format Generation 0x00 Subsequent Sessions

FIG. 24

Format Generation 0x40 Example

Legend:
- D - Data Book
- O - Unused Book
- C - Cured Book
- R - Reserved Book
- I - Disk Info Book

DATA PROTECTION SYSTEM

CROSS-REFERENCE TO RELATED APPLICATIONS

This application is a divisional of U.S. application Ser. No. 11/139,806, entitled "DATA PROTECTION SYSTEM," filed on May 31, 2005, which claims the benefit of U.S. Provisional Application No. 60/576,381, entitled "A MULTI-LEVEL FORMAT FOR INFORMATION STORAGE," filed Jun. 3, 2004. The entire disclosure and contents of the above patents and applications are hereby incorporated by reference.

BACKGROUND

1. Field of the Invention

The present invention relates to formats for information storage systems.

2. Related Art

All storage devices require a method for protecting and organizing data so that the correct data can reliably be retrieved as desired from a host system. The definition for doing this is referred to as the logical format.

Holographic storage presents many new challenges for the development of a logical format that haven't been dealt with before in other storage technologies. In holographic data storage, the basic unit of storage is a data image which is a 2 dimensional array of light and dark pixels with light pixels usually representing 1's and dark pixels usually representing 0's. This image is recorded into the media as 3D interference patterns that can be reconstructed during readout. An image can have thousands or millions of information symbols. This contrasts drastically with current conventional storage technologies that store and read back data a few symbols at a time either magnetically or optically. These devices may read data back in parallel on multiple tracks, but at most, only a few or 10 s of symbols at a time.

For holographic data storage, recordings are interference patterns between a data beam and reference beam which are captured in some kind of holographic medium. The act of reading requires an incident beam that is a recreation of the reference beam to illuminate the recorded area. This reconstructs an image of the original written image. Some types of media have an issue where exposure to light prior to data recording uses up some or all of the medium's dynamic range, rendering recording difficult to impossible. A key feature of this logical format is its ability to ensure that unexposed areas of the medium are not exposed prior to recording.

Since the configuration of holographic data is radically different than the way it is stored in current storage technologies, there exists a need for a logical format for holographic storage that is able to protect the data to ensure the reliability and that is able to organize the data so that the correct data can be addressed and read back.

SUMMARY

According to a first broad aspect of the present invention, there is provided a system for storing data comprising: a data storage medium; and data pages organized as chapters on the data storage medium.

According to a second broad aspect of the present invention, there is provided a method for storing data comprising the following steps: (a) mapping logical blocks of data into chapters; and (b) storing the data as data pages on a data storage medium, wherein step (a) is performed prior to step (b).

According to a third broad aspect of the present invention, there is provided a system for storing data comprising: a data storage medium; and a plurality of partitions on the data storage medium, wherein data in two or more of the partitions have different density levels and/or data types.

According to a fourth broad aspect of the present invention, there is provided a system for storing data comprising: a data storage medium: and a plurality of partitions on the data storage medium, wherein two or more of the partitions have data that have different protection levels.

According to a fifth broad aspect of the present invention, there is provided a system for storing data comprising: a data storage medium; and a plurality of partitions on the data storage medium, wherein two or more of the partitions have data that is written in different recording modes.

According to a sixth broad aspect of the present invention, there is provided a system for storing data comprising: a data storage medium; data stored on the data storage medium; and a library map data structure that describes data type, the format levels, and media type for reading data from and writing data to the data storage medium.

According to a seventh broad aspect of the present invention, there is provided a system comprising: a data storage medium; reading rules for reading data from a data from the data storage medium; writing rules for writing data to the data storage medium; organizing rules for organizing the data stored on the data storage medium; and locating rules for locating the data on the data storage medium, wherein the reading rules, writing, organizing rules and locating rules are format generation dependent.

According to a eighth broad aspect of the present invention, there is provided a system for storing data comprising: data stored as data pages on a data storage medium; and error correction means for recovering one or more of the data pages.

According to an ninth broad aspect of the present invention, there is provided a method for storing data comprising the following steps: (a) providing data stored as data pages on a data storage medium; and (b) recovering one or more of the data pages when one or more of the data pages is corrupted or missing.

According to a tenth broad aspect of the present invention, there is provided a method for storing data comprising the steps of: (a) providing data stored as data books on a data storage medium; and (b) recovering one or more of the data books when one or more of the data books is corrupted or missing.

According to a eleventh broad aspect of the present invention, there is provided a system for storing data comprising: a data storage medium; and a plurality of partitions on the data storage medium, wherein two or more of the partitions have data that have different types of error correction codes and/or different amounts of redundancy.

BRIEF DESCRIPTION OF THE DRAWINGS

The invention will be described in conjunction with the accompanying drawings, in which:

FIG. 12 shows respective tables for 1-dimensional polytopic book write ordering and for 2-dimensional polytopic book write ordering in accordance with embodiments of the present invention;

FIG. 13 shows a single-session user data layout for short session and a single-session user data layout for a long session in accordance with one embodiment of the present invention;

FIG. 15 is a diagram showing an example of chapter ECC in accordance with one embodiment of the present invention;

FIG. 18 is a diagram showing a page tile layout in accordance with one embodiment of the present invention;

FIG. 20 is a diagram showing a reserved block format in accordance with one embodiment of the present invention;

FIG. 24 is a diagram showing a replicated ROM in a card format filled with data in accordance with one embodiment of the present invention.

DETAILED DESCRIPTION

Figure 1:
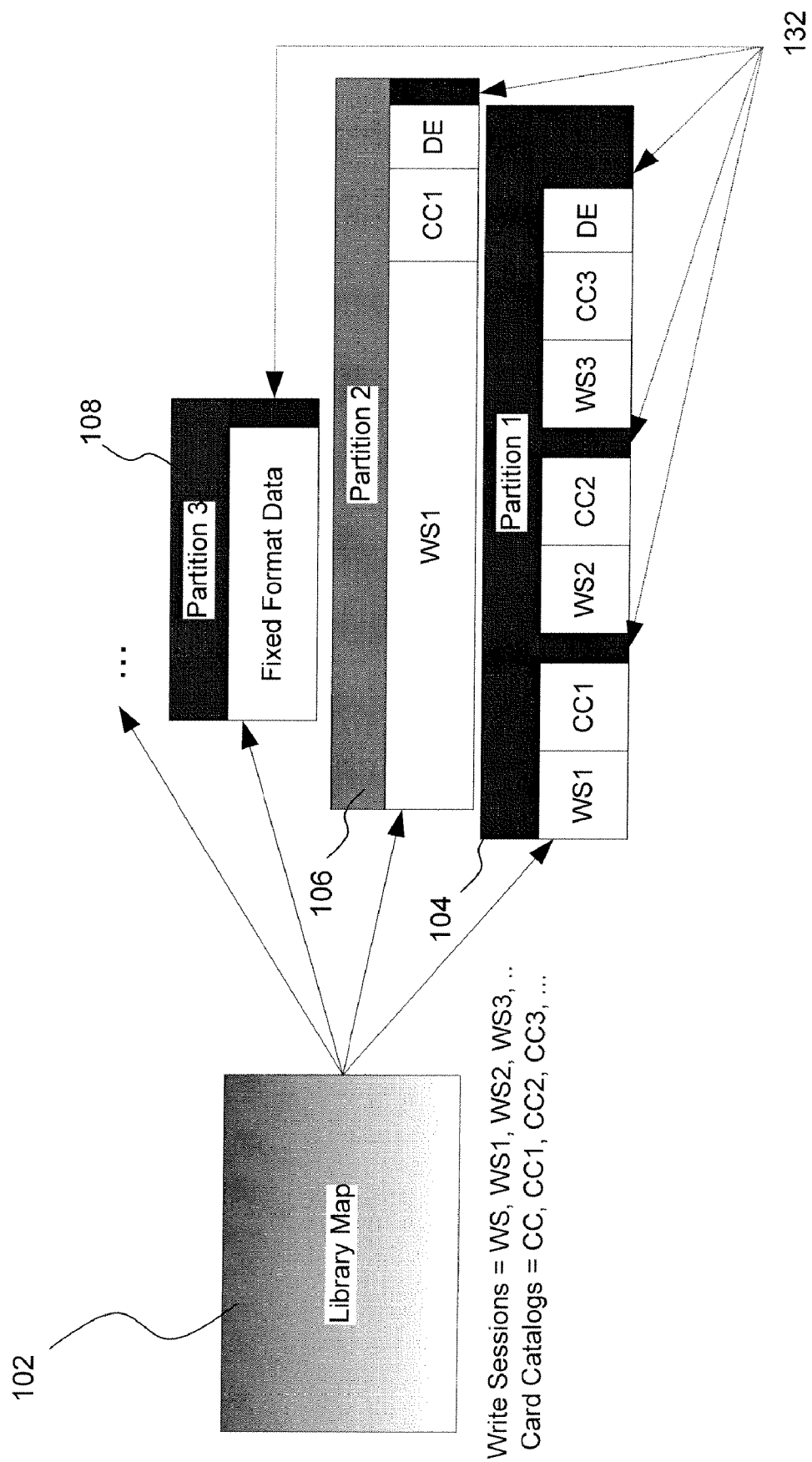
FIG. 1 is a schematic diagram illustrating a top level format hierarchy in accordance with one embodiment of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "anthology" refers to a sequential group of chapters that span multiple books and that are ECC protected. This level of ECC is provided to protect against media defects or damage that occurs after writing. An anthology is chapter based and can consist of a multiplicity of chapters, depending upon the format. For example, for Reed-Solomon coding may be used. The number of user data chapters versus redundant chapters is variable based on data protection, type of ECC, and overhead requirements. The presence of ECC protection allows for the recovery of one or more chapters/books in the case that a chapter/book is damaged after the chapter/book is written or is written in an area of the medium with a defect or is written imperfectly.

For the purposes of the present invention, the term "bad mapping" refers to the prevention of writing of data to a bad area of the data storage medium. Bad areas can be the result of manufacturing defects or dust, damage, or light exposure after production. Using any algorithm deemed capable of detecting medium defects, the medium may be scanned during manufacturing time, at format time, or both, to determine the defective areas. A special partition in the medium is then written to log the defective areas by physical address so that they may be skipped during medium writes. As the medium is written, the drive will record this information in a defined area or partition containing the defect map so that it will be known during reads that the bad areas do not contain data. Also, through the use of Anthology recovery or some other algorithm, written data may be detected as bad or deteriorating. This data may be relocated somewhere else on the medium and the relocation addresses recorded in the bad map partition so that the data recovery reliability may be improved. Due to the way data is organized and written to the media, bad mapping is done on a book basis. Bad mapping may occur both prior to or after data is written to a data storage medium. Therefore, bad mapping may be used for data that has gone bad after it is written if it is reconstructed, copied somewhere else, and that bad area is marked as bad.

For the purposes of the present invention, the term "book" or "data book" refers to a stack of pages recorded in the same, or nearly the same, physical location on a data storage medium. Each time the data is moved to a new location relative to the write head, a new book is written. Books are located using track and book addresses for disk media and x and y addresses for rectangular media. A book may contain 1 or more pages and/or sections and/or chapters. Chapters and sections may span between books.

For the purposes of the present invention, the term "bookcase" refers to the smallest amount of data that can be written in a single, non-appendable write session. The term bookcase is a physical construct as well as a logical construct. Due to the dynamics of holography, appends of new write sessions must currently be done in fresh media. Thus, in the case of overlapping bookshelves, some bookshelves are skipped in order to start a new write session. A full write session with non-overlapping bookshelves at both the start and finish is called a bookcase. A bookcase is analogous to a write session in other storage technologies. A bookcase is the smallest amount of data that can be written within a specific time period called a write session. A bookcase consists of 1 or more bookshelves that are adjacent to each other or overlapping. In a holographic storage device, the medium within the area of a bookcase is fully cured. A bookcase also contains a card catalog structure, which is a map of the usage of every book in the bookcase. The card catalog includes information about how full each book is, if the book contains data or not, what kind of data it contains, and the starting chapter and logical block numbers for books that contain data. This, combined with the chapter directory, provides the drive with a method for searching out specific chapters and logical blocks when they are requested through a read command. A bookcase is also the smallest unit of data that may be erased when using rewritable media. A bookcase may contain data that is overlapped along a bookshelf as well as between bookshelves. This recording method is referred to as 2 dimensional, polytopic recording.

For the purposes of the present invention, the term "bookshelf" refers to a group of book locations that are arranged in order on a digital storage medium. For card format media, books in a bookshelf are in a row. For disk format media, the books of a bookshelf can be arranged around a circle or a partial radius. A full or partial row or circle of books is called a bookshelf. The circle of books on a disk is also commonly referred to as a track. Depending on the format, books may or may not be overlapped in the horizontal direction in a bookshelf. Bookshelves are more of a physical construct than a logical construct for holographic storage device. The logic format of the present invention does not directly depend on the arrangement or geometry of a bookshelf. In a holographic storage medium, a bookshelf is a track or partial track, for a disk-shaped medium, or a row or partial row for a rectangular-shaped medium, of books recorded at full density and cured. Full density may include overlapping books at high density as described in U.S. Pat. Nos. 6,735,002 and 6,614,566, the entire contents and disclosures of which are hereby incorporated by reference. Cured means that all or substantially all of the medium in the bookshelf has been reacted, as prescribed by the media technology in use, and there is no appreciable dynamic range available to write additional holograms.

For the purposes of the present invention, the term "card catalog" refers to data for each partition that describes the location of the information within the partition. It provides a sparse mapping of the books, chapters, and logical block locations within a partition.

For the purposes of the present invention, the term "chapter" refers to a variable length of contiguous pages of user data followed by a variable length of redundant, ECC pages. A chapter may be any size and may cross book boundaries. A chapter provides protection for missing pages and also provides the mapping between host based logical blocks and user data within the chapter. The use of chapters also allows the recovery of pages that can't be found or have too many errors to be recovered. The amount of redundancy may be adjusted to provide a variable amount of protection for lost pages within the chapter depending upon data type. For example, 1 page may be regenerated for every page of redundancy provided. Additional redundancy can also be provided for critical data such as library map and card catalog information. The logical block to chapter mapping is provided through a structure found at the end of a chapter called the "Chapter Directory" or CD. The chapter directory provides a mapping of the logical blocks and their sizes within and across chapter boundaries. The chapter directory also provides copyright and security information that prevents unauthorized access to the data in the chapter. A chapter may include ECC protection. Chapters have no specific relation to books and a chapter may be larger or smaller than a book. Also, chapters may cross book boundaries.

For the purposes of the present invention, the term "format generation dependent rule" refers to a rule that may be altered based on the format generation of a data storage system.

For the purposes of the present invention, the term "computer system" refers to any type of computer system that implements software including an individual computer such as a personal computer, mainframe computer, mini-computer, etc. In addition computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, et.

For the purposes of the present invention, the term "data page" or "page" refers to a unit of holographic data that is written to a holographic storage medium. For example, a data page may be a 1280×768 array of pixels that are either on or off or partially on or off (gray levels). A page may have a well-defined structure that may be changed to support different array sizes, encoding, and recovery techniques. The components of the page format include a layout, header, data areas and tiling, data modulation and ECC coding and interleaving, randomization, etc. The layout defines where the different components in the page reside including the header and data areas. For example, a data page may have areas that are split up into 32×32 pixel tiles with fixed patterns in the center 8×8 section of the tile. The data for a data page may be encoded with an Error Correction Code (ECC) into multiple long codewords called paragraphs. These paragraphs are interleaved in the data areas so that a single paragraph is spread across the entire page. In addition, the data may be randomized and, potentially, modulated prior to ECC and/or placement on the page. The page header provides the physical address of the page as well as the position of the page within a chapter. Suitable page interleaving schemes include bit interleaved codewords or any other method of spatially mixing the bits from different codewords across the page so that bits in each codeword are found in normally good and bad parts of a data page. The size of a page may be governed by the spatial light modulator and detector used in a holographic storage device. The page content may vary based on the format type or revision.

For the purposes of the present invention, the term "data storage medium" or "data storage device" refers to any medium or media on which a data may be stored for use by a computer system. Examples of data storage media include floppy disks, Zip™ disks, CD-ROM, CD-R, CD-RW, DVD, DVD-R, flash memory, hard disks, optical disks, etc. Two or more data storage media acting similarly to a single data storage medium may be referred to as a "data storage medium" for the purposes of the present invention.

For the purposes of the present invention, the term "data storage device" refers to a data storage medium and any firmware, hardware, software components, and optical components associated with a data storage medium. For most purposes, the terms "data storage medium" and "data storage device" may be used interchangeably with respect to the present invention.

For the purposes of the present invention, the term "removable data storage device" refers to any data storage device that may be removed from a computer system or to a data storage device that includes a data storage medium that can be removed from the data storage device. Examples of removable data storage devices include data storage devices such as: WORM drives, tape drives, ZIP™ drives, DVD drive, CD-ROM drives, flash memory cards, etc.

For the purposes of the present invention, the term "drive" refers to a device for reading from, writing to, or erasing a data storage medium. A data storage medium may be part of a drive, such as a hard disk drive or may be inserted in a drive, such as a drive for reading optical disks such as CDs, DVDs, a holographic storage disk, etc.

For the purposes of the present invention, the term "format generation" refers to a rule set that fully describes the system, media type, format levels, and media management scheme used when reading from, writing to, or erasing a data storage medium. A "rule" or "set of rules" define procedures or algorithms for performing various functions. Any rule set may change for different format generations. The concept of format generations provides the extensibility and compatibility checking across families of products and markets as mentioned in the claims. The format generation can be thought of as a reference key defining how a specific drive type can read and write a specific media type. A format generation defines the media management method used for writing including the usage of partitions, bookcases, anthologies, books, sections, chapters, and pages. It also defines the revisions of the library map, partition descriptor (PD), card catalog (CC), chapter directory (CD), and page format (PF). In addition, the format generation defines the system and media formulation and geometry and what versions of them are compatible with the specified format generation. Thus, each time a feature is added at any level or new systems or media types and formulations are introduced, one or more new format generations are defined to describe them. For example, a different type of ECC may be used at the anthology level in different format generations. The use of format generations provides a the mechanism that allows the logical format to easily evolve and take advantage of new technologies, developments, algorithms, and market requirements while still maintaining a linkage and compatibility mapping across widely varying holographic storage product families and markets. The format generation data structure may also provide a definition of the types of data content that are allowed in each of the data pages.

For the purposes of the present invention, the term "holographic storage medium" refers to a data storage medium in which holographic data are stored or in which holographic data are capable of being stored. For examples of holographic storage media and methods for writing to, reading, and erasing holographic storage media suitable for the purposes of the present invention are described in U.S. Pat. Nos. 6,482,551; 6,650,447; 6,695,213; 6,697,180; 6,700,686; 6,721,076; 6,735,002; 6,743,552; 6,765,061; 6,780,546; 6,788,443; and 6,798,547; and in U.S. Published Application Nos. 2003-0206320 and 2004-0027625, the entire disclosures and contents of which are hereby incorporated by reference.

For the purposes of the present invention, the term "holographic storage device" refers to a holographic storage medium and any firmware, hardware, software components, and optical components associated with a holographic data storage medium. For most purposes, the terms "holographic storage medium" and "holographic storage device" may be used interchangeably with respect to the present invention.

For the purposes of the present invention, the term "library map" refers to a data structure that describes the location and types of partitions on a data storage medium and the types of data that the partitions contain. In the logical format of the present invention, the library map is the starting point for reading and writing the media and is the first structure that must be read by the drive to ensure that no unwritten areas of the medium are read. The library map may be located at a specific address on the medium (requiring no auxiliary memory) or, it can be located in an auxiliary memory, (such as flash or RFID), that is included in the cartridge assembly. The first part of the library map may reside in an RFID memory that points to a full version of the library map on the medium. Although current RFID options range in size from 128 bytes to 4 Kbytes, these sizes should not be considered to be limiting for the purposes of the present invention. In many cases, there are at least 2 current copies of the library map written to medium as well as previous copies to allow robust recovery of the library map. There also may be multiple versions of the library map as new features, media types and formats are supported. The library map includes information about the format generation, media type, geometry, the system type it was written with, and the medium status: empty, formatted, appendable, write protected, full. In addition, each partition descriptor is appended to the library map to provide a full mapping of the media. Optionally, card catalogs may also be included with the library map. Both the library map and the partition descriptors may have copy protection and security keys to control and limit access to an entire data storage medium or by partition. In one embodiment of the present invention, different partitions of a data storage medium may have different security levels.

For the purposes of the present invention, the term "logical block" refers to the standard data unit transferred between a host and most storage devices. Logical blocks are grouped together within the user portion of chapters and written as a group. The format supports multiple logical block sizes as well as variable logical blocks. It can even support different logical block sizes on the same medium. Logical blocks may cross chapter boundaries and may be smaller or larger than pages or chapters. The chapter directory structure within the chapters keeps track of the location and size of the logical blocks. As for nearly all other storage devices types, logical blocks are addressed sequentially from 0 to N within a user data partition or logical grouping of user data partitions. If the medium is split into multiple partitions representing multiple logical volumes, the logical block addressing may be restarted for each logical volume.

For the purposes of the present invention, the term "mapping" refers to the definition of the start location, end location, and size or length of any logical construct that can be embedded within another construct at a different level of the format.

For the purposes of the present invention, the term "partition" refers to a contiguous, self-contained subdivision in a data storage medium in which is described by its recording mode and data content, all of which is written in the same format and at the same density. In one embodiment of the present invention, a partition is also the smallest unit of data that can support the emulation of different storage device types. In one embodiment of the present invention, a holographic storage medium may contain many different partitions. A holographic storage medium may have 1 or more partitions and multiple partitions may be spliced togetliei to make larger logical partitions. Partitions may contain user data or data that is used internally to a holographic storage device. Examples of partition types are: library map, user data, media data, manufacturing data, bad media mapping, and calibration data. A partition may contain 1 or more bookcases or write sessions. It also allows a data storage medium to act and look like multiple volumes of media. Partitions also allow different data types to be written with different densities and redundancy so that more important data, such as a library map, may be written in a more robust manner than other types of data. Each partition is defined by a partition descriptor structure that is located within the library map. The partition descriptor provides information on the start and end book addresses of the partition, the data type and writing mode used, whether the partition is empty, appendable, or full, what chapters and logical block addresses have been written to it, and how to find the card catalog structures describing the data within the partition. Partitions may also be defined to support emulation of other storage device types. Emulation partitions allow the host to treat the drive as a different storage device type in order to allow it to be compatible with more host software applications. In some cases, there is an emulation table located at the end of the partition to support this emulation. In addition, partitions may be linked together to create longer, virtual partitions containing the same types of information. When linked, the partition types must be compatible and the chapter and logical block numbering continue from the end of one partition to the start of the next. Although not all partition types will require card catalogs, some partitions do require card catalogs to allow chapters and logical blocks to be located within the partition.

For the purposes of the present invention, the term "read after write" refers to using an algorithm to detect the presence or quality of written data. If, during the read after write process, the drive determines that a recently written page is, or may be, bad, the logical format of the present invention allows that data to be rewritten at one or more new physical addresses until it is satisfied that a good page has been written. During reading, the drive can manage discovery of a rewritten page by noting its chapter number and position and only return 1 good version of that page of data.

For the purposes of the present invention, the term "reading data" refers to retrieving data stored, as holographic or non-holographic representations, from an article of the present invention.

For the purposes of the present invention, the term "revision" refers to a number identifying the format and contents of the associated structure. In one embodiment of the present invention, the revision may be placed in a fixed location near the start of the construct so that the drive may determine if it can read the structure and, if it can, how it should read the structure. This is the method for forward and backward compatibility of each format level.

For the purposes of the present invention, the term "section" refers to a group of pages within a book that are recorded with the same multiplexing technology. Multiplexing is the holographic term for writing multiple holograms or pages through the volume of the media at the same location. There are multiple holographic multiplexing techniques including angle, wavelength, correlation, peristrophic, shift, etc. It is possible to mix multiple multiplexing techniques within a book. Chapters may cross section boundaries.

For the purposes of the present invention, the term "security level" refers to providing different users with access to different data on the same data storage medium through the use of a security key or other means. Some users may be able to access an entire data storage medium while other users may only be able to access one or more partitions of a data storage medium.

For the purposes of the present invention, the terms "writing data" or "recording data" refer to the well known concept of storing data on a data recording medium. With respect to holographic storage media, writing data may refer to storing holographic representations of one or more pages as patterns of varying refractive index in on the holographic storage medium.

For the purposes of the present invention, the term "erasing data" refers to making the index of refraction of the medium uniform so that the area of media that has been erased may be recorded again.

For the purposes of the present invention, the term "polytopic" refers to a method of recording books of holograms that are spatially overlapped. The spacing between books is at least the beam waist, which is the narrowest part of the signal beam. An aperture is placed in the system at the beam waist. During readout, all of the overlapped holograms at a given multiplexing angle are read out, but only the hologram that is centered in the aperture is passed through to the readout optics. Examples of polytopic recording techniques that may be used in various embodiments of the present invention are described in U.S. Published Patent Application. No. 2004-0179251, entitled "Polytopic multiplex holography," and U.S. Published Patent Application No. 2005-0036182, entitled "Methods for implementing page based holographic ROM recording and reading," the entire contents and disclosure of which are hereby incorporated by reference.

For the purposes of the present invention, the term "high density" when referring to the recording of a book means that a book contains the maximum number of pages for the given format generation, system, and media formulation. These holograms may be written with the lowest strength possible to make them recoverable allowing more pages to be written in the same book location.

For the purposes of the present invention, the term "low density" when referring to the recording of a book means that fewer than the maximum number of pages are written in that book for the given format generation, system, and media formulation. These holograms may be written for a longer exposure time to increase their readout strength. These holograms also may be spaced farther apart in the hook based on the multiplexing technique used. For example, using angular multiplexing, the angular spacing may be increased to minimize crosstalk between the pages. The end result of these techniques is to improve the system's ability to recover pages written at low density.

For the purposes of the present invention, the term "recording mode" refers to the method used for writing pages in a book and for locating books on the medium. The parameters controlled by the recording mode include the number of pages per book, the written strength of each page in the book, and their angular spacing within the book. Recording mode also defines the multiplexing method used such as angle, spatial, correlation, shift, or other means to separate hologram pages. Additionally, the recording mode defines the spacing between books and their organization within a specific area of the medium. In one embodiment of the present invention, the recording mode applies throughout a partition.

For the purposes of the present invention, the term "forward error correction" or "FEC" refers to any error correction code that is used to encode the original data with some amount of redundancy such that if the data has errors when read back, the original data can be reconstructed. The FEC has a specified correction power such that it can correct errors in the original data as long as the number of errors in the recovered data is below the FEC's required correction threshold or the recovered data's SNR is above the FEC's required threshold. Examples of FECs include Reed-Solomon, BCH, Hamming, Turbo Convolutional, Turbo Product, and Low Density Parity Check. The term FEC is not limited to these codes and includes any combination of FEC codes and any other codes, including codes not listed above.

For the purposes of the present invention, the term "skip sorting" refers to a specific order of writing layers of books such that each book is recorded over an area that is uniformly exposed. This applies to any recording mode employing overlapped or polytopic book recording. As an example, the first layer of books must be written in non-overlapped locations, the second layer of books can only be written where the full books have only 1 layer of books under them, and so on until the top layer of books is recorded. This requires some algorithm for writing books which skips back and forth in both the radial and theta (or x and y) directions to achieve polytopic layering, but never recording over media that has an exposure discontinuity in it. Further examples of this are provided in the patent description.

Description

Although the logical format of the present invention may be used with various types of storage devices, the logical format of the present invention has many particular advantages when used with holographic storage devices.

Holographic storage is an optical technology that differs greatly from other optical technologies, as well as magnetic technologies, in that with holographic storage data is written and read in parallel i.e. many bits at a time. The amount of holographic data written at a time can vary depending on format and product type. Conventional high capacity storage devices write and read data serially. Some variations write and read data in parallel, but that is somewhat artificial because it is done by duplication of serial read/write heads and channels.

The basic unit of storage in a holographic drive is a data page. Data is written to the media using a SLM (Spatial Light Modulator). A SLM is similar to a miniature television screen or computer monitor and is a multi-pixel display that illuminates a full image into the media. This "image" of data is the storage object with each pixel of the SLM corresponding to approximately a single bit of information. A laser illuminates the SLM, encoding the data onto a light beam and, when mixed with a reference beam, the complex interference pattern forming the holograph is recorded into the media. For readout, the reference beam illuminates at the same location that the hologram was recorded at and an image of the data page, virtually identical to the original image written with the SLM, is reconstructed. The reconstruction is captured on a miniature detector or camera as the orginial written image. Since pages are multi-pixel, each time a page is read or written, a large number of data bits (for example >50,000) are stored or recovered.

Many holograms can be stored in the same volume of media. Different data pages may be selected within the volume by slightly changing some physical parameter. The simplest strategies involve using the Bragg effect to define addresses for the recorded holograms. Due to the finite thickness of the media, a well-defined constructive interference condition exists for the holograms stored. Hologram addresses can be defined by modifying the reference beam angle, or wavelength, or position of the media relative to the beams, between writing exposures. In addition, the data can be moved to an entirely new spatial location. These addressing strategies are called multiplexing approaches and allow different holograms written in the same, or nearly the same, volume to be independently recovered. The end result is a stack of individual pages all written in the same volume of the media. Multiplexing methods can also be combined to record even more holograms in the same space (up to the limit of the medium).

Holograms may be formed by chemical reactions in photopolymer media triggered by light causing the media to polymerize leading to a spatial variation of the index of refraction. An important aspect to writing holograms in photosensitive media is the curing process. A stable stack of good quality holograms that don't change over time requires that all of the photosensitive elements in the media have been reacted and polymerized. A location of the medium that has no remaining unreacted components, called writing monomer, is deemed "cured". In theory, if the full dynamic range of the medium is used by all of the holograms in a location, there should be no remaining unreacted monomer so, in theory, the book should be cured just by filling it up. The act of curing is simply exposing the book to the correct wavelength of light for enough time to use up the remaining monomer or dynamic range. Erasing may be done by exposing the medium to a certain wavelength that is ideally different than one used to record. However, erasing can also be done using the same wavelength as used to record. Any medium that can record index changes in a volume can be used. Other media examples include photorefractive and photochromic media. This invention is not limited to photopolymer media.

In one embodiment, the logical format of the present invention allows a holographic storage device to operate in a manner similar to a standard storage device from the perspective of a host, while addressing the unique requirements of holographic data storage.

The present invention also provides a logical format system for holographic storage that is compatible with standard physical interfaces, data organization, and command sets used for storage devices. The present invention also provides logical format for holographic storage that allows straightforward integration of holographic drives into the vast existing infrastructure of software applications, systems, interfaces, and libraries already developed for storage devices.

The logical format system of the present invention is capable of supporting different holographic media types (ROM, Write-Once, and Re-writable) and is extensible so that the logical format system is able to supports future technologies that improve data density, coding efficiency, performance and specialized features such as compression, watermarking, encryption, security, and copy protection.

Prior to the present invention, no comprehensive logical format for a holographic data storage device has been developed. In some embodiments of the present invention, components, methods and algorithms have been adopted from other storage and non-storage technologies. These methods and algorithms have been combined with new methods and algorithms in a new way to produce a new comprehensive logical format system that provides both data protection and organization for holographic data storage.

The logical format system of the present invention may be used with a variety of: media specifications, formulation, packaging, or geometry; drive read, write, alignment and recovery processes; optical system designs including components, beam paths and size, power, and wavefront specifications; physical writing areas and servo and optical tolerances for write, readback, and interchange; and physical usage of the media including guard bands, servo patterns, and media motion techniques.

In one embodiment, the present invention provides a method for logically organizing data for storage and recovery on a holographic medium using a multi-level logical format. Logical blocks are used as the unit of data exchange between the host and the system making the holographic storage device compatible with industry standard applications and storage systems since this is the method used by the vast majority of existing storage devices and systems currently deployed. This method also provides a logical format that is compatible with a wide range of file systems for different storage device types and applications. Furthermore, the logical format allows the drive to detect the drive type of the initial writing and to automatically take on that characteristic for further writes and reads. The logical format uses multiple levels to hide the lower level format and special algorithms required to store data on holographic media. This allows the drive to easily integrate with current storage application software and drivers and also allows it to emulate other storage device types so that it can integrate into many applications with little or no change. The logical format provides compatibility with standard storage physical interfaces and command sets, including support of block level transfers as is done for common storage devices. Unlike other storage technologies, the logical format of the present invention decouples both the size and location the block structure used by the interface from the data structures written to the medium. This decoupling makes it easier for a holographic drive to adapt to many different host and file system requirements and to emulate many types of existing storage devices.

In one embodiment the present invention provides a logical format that allows for the flexibility to change the drive interface, command set, and host data transfer characteristics without impacting lower levels of the format. The ability to mix multiple writing modes and densities on the same medium allow the logical format to provide different levels of data protection based on the data type. This is referred to as the partition level of the logical format. Partitions provide methods for storing special data as well that may or may not be accessible to the user. Examples of such special data include calibration information, firmware updates, media manufacturing information, test areas that the drive can use for write testing and calibration, etc. A test area is used to test the drive's ability to write media before allowing the user data to be written. The drive may write some test data and then adjust both write and read parameters based on the test data written.]

There may be multiple user data partitions on the same data storage medium that are not linked. Such partitions are treated by the host as different virtual volumes. Extensions to the command set beyond what is typically supported for MO and DVD type drives may be provided to allow the host to browse and select among partitions. The definition of a partition is split into 2 major components. The first component is the recording mode and the second is the content type. Different recording modes and content types may be mixed as needed for any given format generation.

The logical format of the present invention allows for multiple virtual volumes on a single medium. This functionality is provided at the partition level of the logical format. The logical format of the present invention also supports data compression and encryption.

The chapter level structure provides for variable size and allows multiple logical blocks to be stored in the structure. Conversely, for smaller chapters and larger logical blocks, a logical block may span 1 or more chapters. A construct called the "chapter directory" provides the mapping of logical blocks to chapters and includes support for multiple sizes of fixed size logical blocks as well as variable sized logical blocks. This is an important vehicle for decoupling the logical block interface from the physical data format recorded on the data storage medium.

In one embodiment, the present invention provides a method for mapping chapters into and across books and recovering the chapter sizes and locations via the combination of a card catalog structure and page headers. Chapters are numbered sequentially as they are written on the medium. The card catalog structure provides either a sparse or detailed mapping between physical addresses (i.e. page locations) and chapter locations and logical block addresses, thereby providing the drive with a good estimate of where a chapter with the intended logical block(s) may reside. When read, the page header provides detailed information of the chapter size and location, and page characteristics (modulation and decoding information).

In one embodiment, the present invention provides a method for acquiring detailed location information for chapters and logical block locations on newly inserted medium that has been written in the past. Due to the large potential capacities on the medium, it may not always be feasible to keep a detailed mapping of all chapters and logical blocks. The logical format of the present invention provides a method for the drive to learn about the location and mapping of chapters and logical blocks as it is read, incrementally improving random seek accuracy and access time.

In one embodiment, the present invention provides a method for validating chapter and page location on the medium via a page header structure. The page header provides chapter number, size, location, and verification of physical address. This information is used for chapter seeking, recovery, and calibration of page and book locations on the medium.

In one embodiment, the present invention provides methods for protecting data stored on holographic medium so that the data may be recovered without errors. The present invention provides a method foi detecting, recovering, and correcting errors on recovered data pages. This method may include modulation coding, write and read equalization, page level error correction code (ECC), feedback and predictive alignment and exposure compensation, and other data recovery techniques. The page level ECC may be multi-level and be defined as any type of ECC from standard Reed-Solomon techniques to more elaborate parity check, trellis, and convolutional codes to more powerful or efficient codes yet to be invented.

In one embodiment, the present invention provides a method for recovering or reconstructing missing or badly corrupted data pages. In this method the chapter level of the format uses redundant pages and any suitable type of ECC. As chapters are collections of sequential pages, their length may be adjusted based on the level of protection needed for a given format/medium/data type.

In one embodiment, the present invention provides a method for recovering or reconstructing data written in defective areas of the medium or books of data pages that have been damaged via a scratch, dust, etc. This method employs an anthology level of the format used during writing, to protect data books via wide ranging ECC. The redundant data is written per the format generation definition but only read if needed for reconstruction. The anthology is also defined to have variable overhead to trade off protection versus efficiency.

The present invention has the flexibility to allow changes in ECC type and overhead at different levels of the format as needed for different media types, writing densities, and application based data reliability requirements. The present invention also is able to support formatting and bad area mapping on the medium to avoid writing in defective areas in order to improve the data protection. In addition the present invention provides support for potential read after write algorithms to validate writings and to improve the quality of the written data.

In one embodiment, the present invention provides systems for writing data to and reading data from a holographic storage medium that accommodate the special needs of holographic storage. A method may be employed for determining the state of the medium when the medium is loaded into a drive. The state includes whether it has been written or not and, if it has been written, where it has been written and how much data it contains. This method prevents the drive from exposing unwritten areas of the media such as described in U.S. Published Patent Application No. 2004-0194151, entitled, "Supplemental memory having media directory", the entire contents and disclosure of which is hereby incorporated by reference.

In one embodiment, the present invention provides a method for ensuring that no unexposed areas of the medium are read. In another embodiment, the present invention provides a method for finding the library map that is independent of medium and drive type so that the drive can determine if the drive is compatible with the type of medium inserted into the drive before attempting to access the medium. In another embodiment, the present invention also provides a method for protecting and reliably recovering the library map structure. In another embodiment, the present invention provides a method for closing sessions on the medium in a reliable way so that it is left in a stable state for reading from the medium and provides a clean transition to unused areas for further append operations. In another embodiment the present invention provides a method for reliably finishing media that is fully written or ready to be archived for long-term stability and storage of the written data. In another embodiment, the present invention provides a method for reliably erasing data without affecting other data stored elsewhere on the medium.

The multi-level logical format of the present invention provides advantages for holographic data storage, by allowing for future advances to be integrated easily. For example, the multi-level structure of the logical format allows many changes to be localized to 1 or 2 levels of the format definition. The format definition may provide a well-defined versioning system at every level so that drive systems using the logical format can recognize changes and compatibility issues with written and unwritten media caused by technology and format improvements. Such a versioning system provides backward compatibility and allows significant changes at any level to be made without major impacts to the overall system design.

In one embodiment, the present invention provides a method for supporting multiple physical formats and densities. Such a method may be used to determine drive/media compatibility across multiple generations and types of media and drives. Such determinations allow for backward read and write compatibility as well as detecting incompatibility of media with a particular drive. Such a method also supports physical advancements in media, optics, servo, and encoding, for example, to improve density and performance without impacting the logical format structure.

In one embodiment, the present invention provides a method that allows for multiple addressing and servo schemes to be used so that the logical format can support future density improvements without a change in the structure of the logical format.

The logical format of the present invention also has the ability to support extensions for content protection, copy protection, digital rights management, and data security as needed by market, application, and customer.

In one embodiment, the present invention provides a logical format employing format generations that each contain the full definition of the contents, revision, and usage of a specific format version. A format generation system using such format generations provides a mechanism that may be used to provide a consistent access method for various system/media combinations. Such a format generation system allows older drives to recognize newer media and provides a method for determining media/drive compatibility for both forward and backward generations of media and drives. A format generation of the present invention may be given a specific index number referencing a full, documented format usage definition. The definition includes revisions for all of the data constructs at each format level (library map, partition structure, card catalog, chapter directory, page format) and their specific field usage as it applies to the specific format generation. It also defines the rules for media management including write ordering, partition and session management, appending rules, and physical addressing. Other components of the format generation include definition of the load/unload process, usage of the anthology and other optional constructs, definitions of the types of partitions and data content allowed, and the usage of extended algorithms and constructs such as bad mapping, write session management and recovery, read after write, caching, compression, and other future feature additions. The algorithm for finding the format generation associated with written media may be a well-defined sequence of accessing the first few bytes of a library map which contains the format generation identification. This method may be common among many drive and media types so that a wide variety of drive and media types may gracefully determine their compatibility. Once the format generation ID is accessed, there may be significant deviations in media and format usage as defined in the specific format generation. If the drive doesn't support a specific format generation, the drive may determine that fact internally and gracefully fail to read the medium.

The logical format of the present invention may be used with various media types, physical formats, products, and applications. The logical format of the present invention is flexible and extensible.

The logical format of the present invention encompasses the organization and protection of data stored on various types of data storage media and all of the mechanisms for organizing and recovering the data. One feature of the logical format is the ability to provide a standard method of transforming the information to be stored from a format commonly used by host systems or other data sources to the format required to write the data to the media. The logical format also defines where on the media the data is written. The logical format of the present invention may be used with various command sets and file systems.

The fact that the logical format of the present invention allows the physical format of data storage and the drive interface used to store data to be treated independently provides many advantages. For example, the logical format of the present invention reduces requirements on a host to know about the physical make-Lip of a holographic storage device. Using the logical format, a host may treat a holographic storage device as a streaming or block data device. Because a holographic storage device employing the logical format may be treated as a streaming or block data device, it is much easier to provide support for the holographic storage device using existing host software and drivers with minimal changes. The logical format also allows for variable physical features in the recording format e.g. if a section's capacity is reduced due to read after write requests by the host or write lags, thereby causing write schedule adjustments, the logical makeup of the data at the drive interface does not have to be altered to fit the changes. In addition, the logical format simplifies defect management, because bad data areas may be mapped out without host knowledge. Also, the logical format allows four mismatches in host and physical block sizes e.g. the host may be designed to work optimally with 10 k file sizes while a holographic storage device is optimized to write 5-10 MB at a time or more. The logical format also allows for easy density migration. The logical format may hide changes in number of images per section, number of sections per book, number of pixels per pages, number of symbols per pixel, media size and geometry, etc. from the host interface.

In one embodiment, the logical format defines the following: how a stream of data from the host is received by a data storage medium, how the host data are formatted prior to writing to a data storage medium, where the data is written on a data storage medium, partitioning and usage for a data storage medium, and how the written data may be found on a data storage medium and transformed back into the format required by the host as requested.

The logical format of the present invention may be used with various page reading and writing processes, including location and alignment tolerances for pages and books. The logical format of the present invention may be used with various media sizes, media geometry, optical systems, media construction, media performance specifications and tolerances. The logical format of the present invention may be used with media having various usage areas, guard bands and servo patterns. The logical format of the present invention may be used with various optical system specifications, including spot size, diffraction efficiency, hologram uniformity and quality, reference and object beam specifications, and other related specifications.

The logical format of the present invention is flexible and extensible and may be used with different physical formats. The logical format allows reuse of some of the different system components at different levels of the architecture with little or no changes between products and applications.

In one embodiment, the logical format is layered so that improvements, enhancements, or optimizations at any level may be implemented without impacting the other layers of the design and format.

In one embodiment, the logical format hides the holographic portion of the data format from the user interface. An advantage of hiding the holographic portion of the data format from the user interface is that lower levels of the logical format may be changed out as advances are made without impacting the host interface. It also makes the host software and drivers much simpler and easier to write.

In one embodiment, the logical format presents a standard interface typical of storage devices. For example, the SCSI command set using logical block transfers is a common thread throughout most of the data storage industry and in one embodiment, the logical format may be designed so that a holographic storage device looks similar to conventional SCSI storage devices from a host perspective. By using expanded command support, the logical format may allow a holographic storage device to emulate other storage technologies.

In one embodiment, the logical format of the present invention provides a single location or progression of locations to be searched to determine the media type and format for a newly loaded media, including the characteristics or high level information of: media type, status, and format. In one embodiment, the progression does not change for a given media geometry or drive family so that compatibility determinations may be made based on this high level information. This highest level structure of the logical format is the library map.

The library map is robust and well protected, and may be redundant. The library map provides support for multiple physical formats and densities to allow the library to more easily adapt to new inventions and breakthroughs for capacity improvement, such as sparse recording vs. polytopic.

In one embodiment, the library map allows for different media addressing schemes including servo encoder feedback and patterned substrate addressing. The library map is sufficiently flexible to allow different media types and geometries, as well as being able to support industry standard file systems for removable media. The library map provides the ability to add content protection and security extensions. The design of the library maps may provide for a way to extend the logical format in many different ways including density increases, support of different media types, ability to write and read special information (e.g. non-user data) to the media, ability to support and recognize multiple physical formats, ability to add copy protection, and security features, compression, etc. The library map may provide flexibility for supporting error correction and recovery with adjustable redundancy at multiple levels of the format, thereby allowing system trade-offs to be made between capacity, transfer rate, and latency.

The library map of the present invention is not specific to optical write once media. The library map of the present invention may work for any removable media. The library map may support rewritable, WORM, or ROM media. The library map may provide a method for validating media and mapping out bad areas. The library map may allow mixing of multiple physical format types (mostly density) on the same media i.e. sparse vs. polytopic areas. The library map may allow multiple, virtual volume support i.e. make the media look like multiple separate disks or cards. The library map may allow media to be read or rejected based on formats without having large redesign efforts that impact multiple layers of the physical and logical format. The library map, at the logical interface level, may allow the flexibility to support multiple drive personality and format types. The library format may support industry standard file systems for storage device types that can be emulated such as tape. For rewritable holographic media, the library format may be able to support industry standard file systems, at the logical interface level, for rewritable optical and magnetic storage devices such as DVD+/−RW, MO, HDD.

For a logical format for a holographic storage the device, multiple layers of data abstraction and transformation occur between the host interface and the physical data on the media. As the data moves closer to the host and goes through more layers of abstraction, the logical format and data handling become less dependent on the underlying technology. The data also becomes more flexible in how the data is handled and the library map may begin to emulate existing storage technology.

In one embodiment, the logical format of the present invention allows a holographic storage device host interface to look as similar as possible to conventional storage devices without compromising the performance and features of holographic storage. The host interface may be based on logical blocks. The holographic storage device may support multiple sizes of fixed logical blocks and, if desired, it may support variable logical block sizes.

FIG. 1 shows the relationship of a library map 102 to three partitions: partition 1, partition 2, and partition 3 labeled 104, 106 and 108 respectively. FIG. 1 also provides a view of an example of data partition written in write sessions WS1, WS2, and WS3, with card catalogs CC1, CC2 and CC3, and bookcase borders 132. In addition, and partition may contain a drive emulation table referenced as DE.

FIG. 1 shows an example of a hierarchy and how library map 102 defines and points to different numbers and types of partitions. In this figure, partition 1 is a multi-session, user data partition, partition 2 is a single session user data partition, and partition 3 is a fixed definition internal data partition.

The functioning of a library map, partitions, and card catalogs will be described in more detail below.

As can be seen in FIG. 1, the top level of the logical format of the present invention is the library map 102. The library map 102 provides the full view of the following information: the medium type, the makeup of the medium, the format generation in which the medium is written, location of the major partitions in the medium, and what type of information those partitions contain. Using the above information, a drive may determine if the drive can read the medium or not and if so, what rules and algorithms the drive needs to use to read the medium. Since the library map 102 contains the information on partition locations and states, the library map 102 is updated each time the medium is written to.

When the medium is removable, the library map 102 is the first structure read when a medium is inserted into a drive. The library map 102 is at one or more fixed or known locations so that the drive can find the library map 102 during the medium loading process. The library map 102 may be redundant, since it will be difficult, if not impossible to use a medium if the library map 102 cannot be found and read.

The library map is the only structure in the logical format with a fixed location and a semi-fixed format. The first part of the library map is fixed so that it is both backward and forward compatible. This allows all drives to read the first part of the library map to determine its compatibility with the written media. If it is not compatible, it may gracefully fail to read the media. If it is compatible, it can then proceed to read the rest of the library map which can change in content and format depending on its version. All of the remaining lower level format structures are variable to allow for format extensibility.

The library map may reside in more than one place. The primary, fixed location of the library map may be dependent on drive and medium type and medium geometry. For example in one embodiment of the present invention, a library map may be stored in an RFID memory chip that is part of a holographic storage device. In another embodiment of the present invention, a part of a library map may be stored in an RFID memory chip along with one or more pointers to the remainder of the library map contents stored in a holographic storage medium of a holographic storage device. In this embodiment, the part of the library map stored in the RFID memory chip is the "primary library map" and the part of the library map stored on the holographic storage medium is the "medium-based library map." In another embodiment of the present invention, the library map may also be a file on the hard disk drive of a host and the library map may be downloaded from the hard disk drive when a holographic storage medium is inserted in a computer system. In holographic storage device.

In another embodiment, the library map may reside on one or more fixed book addresses of a holographic storage medium. In this embodiment, the library map may be written in sparse mode (i.e. non-overlapped) since the library map will generally not fill up 1 book location.

The information included in the library map may include the library map revision to allow extensions to be added to the library map structure. The library map may also include information about the medium type, including such information as the geometry, formulation, density support, write/once vs. rewritable, book addressing strategy (patterned vs. encoder), write schedule, book size and spacing, number of pages per book, etc. This information may be complete enough to determine read/write compatibility and to allow a drive into which a holographic storage medium is inserted to know how to address, access, and read locations on the media. This information may be encoded as format generation IDs and/or indexes into firmware lookup tables to save memory space.

The library map may also include information about format generation that helps describe all layers of the format being implemented. The library map may also include information about the medium status, such as whether the medium is full, write protected, secure, empty, formatted, appendable, non-appendable, etc. The library map may also include information about the volume ID which is unique to every piece of media. The library map may also include drive information and statistics such as the drive serial number, R/W cycles, time the media was in the drive for each drive that it was inserted into, etc.

The library map may also include information about partition descriptors. There is one partition descriptor for each partition on a data storage medium and each partition descriptor may contain: a partition start/end address, a partition type that described the type of data the partition contains; the time of the last partition update, the status of the partition i.e. whether the partition is empty, appendable, full, write protected, etc., the next appendable address, the most recent card catalog address for the partition, the partition write format type i.e. whether the partition write format type is sparse, overlapped/polytopic, etc., the partition data type i.e. whether the data is user data, a library map, etc., a pointer to a linked partition that may be used if a partition fills up and a larger, virtual partition is desired, a starting chapter number and logical block address for the partition, and CRC protection to ensure that the library map has been read correctly.

The recordable portion of a data storage medium used with the logical format of the present invention may be divided up into partitions. Some of the partitions may be for user data and some partitions may be for internal drive usage and may not be accessible by the user except by special command.

In the logical format of the present invention, the sizes and locations of partitions may be variable and may be defined by the library map. The variability of the size and locations of partitions makes the logical format very flexible and new partition types may be added as needed to extend the format. In the logical format of the present invention, partition locations are physically separated from each other and each start and end on bookcase boundaries. In other words, there may not be overlapping books across partition boundaries. However, it is possible to split up existing, unused or unfinished partitions into multiple new partitions. The flexibility of the partitions allow for very short partitions that may contain special drive information like library maps and bad map tables, and very long partitions containing user data.

Each partition type is characterized by two attributes: the recording mode and the data content. Some types of content, such as user data, may be written in different recording modes depending on the format generation and use model.

Figure 2:
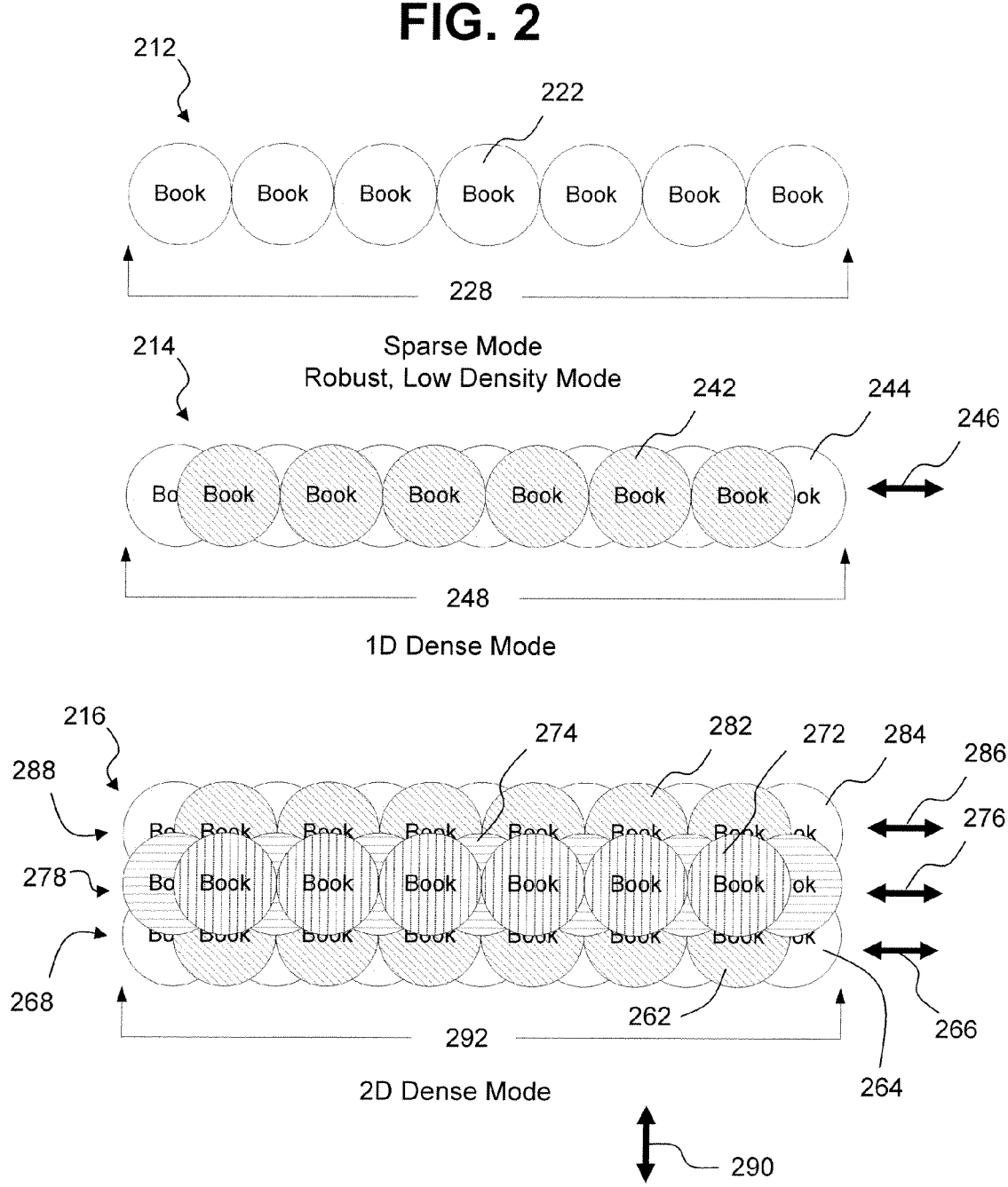
FIG. 2 is a schematic diagram illustrating four recording modes, as viewed from the top of a data storage medium, in accordance with the present invention.

FIG. 2 shows an overview of the three modes of the present invention: sparse mode, 1D dense mode and 2D dense mode. Diagram 212 illustrates two recording modes: sparse mode and robust low density mode. Diagram 214 illustrates 1D dense mode. Diagram 216 illustrates 2D dense mode. In diagram 212 books 222 are arranged in a bookshelf 228 so that books 222 do not overlap. In diagram 214 books 242 overlap books 244 along the direction, indicated by double-headed arrow 246 of a bookshelf 248. In diagram 216; hooks 262 overlap books 264 in the direction, indicated by double-headed arrow 266, of a bookshelf 268; books 272 overlap books 274 in the direction, indicated by double-headed arrow 276, of a bookshelf 278; and books 282 overlap books 284 in the direction, indicated by double-headed arrow 286, of a bookshelf 288. In addition, bookshelf 278 overlaps bookshelf 268 and bookshelf 288 in a direction indicated by a double-headed arrow 290 to form a bookcase 292.

In FIG. 2, for clarity in diagram 214, each book 242 is shown overlapping two books 244 so that each book 242 overlaps half the diameter of two books 244. However, the density of overlap may be greater in some embodiments of the present invention. For example, each book 242 could overlap 75% of the diameter of one book 244 and 25% of the diameter of an adjacent book 244. Also, in one embodiment of the present invention, all of the books in a lower layer are written to before the next layer above is written to so that the data storage medium is exposed uniformly. In addition, although for simplicity only two layers are shown in diagram 214, many overlapping layers may be part of a given bookshelf.

In FIG. 2, for clarity in diagram 216, each book 262 is shown overlapping two books 264 so that each book 262 overlaps half the diameter of two books 264, each book 272 is shown overlapping two books 274 so that each book 272 overlaps half the diameter of two books 274, and each book 282 is shown overlapping two books 284 so that each book 282 overlaps halt the diameter of two books 284. However, the density of overlap may be greater in some embodiments of the present invention. For example, each book 262, 272, 282 could about overlap 75% of the diameter of one book 264, 274, 284, respectively, and 25% of the diameter of an adjacent book 264, 274, and 284, respectively. Also, in one embodiment of the present invention, all of the books in a lower layer are written to before the next layer above is written to. Also, in one embodiment, all of the bookshelves in a lower layer are written to before the bookshelves in an upper layer to expose the medium uniformly. For example, in diagram 216, bookshelves 268 and 288 are written to before bookshelf 278. In addition, in diagram 216, although for simplicity, each bookshelf is shown as being composed of two overlapping layers, many overlapping layers may be part of a given bookshelf. Also, although only three overlapping bookshelves are shown in diagram 216, there may be many overlapping bookshelves. In addition, although for simplicity, in FIG. 2, bookshelf 278 is shown overlapping about half the width of bookshelf 268 overlap 80% of the width of bookshelf 268 and 20% of bookshelf 288 allowing a bookshelf adjacent to bookshelf 278 to overlap 80% of bookshelf 288, etc.

In sparse mode, data written is by a host in non-overlapping book format, as shown in diagram 212 in FIG. 2. The book density may also be an attribute of this recording mode. This write mode is appendable within given time constraints in the book mode. The last book written is cured prior to appending.

In robust low density mode which is also illustrated by diagram 212 in FIG. 2, the write schedule is adjusted to write fewer, much stronger holograms in non-overlapping book format. Robust low density mode may be used for very important data that must be recoverable, such as a library map. This mode is appendable at the book level.

1D dense mode is written using overlapping books in 1 dimension, the direction of the bookshelf 2489 as illustrated in diagram 214 of FIG. 2. This mode may also be referred to as 1D polytopic. This mode is also appendable within given time constraints in the form of bookshelves. The end of a bookshelf is completed or cured before appending.

2D dense mode is written in overlapping books in 2 dimensions, both along the bookshelf and between bookshelves, as illustrated in diagram 216 of FIG. 2. This mode is referred to as 2D polytopic and is appendable in the form of bookcases. A full bookcase is finished and cured before a new bookcase can be written. It is important not to exceed the end of the partition while overlapping and curing the end of a bookcase. Examples of polytopic recording techniques that may be used in various embodiments of the present invention are described in U.S. Published Patent Application. No. 2004-0179251, entitled "Polytopic multiplex holography," and U.S. Published Patent Application No. 2005-0036182, entitled "Methods for implementing page based holographic ROM recording and reading," the entire contents and disclosure of which are hereby incorporated by reference.

When recording in polytopic mode (1D or 2D), the books may be written in an order that provides for uniform exposure of the medium. This requires that the books be written in layers of non-overlapping books. The number of total layers is equal to the sum of the polytopic overlap factor in each of the polytopic dimensions. For example, in a 2D polytopic recording with a theta or x overlap factor of 4 and a radial or y overlap of 2, there will be 6 layers of recordings. At the end of the recording, all books will be separated by at least the size of the beam waist, but books on the same layer are separated by the full beam size.

The logical format of the present invention employs various partition content types including: library map type, logical block user data type, media manufacturing data type, calibration/drive data interchange type, drive firmware mode parameters type, etc. If a library map partition is written on data storage medium, the library map partition may be written in robust low density mode and may be written redundantly. The logical block user data partition may include any type of user data to be written in a logical block format and use any of the recording modes based on the format generation. Logical block user data partitions include user data, a card catalog, and a file system. Logical block addresses may begin at address 0 to start a partition unless the addresses are a spliced virtual partition continuing from a previously completed partition. A medium formulation, density, geometry, composition, write characteristics, etc. Pertinent information to understanding the makeup of the medium, the age of the medium, and how the medium must be written and read are located in this partition. This partition is a detailed supplement to the brief amount of media information included in the library map and, if included, this data may be in multiple, redundant partitions to assure its recovery. A calibration/drive data interchange partition may include factory written books with optimal book and page positioning to be used for drive servo and read calibration. A calibration/drive data interchange partition may also include areas for writing to test writing and, possibly, to help train for interchange. For example, each drive that is to write to a disk may write a calibration stack in this partition for the drive to train to prior to reading the data written by that drive. This also requires drive write IDs to be associated with written partitions or write sessions. A drive firmware/mode parameters partition may be a short partition containing code upgrades or mode operational parameters that should be used with a medium or from this point forward.

A card catalog is a structure generated by a holographic storage device on a write session or bookcase basis. One purpose of the card catalog is to provide a sparse mapping between host logical block addresses, chapters, and books within a partition. The card catalog allows a holographic storage device to determine which chapter number in the partition in which a requested logical block or group of logical blocks may reside. The card catalog also provides a description of each anthology to enable the size and redundancy of anthologies to change on the fly.

The host based logical blocks are mapped to physical elements on the data storage medium that are different sizes than logical blocks. Also, due to the technology and processes used, the number of physical blocks in chapters and books may vary. The card catalog provides the information required for the HDS to determine where a logical block may reside on the media when it is requested by the host.

Due to the high capacity and number of chapters on the data storage medium, it may not be possible to provide a complete cataloging of all logical block locations. In this case, a sparse mapping of the physical chapter locations is provided in the card catalog. When using the sparse card catalog, the firmware of a holographic storage device may include algorithms that can make good guesses and quick recoveries when locating logical blocks that don't have direct location mapping in the card catalog.

The card catalog may reside within a partition, as an appendix to the library map, or both. It may be that a sparse card catalog is included in the library map until the available space is used up and a more comprehensive version is included within the partition.

For multi-session partitions, locating the card catalog within the partition requires a method of updating it and appending new card catalog versions as new sessions are written.

Figure 3:
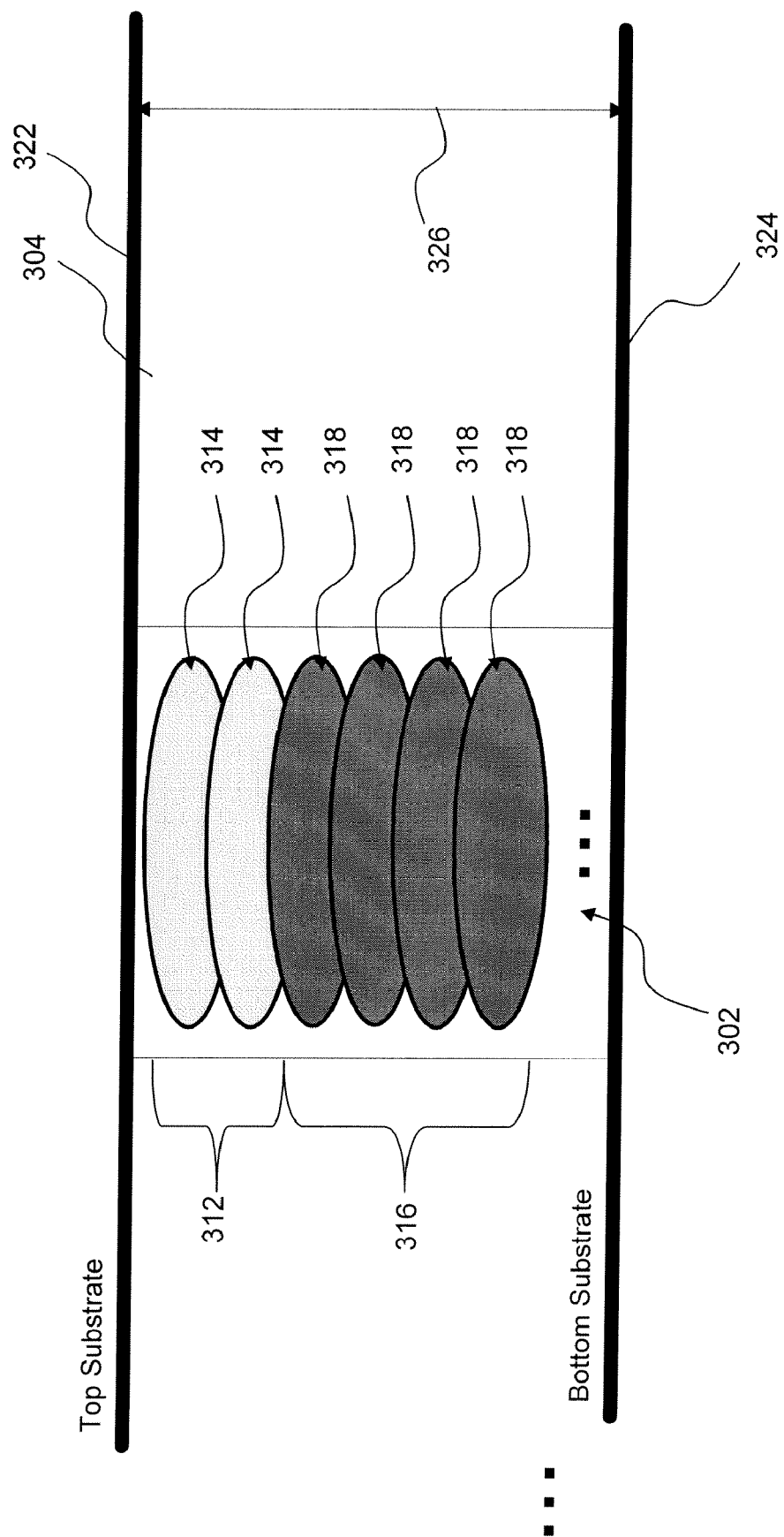
FIG. 3 is a schematic side view of a book in accordance with one embodiment of the present invention.

FIG. 3 shows how a single book 302 is located in a digital storage medium 304. Book 302 includes pages 312 of chapter 314 and pages 316 of chapter 318. Chapter 314 also includes additional pages (not shown) from a previous book in digital storage medium 304. Digital storage medium 304 includes a top substrate 322, a bottom substrate 324 and has a volume indicated by double-headed arrow 326.

The book of FIG. 3 has multiple pages multiplexed within it. Physically, the pages are actually written throughout the entire volume of the medium. The chapters are logical groupings of consecutive pages as described in more detail below. In one embodiment of the present invention, the books may be elliptical in shape due to the design of the object and reference beam optics in the recording system used to create the books.

Figure 4:
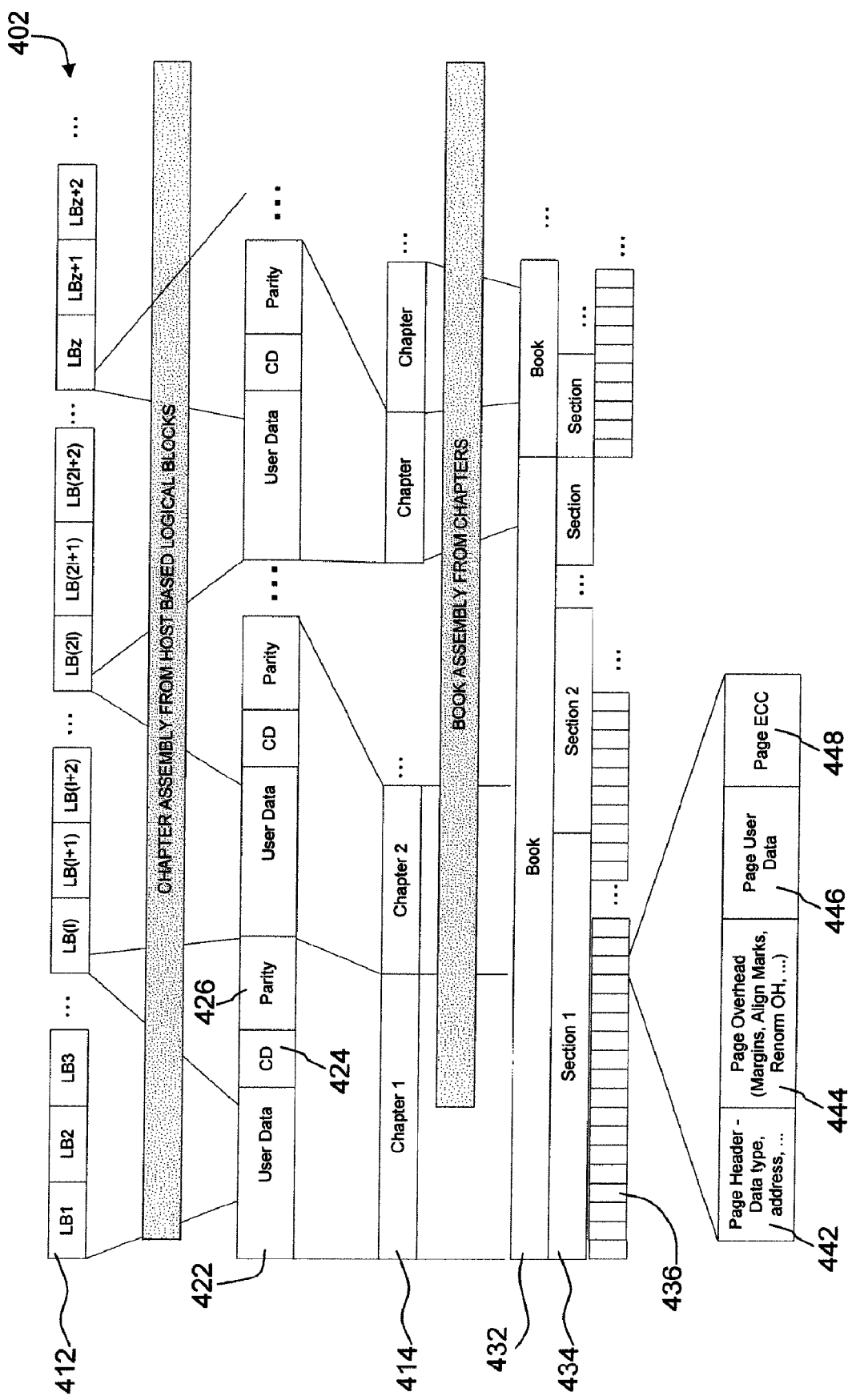
FIG. 4 is a schematic view of the composition of a logical format in accordance with one embodiment of the present invention.

FIG. 4 shows the composition of one embodiment of a logical format 402 of the present invention, showing the levels of data formatting as data formatting is transformed from host based logical blocks 412 all the way down to data pages 436. Host based logical blocks 412 are assembled into chapters 414. Each chapter 414 is subdivided into user data 422, a chapter directory 424 and parity information 426. Books 432 are assembled from chapters 414, however, as can be seen in this figure, chapters do not have a direct relationship to books. Each book 432 is subdivided into sections 434. Each section 434 is made up of data pages 436. Each data page includes a page header 442, a page overhead 444, page user data 446 and page error correction codes 448.

In the logical format example of FIG. 4, the logical block size may be any number of bytes and may change on a block basis. In most cases, the logical block size is x*512 where x is host defined, but the block size can also be a variable number of bytes. The chapter directory 424 is appended to the user data to start a chapter 414. The chapter directory 424 includes compression map, copyright protection, data type, logical to physical mapping, etc. any other logical level info. The logical blocks map into the user data blocks 422 until a given chapter 414 is filled. Within a chapter 414, data types are not mixed, however the size of a chapter and the degree of redundancy within the logical format may vary.

An anthology is used to allow the recovery of book locations that are totally wiped out by dust, scratches, etc. Preferably, book locations are clean before they are written, however, if the book locations are not clean before being written, the locations that are not clean are be mapped out. However, if a book gets damaged after the book is written, the disclosed anthology provides mechanism to recover any or all data within the books.

Figure 5:
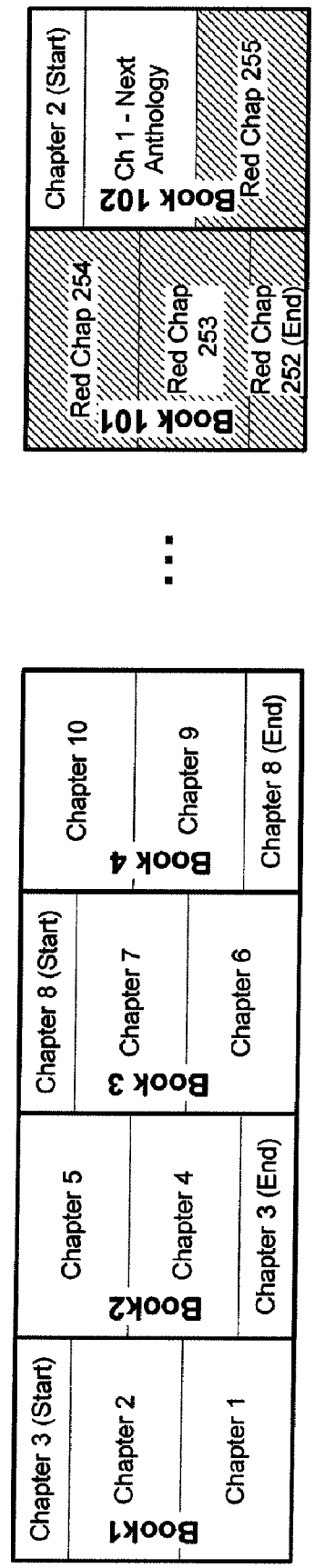
FIG. 5 is a schematic diagram illustrating a sparse anthology in accordance with one embodiment of the present invention.

FIG. 5 shows an example of a sparse anthology 502, as opposed to a dense or polytopic anthology, with 255 chapters, the last 4 chapters of which are redundant. It is up to the specific format generation to define the number of redundant chapters vs. user chapters. If all or a portion of a book is bad in the anthology, for example book 2 with chapters 3-5, redundant chapters 252-254 can be used to reconstruct chapters 3-5, thus restoring the book.

During writing, a large buffer, calculated on the fly, is used to store the redundant chapters of the anthology. Once the user chapters of the anthology have been written, the remaining redundant chapters of the anthology are written. The chapter numbers of redundant chapters are encoded differently from user data chapters so that they can easily be identified.

During reading, the redundant chapters may rarely be read. If there is a failure when reading a chapter, re-reads and retry methods are attempted first. If the reading of the chapter still fails, then anthology level ECC will be invoked by reading all of the chapters including the redundant ones and performing corrections. If successful, and it is determined that most, if not all of a book failed, the offending book is reconstructed in a spare and mapped out.

The reason the anthology ECC level is based on chapters rather than books is that the anthology ECC level occurs before chapter ECC and, at this point, there is no knowledge about the physical book location of data on the disk since chapters are not tied directly to books. However, as long as the chapter and book sizes are chosen such that 255 chapters cover multiple books, this scheme provides good protection. Also, since books are written a full book length apart, even in polytopic, high density mode, this method provides a physical interleave between different anthologies providing additional protection from a single, large defect.

Figure 6:
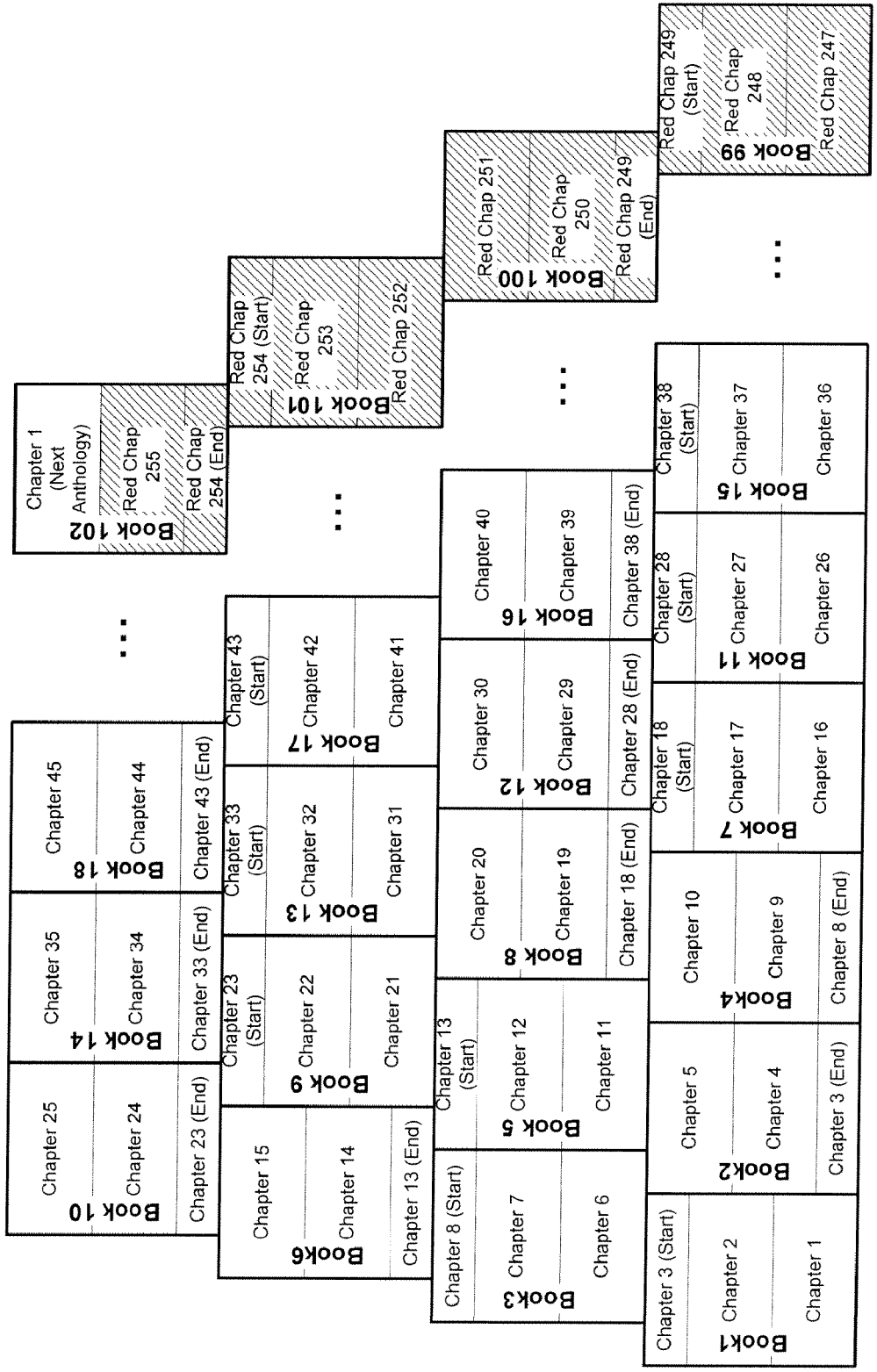
FIG. 6 is a schematic diagram illustrating a polytopic anthology in accordance with one embodiment of the present invention.

FIG. 6 shows an example of an anthology written in polytopic mode. In FIG. 6, chapters 247-255 are redundant. These chapters provide the capability to reconstruct 3+ books that may have been damaged within the anthology.

For a holographic storage device, a book is defined as a physical group of holograms written at a single physical r, theta or x, y location. This is also known as a stack. These holograms are individually addressed by one or more pseudo in-place multiplexing schemes. A book is also defined as the maximum number of holograms written in a single spot location. For shift or correlation multiplexing where pages overlap significantly by a small change in position, a book can be defined as a group of partially overlapped holograms.

In one embodiment of the logical format of the present invention, a book is an in-place stack of holograms. However, a book may encompass an atomic group of shift-multiplexed holograms or hologram sections when used with a hybrid multiplexing method.

Due to rewrites and adjustments in write schedule due to media aging, read exposures, etc, the number of pages in a book may vary within a partition and the logical format must handle this situation. In general, books contain a minimum number of pages in order to meet transfer rate requirements. This transfer rate requirement is due to the fact that it is very quick to switch pages within a book since it only requires a reference beam adjustment (100 s of us) whereas it can be relatively slow to switch book locations since this requires media or head movement (10 s or 100 s of ms).

In embodiments of the present inventions that employ sections, in order to fully utilize the available dynamic range of the medium, it may be necessary to use multiple multiplexing schemes within the same book to increase the addressing space. However, many embodiments of the present invention do not employ sections.

In one embodiment, the logical format of the present invention does not call out specific addresses for different multiplexed sections, so more than 2 multiplexing methods can be combined within a book without impacting the logical format.

It provides the method of locating specific logical block boundaries and handles the case of logical blocks that span chapters. The chapter directory also provides support for hardware compression mapping.

A page is the image written to the media during 1 exposure or read during 1 integration time. The page size is given in pixels and is driven by library map size. A page contains a header to identify it, chapter level information to indicate its position within a chapter, decoding, alignment, and reference information as well as the encoded data.

For most device types, logical blocks are fixed sizes for a given media and, based upon the current SCSI standard, the logical blocks are generally 512 bytes or a multiple thereof. Some devices, like MO allow the block size to change from 512 bytes up to 4 KB. Tape devices allow variable sized blocks that do not have to be a multiple of 512 bytes and they can change on a block by block basis. This invention allows both fixed blocks of 512 byte multiples and variable size blocks. The block size may change for every logical block written, if desired.

In one embodiment of the present invention, a holographic storage device may use any multiple of 512 byte fixed blocks as well as variable blocks. The flexibility of the system simplifies integration with different host applications and drivers. This flexibility is achieved through mapping into 1 or more chapters and has no relevance to physical characteristics of the holographic storage device.

An anthology of the present invention may be implemented as Reed-Solomon ECC or other Forward Error Correction (FEC) types across chapters within a partition of user data. The anthology is independent of the physical recording mode used. The anthology length and redundancy is variable and implemented as a mode parameter. The trade-off between Anthology overhead and number of books being protected may be made depending on the media type and typical and worst case system performance.

The recording system may adjust the anthology redundancy at the end of a bookcase to keep the overhead constant. This is done by reducing the number of redundant anthology chapters added to the final anthology of a bookcase in the situation where there aren't enough user chapters available to fill the final anthology.

The anthology length and redundancy is tracked in the Card Catalog structure which provides a map and redundancy level for each anthology in the partition. The system will accept an anthology redundancy of 0, which eliminates the overhead of the anthology at the cost of losing book level protection.

In one embodiment, the codewords of an anthology consist of the nth byte of each chapter in the anthology. There is no interleaving done at the anthology level. As an example, consider an anthology consisting of 128 chapters with chapter sizes of 32 pages and page sizes of 50 kBytes of user data each. This anthology would have 32*50 kB or 1,638,400 codewords, each 128 bytes long, for a total anthology size of 200 Mbytes.

During recording, the redundant chapters are calculated on the fly as the user chapters are compiled and sent to the channel for encoding and writing. When the user chapters of an anthology have been written, the redundant chapters are then written and a new anthology can begin. There is some write transfer rate latency involved in writing the redundant chapters. User data is buffered up as much as allowable by the buffer during the time spent writing the redundant chapters. The anthology write overhead will have a negative impact on the sustained write transfer rate that is directly proportional to the redundancy level selected.

During reading, if the anthology chapters are not needed for recovery, the card catalog provides the information required to skip over the redundant chapters when the data is recoverable. In the case where a user data chapter is found to be unrecoverable and anthology recovery is used, all of the chapters of the anthology are read into memory and the lost chapter(s) is (are) reconstructed. In the case of multiple chapters being lost in a book, the book may be marked bad and relocated via the bad mapping process. Thus, in the normal case, where all books are recoverable, the anthology overhead will have almost no impact on the sustained read transfer rate.

A card catalog is a mapping of the information contained in the user data portion of a partition. There is at least 1 card catalog per user data partition. There are multiple types of card catalogs depending on the partition type. Different versions of the card catalog can vary in detail and length. The card catalog's primary responsibility is to provide a mapping of anthology structures and chapter and logical block numbers within a partition. This section provides the detailed definition of all defined versions of card catalogs.

A single session card catalog is used for user data partitions that are written in a single write session. This type of card catalog is written only 1 time at the end of a write session. It follows the end of the user data of the session and is written as its own chapter or chapters. The size and redundancy of the single session card catalog chapter may be different than that for the rest of the user data in the partition to save space without compromising the level of protection of the single session card catalog.

A single session card catalog may contain 2 types of information. One type is a sparse mapping of the user information at the book level. It provides a snapshot of the book and logical block number at the start of each book covered by the map. It is up to the drive to provide the heuristics and search techniques to find chapters and logical blocks that are not located at a book start. This type of information is contained in a series of structures call Table of Contents (TOC). There is 1 table of contents per book described in the single session card catalog.

A second type is a mapping of the anthology structures written within the partition. These structures provide a chapter level mapping of anthologies so that the holographic storage device can determine where anthologies begin and end and which chapters contain redundant data. There is 1 structure per anthology. Each of these structures is called an anthology binding.

A single session card catalog may also be written in the Library Map structure depending on the format generation implementation. The single session card catalog format includes a header structure to define the card catalog. This structure is followed by 0 or more anthology binding structures which are then followed by 1 or more table of contents structures. The entire single session card catalog is appended with a footer for additional integrity protection. When reading the single session card catalog, the drive assumes that all anthology bindings immediately follow the single session card catalog header and all of the table of contents entries immediately follow the last anthology binding entry.

As a book is a physical, and not a logical entity, it doesn't have an associated logical structure. Each book is given a specific physical address that is based on either r, theta or x, y coordinates with the addresses being medium dependent. The locations of the books may be determined via encoder values or feedback off of the disk if there is a servo addressing pattern on the media substrate.

The book address corresponds to the physical address referred to in many of the logical structures. The definition of the physical addresses and how they are converted into a physical location or coordinates on the medium are defined by the format generation.

A section is also a physical and not a logical entity. If sections are present in a specific format, their addressing is incorporated with the book physical addressing scheme.

A chapter is built up from data to be written to the media and redundant page data generated to provide for recovery of lost pages within the chapter. A chapter is always an integral number of pages long and may require padding in the data portion to fill out the data pages of a chapter.

The data of a chapter may be made up of host logical blocks of user data, some other data structure that needs chapter level protection (e.g. Card Catalog, Library Map, . . . ) or redundant check bytes (Redundant Anthology chapter).

At the end of chapters containing logical blocks of user data, a structure called a chapter directory is appended. The data+the chapter directory must be a whole number of pages long. Filler data may be added to make it come out to a page boundary. Chapter directory structures are not required for all chapter types such as filler chapters, redundant anthology chapters, and chapters containing fixed structure data (such as the Library Map).

In one embodiment, the ECC pages are calculated and appended to the end of the chapter. The total chapter length and the amount of redundancy is variable depending on the mode parameters, format generation, and data type being protected.

The data protected by the chapter ECC may be sequential or interleaved with the ECC parity information. If there isn't enough data to fill out the end of the chapter or up to the chapter directory structure, filler data is inserted. The filler data may be defined as sequential bytes starting at 0 and incrementing by 1 for each filler byte so that a fixed pattern is not presented to the page level randomizer.

The chapter directory structure is only present for chapters containing logical blocks of user data. For these chapters, chapter directories follow the data and filler portion of the chapter and ends in the last user page of the chapter.

The chapter parity information may be separate from the data pages and written after the user page containing the chapter directory to complete the chapter. In other embodiments, the parity information for chapter protection may be interleaved with the user data.

Chapters may span books and may be larger or smaller than a book.

Reed Solomon may be used for chapter level protection as well as for Anthology ECC. Many other types of ECC may be used for both chapter and anthology level protection.

A chapter level ECC codeword consists of 1 byte per page across the entire chapter. For example, in an 8 page chapter with 2 redundant pages, byte 0 of each of the 8 pages constitutes the firs codeword, byte 1 is the second, byte 2 the third, etc.

Chapter level correction can be performed using erasure correction. Erasure correction depends on getting pass/fail information at the page level so that the correction algorithm has pointers to the errors. Doing this nearly doubles the correction power of the chapter level ECC. For a chapter of N pages with P parity pages, P-1 pages may be corrected using erasure correction. If erasure correction were not used, only P/2-1 pages could be corrected.

It is advantageous at the chapter level to use it with multiple page level codewords, each having its own CRC or erasure indication. This effectively increases the power of the chapter ECC by allowing it to correct errors on more pages than the chapter level redundancy would indicate. However, this chapter format can work with a single erasure indicator per page as well.

A chapter directory is only included in chapters containing logical blocks of user data. The chapter directory contains all of the information about the data that the logical portion of the firmware needs to reconstruct the original data into logical blocks. The chapter directory includes the logical to physical mapping tables including compression. The chapter directory also includes any other application level data attributes that may be required such as copyright protection/rights management, real time/non real time requirements etc. The primary chapter directory may be located at the end of the chapter or at any other location in the chapter.

A chapter directory may be a variable length depending on its complexity. The complexity is determined by the size and number of logical blocks, if the logical blocks are variable, and if compression is being supported.

A page is the image written to the media during 1 exposure. The page size is given in pixels and is driven by SLM size. There is no limit to the SLM size. Examples are 640×480, 1024×1024, 1280×1280, etc.

A formatted page is composed of the following components: codewords or paragraphs that each contain the encoded user data and may include the page header, fixed patterns for channel preprocessing and alignment information, margins i.e. areas that are left over not fitting into paragraphs or portions of the image unsuitable for data storage, and other encoded fields that may be used to for page information (like page format type, page header information, . . . ) or page decoding keys required for recovering the data pages.

The page format is impacted each time the page size, code rate, modulation code, or fixed patterns are changed. Depending on the application, the page format may vary due to differences in cost requirements, capacity requirements, optics quality, media types, and optics/system quality.

Logical blocks are the units received from the host. In general, the holographic storage device has no knowledge of the type, format, structure, or boundaries of the data contained within logical blocks. Logical blocks may contain file data, file system information, or any other type of information the host wants to store on the device. It is up to the host and application software to decipher the information within a logical block or set of logical blocks. The holographic storage device's responsibility is only to return the same information for any given logical block number.

Block sizes are selected by the host using mode selection parameters. In one embodiment of the present invention, logical block sizes must be a multiple of 512 bytes. The logical format of the present invention supports both fixed and variable logical block sizes.

Each format generation defines its own media management process. Media management in this context is defined as the processes and algorithms that control the following: the order of writing books to the media, the partitioning of the media and the management of partition creation, the definition of write sessions and their boundaries, and the definition of what types of partitions must be present and the types of partitions that are used for user data when filling the media.

Options for performing the defect mapping process, using various algorithms, include scanning the media at manufacturing time, scanning it during a format operation before the media is written to for the first time, checking a book just before it is written to, and replacing books that have gone bad after they have been written (assuming it is recoverable through the anthology protection).

For books that are mapped out before they are written, there is only a need to keep track of them so that the drive knows not to write or read those locations. This bad book map list may be fairly long, so it may be put in its own special partition type. In some embodiments of the present invention, it is desirable to be able to do this full mapping all at once so that the bad map can be written as its own partition in a single write session.

When mapping is done on the fly as new books are about to be written, the bad map must be updated frequently and be appendable. When this method is used this structure may be added to the Library Map structure, if there is a Library Map partition, since it needs to be updated every write session as well.

Bad mapping that supports replacement of already written books can be supported by this logical format specification. In this case, the drive may only be doing a read session, which does not require a Library Map update. So, extra Library Map updates may need to be done if the bad book map is in that partition. Also, a partition needs to be set aside for replacement books and this partition may need to be appendable. Yet another issue with this is that once the media is fully cured and completed, then no more bad books may be reconstructed and remapped.

In some embodiments of the present invention, there may be a need for storing and, possibly, updating calibration information on the media based on manufacturing or field testing done on the media. If calibration needs to be stored and updated, such storing and updating may be handled in a manner similar to a medium based library map.

An issue with session based write operations is the risk that an error or interruption will occur during the write session and the drive is not able to cleanly complete the write session and update the library map and card catalog entries. Primary causes of this are power outage and manual ejection of the disk during a write session. Manual ejection of the disk has a very low probability of occurrence since the firmware will lock out media ejection during write sessions and power outages can be guarded against through battery back ups. However, if something like this occurs, the logical format of the present invention allows at least the previously written data to be accessible. The logical format may also make it possible to recover some of the data written during the interrupted session, but that is not a requirement.

The logical format provides hooks for recovering an interrupted write session by providing a field in the Library Map to indicate that a partition is being updated. This field is set before a write session starts (in the RFID) and is cleared after the write session is fully completed. During loading, this field will tell the drive that a write session in a particular partition needs to be recovered.

One recovery process of the present invention includes the following steps: read the partition descriptor for the partition that is out of date to determine the start and end book locations, if the card catalog is in the library map structure, read that in and assume it is correct except for the interrupted write session, scan the book locations beyond the last card catalog and look for a valid card catalog. If one is found, assume that the last write session was completed and the Library Map wasn't updated, if no card catalog is available in the Library Map, scan all of the books in the partition, look for card catalog structures and save them and when no more data or card catalogs are found, assume the last card catalog found is correct, update the Library Map and partition descriptor to point to this card catalog. It may be necessary to cure around the last write session. Also, cure all of the remaining books in the partition and/or adjust the partition size, mark this partition as unappendable and completed.

A more complete recovery process may involve gathering the page physical address, chapter number, and complete chapters with their chapter directory structures as they are found in the scan to the end of data. Using this information, the card catalog describing the final, unfinished session can be completely reconstructed. This card catalog is then appended after the end of data is found, the partition would be updated, and the session would be completed and the area around it cured to complete the bookcase.

Any new write sessions then starts in a new partition and may be linked to the recovered one. If the recovery is fully successful, further appends to the medium may be allowed. If the partition that is out of sync cannot be fully recovered, it may be the last one containing data on the medium and the medium may be marked as unappendable. The specifics of the recovery algorithm are format generation dependent.

The load process for a data storage medium of the present invention does not only involve inserting and removing the media into and out of the read/write position but also includes determination of the media type and state and preparing it for read/write operations. Each system type and format generation will require a different load/unload process which also includes the sequence and procedures for locating and validating the library map required prior to performing useful operations on the media.

In one embodiment, the logical format of the present invention supports write retries via the page header. If any pages are rewritten due to some detected issue such as: read after write failure, shock sensor, servo error, etc., the page can be rewritten immediately using the exact same chapter values, but with updated physical address values in the page header. The number of times the page may be rewritten is dependent on the format generation.

During reading, if a page is detected as a repeat of a previously read page, the read pipeline is interrupted until decoding of the previous page is completed. If it decodes successfully, all repeated versions of the page are skipped until a new page is encountered. If the decode fails, the repeated page is sent through the decoder. This process continues until no more repeated pages are encountered or the page is successfully decoded.

During operation on a specific piece of media, the drive will build up a detailed mapping of the chapter and logical block locations at a much finer grain than the book level card catalog. As it does this, subsequent seek performance will continuously improve as long as the media is left in the drive for reading.

For applications that require good seek performance, an extended card catalog can be written to media that maps out the data at a finer granularity at the expense of capacity. When the algorithm is deemed to be required, it will be revised and included in the chapter section as an additional card catalog option.

In one embodiment of the present invention, the logical format of the present invention allows for compression block groups that are defined via the Chapter Directory.

A format generation is defined as a set of the components of the hierarchy of the format components applied to a specific system type or architecture and type or family of media. Any time there is a change in the revision or implementation of one of the format components or a change to a system architecture or media type or usage, a new format generation must be defined.

In addition to specifying the revisions and usage of each layer of the format hierarchy, the format generation definition may include operational algorithms and modes to fully define how the system works under that generation of format.

In one embodiment, the present invention provides a system for storing data comprising: a data storage medium; and a plurality of partitions on the data storage medium, wherein two or more of the partitions have data that is written in different recording modes. One or more of the plurality of partitions may contains data recorded in non-overlapped, low density books for increased recovery reliability. Also, one or more of the plurality of partitions may contain data recorded in non-overlapped, high density books for increased capacity. In addition, one or more of the plurality of partitions contains data written in 1-dimensional, overlapped, polytopic books. In one embodiment of the present invention, data may be written on a data storage medium so one or more of the plurality of partitions contains data written in 2-dimensional, overlapped, polytopic books. The 1-dimensional or 2-dimensional polytopic books may be written in a skip sorted order to ensure uniform usage of the medium. Examples of skip sorting techniques that may be used in various embodiments of the present invention are described in U.S. Pat. No. 6,614,566 to Curtis, et al., the entire contents and disclosure of which is hereby incorporated by reference. Examples of polytopic recording techniques that may be used in various embodiments of the present invention are described in U.S. Published Patent Application. No. 2004-0179251, entitled "Polytopic multiplex holography," and U.S. Published Patent Application No. 2005-0036182, entitled "Methods for implementing page based holographic ROM recording and reading," the entire contents and disclosure of which are hereby incorporated by reference.

EXAMPLES

Example 1

There are multiple subsets of SCSI commands targeted to different device types, none of which currently specifically target holographic storage device. However, a holographic storage WORM device may be adapted in a straightforward manner to either the WO block device command set or the DVD-R command set, so there may not need to be significant SCSI command additions or enhancements to make a holographic storage device that is able to use the logical format of the present invention. Additional modifications may be made to the host application software to alter the interpretation of some of the commands when dealing with a holographic storage device instead of conventional storage devices.

Example 2

A library map in accordance with one embodiment of the present invention, Library Map Version 0x80, is shown below in Table 1, is a definition of one version of a library map and partition descriptor structures. In this version, the library Map structure and partition descriptors all are encoded together. The Library Map structure is written first followed by 1 or more partition descriptors. The partition descriptors must always cover all of the book addresses over the entire media. When the holographic storage medium has not been written to, a single partition descriptor may be used to describe the entire volume. Additional partitions may be added as they are created during write sessions.

Each partition descriptor may also include its card catalog in this region. If the partition card catalog is included, it immediately follows the partition that it belongs to. The next partition descriptor will follow that card catalog.

The card catalog structures are defined with their respective partition definitions.

TABLE 1

Example Library Map Definition
Library Map Definition

| Structures | Field | Size |
|---|---|---|
| Basic Map Information | Library Map ID | 32 bits |
| | Library Map Length in Bytes (Basic Info Only) | 16 bits |
| | Library Map Revision | 8 bits |
| | Library Map Sequence Number | 8 bits |
| | Total Bytes in this portion of the Library Map | 32 bits |
| | Address Pointer to Media Based Library Map | 32 bits |
| | Pointer to Redundant Copy of Media Based Library Map | 32 bits |
| | Pointer to Previous Media Based Library Map | 32 bits |
| | Format Generation | 8 bits |
| | Media Geometry Code | 8 bits |
| | Media Formulation Code | 8 bits |
| | System Type | 8 bits |
| | Media Status | 8 bits |
| | Reserved = 0 | 24 bits |
| | Byte Offset to First Partition Descriptor | 32 bits |
| | Partition Information Byte | 8 bits |
| | Number of Partitions | 8 bits[1] |
| | Unsynchronized Partition Number | 8 bits[2] |
| | Partition Information Padding | 8 bits[3] |
| | Time of First Media Write | 8 Bytes |
| | Volume Serial Number | 128 Bits |
| | Additional Data Size | 8 bits[4] |
| | Additional Data Field | 255 Bytes[5] |
| | Library Map CRC | 32 bits |

[1]This field can be expanded as needed to support more than 256 partitions.
[2]This field can be expanded as needed to support a partition larger than 256.
[3]This field can vary from 0-24 bits to make the partition information end on a longword boundary.
[4]This field may vary to accommodate any size of statistics field. The Statistics size + Statistics fields must end on a longword boundary.
[5]255 bytes nominal. May be shorter or longer. - Includes Drive Stats Field TBD by format generation. Includes Drive SN, Time in drive, # r/w cycles, . . .

The Library Map ID field is a unique pattern to identify the start of the library map structure. It is encoded in ASCII as "LIBM".

The Library Map Length field is the length in bytes from the start of the library map through the library map CRC. Value depends on the variable Volume ID and Drive Statistics fields.

The Library Map Revision field is the Version of this library map header. Changing this allows the header to change drastically starting after the 8$^{th}$ byte. These first 3 fields are the only ones that need to remain constant throughout the many versions of format. This definition is version 0x80. Versions 0x80-0xFF are reserved for versions of the format.

The Library Map Sequence Number field is a number that starts at 0 and is incremented each time the library map is updated. For Library Maps written to Write Once media, this sequence number is used to find the most recent version.

The Total Bytes in This Portion of the Library Map field is the number of bytes beginning with the Library Map ID field that are included in this structure including all attached partition and card catalog information. It is used in case all of the information cannot fit in the starting place (i.e. RFID).

With respect to the Address Pointer to Media Based Library Map field, if the Library map and attached partition descriptors and card catalogs do not fully fit in this area (e.g.

RFID), this points to the area where the current Library Map information is repeated in full. It is a book address on the media. If set 0xFFFFFFFF, then there is no media based library map.

With respect to the Pointer to Redundant Copy of Media Based Library Map field, if desired, 2 copies of the library map may be written to the media in different locations on the media. This is also a book address. If set=0xFFFFFFFF, then there is no media based redundant library map.

With respect to the Pointer to Previous Media Based Library Map, if there is a library map partition on the media, a new version is written after each write session. This points to the book location on the media where the previous library map is located. This allows the drive to examine old library maps for a history of how the media has been written and is used as both a recovery and statistics tool.

The Format Generation field is the combined definition of the format implementation at all levels including revisions of the library map, partition descriptors, card catalog, chapters, pages, and media usage. The format generation also defines some algorithms for system operation and media usage.

The Media Geometry Code field code provides physical information about the media not including its formulation. Items encoded in this include disk vs. coupon, in a cartridge or not, if it has an addressing servo pattern and, if so, what kind/version, substrate type, guard bands, etc.

The Media Formulation Code provides information about the media formulation. The formulation information includes thickness of the media, formulation type, write once vs. rewritable, and any other information needed to determine book capacity, write schedules, cure times, etc.

The System Type field is meant to define a system type to determine interchange compatibility.

The Media Status field Indicates if the media has never been written, is partially written, is appendable, full, or write protected. The field is encoded as shown in Table 2 below:

TABLE 2

Media Status Byte Definition
MEDIA STATUS BYTE DEFINITION

| 7 | 6 | 5 | 4 | 3 | 2 | 1 | 0 |
|---|---|---|---|---|---|---|---|
| Formatted | Secure | Reserved | | Status | | | |

In Table 2, for the entry "Formatted": 0=unformatted, 1=formatted. This might mean bad mapping has been done or any other type of preparation or mfg data has been put on the media. For the entry "Secure": 0=anyone can read. 1=Some security policies will be used to determine readability of the data. The entry Status Field describes the current overall status of the data storage medium, wherein 0=Empty—never been used
1=Certified—Media has been certified and bad areas mapped out.
2=Appendable—Has been written and can still be added to
3=Write Protected—User has write protected the cartridge via software command.
4=NonAppendable—Some recovery error or write timeout occurred on the media and it can no longer be written to. It is not full and may not be cleanly finished.
5=Recovered—There was an error discovered at some point in the integrity of the library map or substructures. This error has been recovered, but the media is no longer appendable.
6-14—Reserved
15=Full—Media has been written to capacity and cured The Byte Offset to First Partition Descriptor is the byte offset from the beginning of the library map (the ID field) to the first partition descriptor. This allows the fields following this one to be of variable size.

The Partition Information Byte is the status byte defining the partition information in the fields following it. The Partition Information Byte is defined as shown in Table 3 below:

TABLE 3

Partition Information Status Byte Definition
PARTITION INFORMATION STATUS BYTE DEFINITION

| 7 | 6 | 5 | 4 | 3 | 2 | 1 | 0 |
|---|---|---|---|---|---|---|---|
| Unsynchronized Partition | Reserved | | | Number of bytes in the "Number of Partitions" Fields | | | |

In Table 3, for the entry "Unsynchronized Partition": 0=there are no partitions out of sync with the Library Map and Partition Directories. 1=There is a partition out of sync with the Library Map and Partition Directory. If this bit is a 1, the "unsynchronized partition number" field is valid. Since only 1 write session can be active at a time, only 1 partition may be invalid at a time. This bit is set prior to starting a write session in a partition. Once the write session is completed, the Library Map and associated PD are rewritten and this bit is set back=0. This provides an indicator that a write session was interrupted and error recovery must be performed. The Number of bytes in the "Number of Partitions" fields entry defines the number of bytes in the "Number of Partitions" and "Unsynchronized Partition Number" fields. This entry starts out a 1 (8 bits each) and grows as the number of partitions grows. This allows a maximum of 4G partitions on the media.

Number of Partitions is the current number of partitions defined on the medium, including both user and internally access partitions, the default size of this field is 8 bits for a total of 256. The field can be increased up to 32 bits and the Number of Partitions field expanded as needed to support more than 256 partitions.

With respect to Unsynchronized Partition Number field, if the "Unsynchronized Partition" bit is set, this field contains the partition number with the out of sync partition descriptor. The size of this field is always the same size as the "Number of Partitions" field. The Unsynchronized Partition Number field may be expanded as needed to support more than 256 partitions.

The Partition Information Padding field pads out the partition information fields to a longword value and varies based on the size of the "Number of Partition" and "Unsynchronized Partition" fields. The default size of this field is 1 byte and the value of this field is always 0. The Partition Information Padding field may vary from 0-24 bits to make the partition information end on a longword boundary.

All of the fields from Library Map ID down to Partition Information Padding reside in the RFID or MIC. Fields after this may reside on the media. This may be 40-44 bytes depending on the # of partitions on the media.

Time of First Media Write is a record of the first time data was written. This assumes the drive has a real time clock or the host can provide the time/date information. This may be used to determine when partially written media has aged enough that it may be starting to degrade written data and may be finished, partially cured around the written data, or fully cured and marked as NonAppendable. The time format is based on the UDF/ECMA 167 1/7.3 format except that it only provides granularity to the minute since this may be more than adequate for determining the effects on media.

```
Struct timestamp {
    Uint16      TypeAndTimezone
    Uint16      Year
    Uint8       Month
    Uint8       Day
    Uint8       Hour
    Uint8       Minute
}
```

All time fields in lower level structures use this same format.

Volume Serial Number is a unique number identifying the volume.

Overall Drive Statistics Size is the number of longwords in the drives statistics field. Maximum is 1023 bytes, but it is desirable to keep this short if RFID space is running low. The Overall Drive Statistics Size field may vary to accommodate any size of statistics field. The Statistics size+Statistics fields must end on a longword boundary.

Overall Drive Statistics Field is defined in the format generation section. This field maintains overall stats like serial numbers for the drives that have written the media, number of read/write/load/unload cycles, time parameters that may help determine overall media life, etc. The Overall Drive Statistics Field is nominally 255 bytes. The Overall Drive Statistics Field be shorter or longer. This Overall Drive Statistics Field includes Drive Stats Field determined by format generation. Includes Drive SN, Time in drive, number of r/w cycles, etc.

Library Map CRC covers the full Basic Map Information structure. In this example, the Library Map CRC is a CRC-32 format with polynomial $x^{32}-x^{26}+x^{23}+x^{22}+x^{16}+x^{12}+x^{11}+x^{10}+x^8+x^7+x^5+x^4+x^2+x^1+1$. It is initialized with 0xFFFFFFFF, input bytes and output CRC is reflected, and the output is XOR'd with 0xFFFFFFFF. This is the standard Ethernet CRC. If this fails, it is assumed this copy of the library map is bad.

Example 3

An example of partition description definition in accordance with one embodiment of the present invention is shown in Table 4 below.

TABLE 4

Partition Descriptor Definition

| Structures | Field | Size |
|---|---|---|
| Partition Descriptor (1 per partition) | Partition Descriptor ID | 32 bits |
| | Partition Descriptor Length in Bytes | 16 bits |
| | Partition Descriptor Revision | 8 bits |
| | Partition Data Type Code | 8 bits |
| | Partition Recording Mode Code | 8 bits |
| | Partition Status | 8 bits |
| | Drive Emulation Type | 8 bits |
| | Reserved = 0 | 8 bits |
| | Partition Number | 8 bits |
| | Previous Linked Partition Number | 8 bits |
| | Next Linked Partition Number | 8 bits |
| | Reserved | 8 bits |
| | Partition Start Book Address | 32 bits |
| | Partition Last Recorded Book Address | 32 bits |
| | Next Appendable Book Address in Partition | 32 bits |
| | Starting Chapter Number for Partition | 32 bits |
| | Last Chapter Number Written | 32 bits |
| | Next Appendable Chapter Number | 32 bits |
| | Starting Logical Block Address for Partition | 32 bits |
| | Last LBA Written | 32 bits |

TABLE 4-continued

Partition Descriptor Definition

| Structures | Field | Size |
|---|---|---|
| | Next Appendable LBA | 32 bits |
| | Time of first Partition Write | 8 Bytes |
| | Time of last Partition Update | 8 Bytes |
| | Partition Card Catalog Location | 8 bits |
| | Reserved = 0 | 24 bits |
| | Pointer to Most Recent Partition Card Catalog | 32 bits |
| | Offset to the next descriptor (in bytes) | 32 bits |
| | CRC covering this Partition Descriptor | 32 bits |

The Partition Descriptor ID field is a unique pattern to identify the start of a partition descriptor. The Partition Descriptor ID field is encoded in ASCII as "PART".

The Partition Descriptor Length in Bytes is the number of bytes in the full descriptor from the ID including the CRC.

The Partition Descriptor Revision is the revision of this particular partition descriptor, revisions can be mixed with different library maps. Also, different partition descriptor revs can be mixed within the same media. The revision for this PD is 0x80. Versions 0x80-0xFF are reserved for pre-production versions of this format.

The Partition Data Type Code is the partition data type. The partition type deals with the type of information in the partition.

The Partition Recording Mode Code defines the recording mode used within the partition.

The Partition Status field indicates if the partition has never been written, is partially written, is appendable, full, write protected, secure, or linked. The Partition Status field is encoded as shown below in Table 5:

TABLE 5

Partition Status Byte Definition
PARTITION STATUS BYTE DEFINITION

| 7 | 6 | 5 | 4 | 3 | 2 | 1 | 0 |
|---|---|---|---|---|---|---|---|
| Linked | Secure | Reserved | Valid | Status | | | |

In Table 5, for the entry "Linked": 0=not linked to any other partitions, 1=linked to another partition to create a single, logical partition. This linking is not visible to the host. For the entry "Secure": 0=anyone can read, 1=Some security policies will be used to determine readability of the data. The policies are dependent on the partition type and are defined in the partition description section. For the entry "Valid": 0=A write session has been opened on this partition, but has not yet been closed. This indicates that this partition descriptor and associated card catalog may not reflect the most recent write data in the partition and may be out of sync. This bit corresponds to the partition integrity map field in the Library Map. If the drive doesn't know of an open session and this is a 0, then recovery processes are required to resync the partition descriptor and the card catalog with the partition data. If this partition descriptor is written to the media, this field may be out of date since the media version of the Library Map isn't written until after the session is closed. The "Unsynchronized Partition Number" field in the Library Map supercedes this bit.

The Status Field is the current status of the partition where:
0=Empty—never been used
1=Not Used for PD 2=Appendable Has been written and can still be added to 3=Write Protected—User has write protected the cartridge 4=NonAppendable—Some recovery error or write timeout occurred on the partition and it can no longer be written to. It is not full and may not be cleanly finished 5=Recovered—Partition had a session closure error at some point. This partition was scanned and the PD & CC were resynchronized. It is possible that some or all of the data from the interrupted write session was lost during the recovery. This partition is no longer appendable and is read only.

6-14—Reserved

15=Full—Partition has been written to capacity.

For the drive emulation type field, the type of drive being emulated is defined via a code. Examples of drive types are holographic WORM, rewriteable holographic, holographic ROM, optical WORM, tape drive (e.g. LTO tape drive), DVD, etc.

The Partition Number is the number of this partition.

The previous linked partition number is the partition number proceeding this partition in a linked list of partitions.

The next linked partition number is the partition number for the partition succeeding this one in a linked list of partitions.

The Partition Start Book Address is the book address where the partition starts.

The Partition Last Recorded Book Address is the book address where the partition ends.

The Next Appendable Book Address in Partition is the book address where the next write may begin. This must take into account bookshelf and bookcase cures and skip the cured areas to fresh media. The next address in relation to the last written address will depend on the partition type and the recording mode. This field is ignored if the partition status is not=Empty or Appendable.

The Starting Chapter Number for Partition for non-linked partitions, this is always 0. For linked partitions, the Starting Chapter Number for Partition may be that a previous chapter ends in this partition, so this value is the first chapter that begins in this partition.

The Last Chapter Number Written is the last chapter that was verified written to this partition.

The Next Appendable Chapter Number is used for appends if supported in the current format generation.

The Starting Logical Block Address for Partition for non-linked partitions, this is always 0. For linked partitions, the Starting Logical Block Address for Partition may be that a previous logical block ends in this partition, so this value is the first logical block that begins in this partition.

The Last LBA Written is Last logical block address verified written to this partition.

The Next Appendable LBA is the next logical block address to be used in this partition if the format generation format supports append operations.

The Time of First Partition Write is a record of the first time data was written to this partition. The Time of First Partition Write may be used to determine when partially written partitions have aged enough that it may be starting to degrade written data and may be finished, partially cured around the written data, or fully cured and marked as NonAppendable.

The Time of Last Partition Update is a record of the last time this partition was written to. The Time of Last Partition Update may also be used for media management to ensure data integrity.

For the Partition Card Catalog Location, the card catalog may reside in the library map area directly succeeding this partition descriptor or it may be located in within the partition. The defined values are: 0=No card catalog included with this partition type, 1=Card catalog directly succeeds this partition descriptor, 2=Card catalog is in the partition, and 3-255—reserved The Pointer to Most Recent Partition Card Catalog field allows the HDS to find the card catalog for the partition in question. The meaning of the field depends on the card catalog location field as follows: If there is no card catalog, this field=0. If the CC follows the PD, this is the f of bytes from the start of this PD to the start of the CC. If the CC is in the media, this is a book page address of the most recent CC within the partition.

The Last LBA written in Partition is the last logical block address in the partition.

The Offset to the Next Partition Descriptor is the number of bytes from the beginning of this partition descriptor to the beginning of the next partition descriptor. These bytes may not be contiguous due to intervening card catalogs. If this is the last PD, this value is 0.

The Partition Descriptor CRC covers the fun Partition Descriptor structure. If this fails, it is assumed, this copy of the PD is bad.

Example 4

Table 6 shows types of partition recording modes in accordance with one embodiment of the present invention.

TABLE 6

Recording Modes

| Code | Description |
|---|---|
| 0x80 | Sparse, Full Books, Single Session, Fenced |
| 0x81 | Sparse, strong holograms = short books, multi-session, fenced |
| 0x82 | Sparse, Full Books, Multi-session, Not Fenced |
| 0x83 | Sparse, strong holograms = short books, Not Fenced |
| 0x84 | 1D Polytopic, Full Books, Multi-Session |
| 0x85 | 2D Polytopic, Full Books, Multi-Session |

The recording mode 0x80 is described as sparse, full books, single session, and fenced. In Table 6, "Sparse" indicates that there are no overlapped books. "Full Books" indicates that books are recorded with normal or maximum page density. Single Session indicates all of the books in the partition are recorded in a single session. The partition is considered finished and closed once the write session is completed. "Fenced" indicates that the session (which in this case is the same as a partition) is surrounded in all directions by unused, cured books. These cured books do not include partition data, but are considered part of the partition.

Since the data in the 0x80 mode is fenced, 0x80 mode partitions in the first row or track must be 3 tracks or rows wide, but do not need to be full tracks. The reason for the 3 row/track minimum is to provide a cured book fence around the partition to complete it. Partitions on subsequent rows/tracks are 2 rows/tracks wide to continue the full data barrier throughout the media. This barrier is used to increase the amount of time the media can be left partially written by increasing the diffusion distance required to begin degrading the user data.

Figure 7:
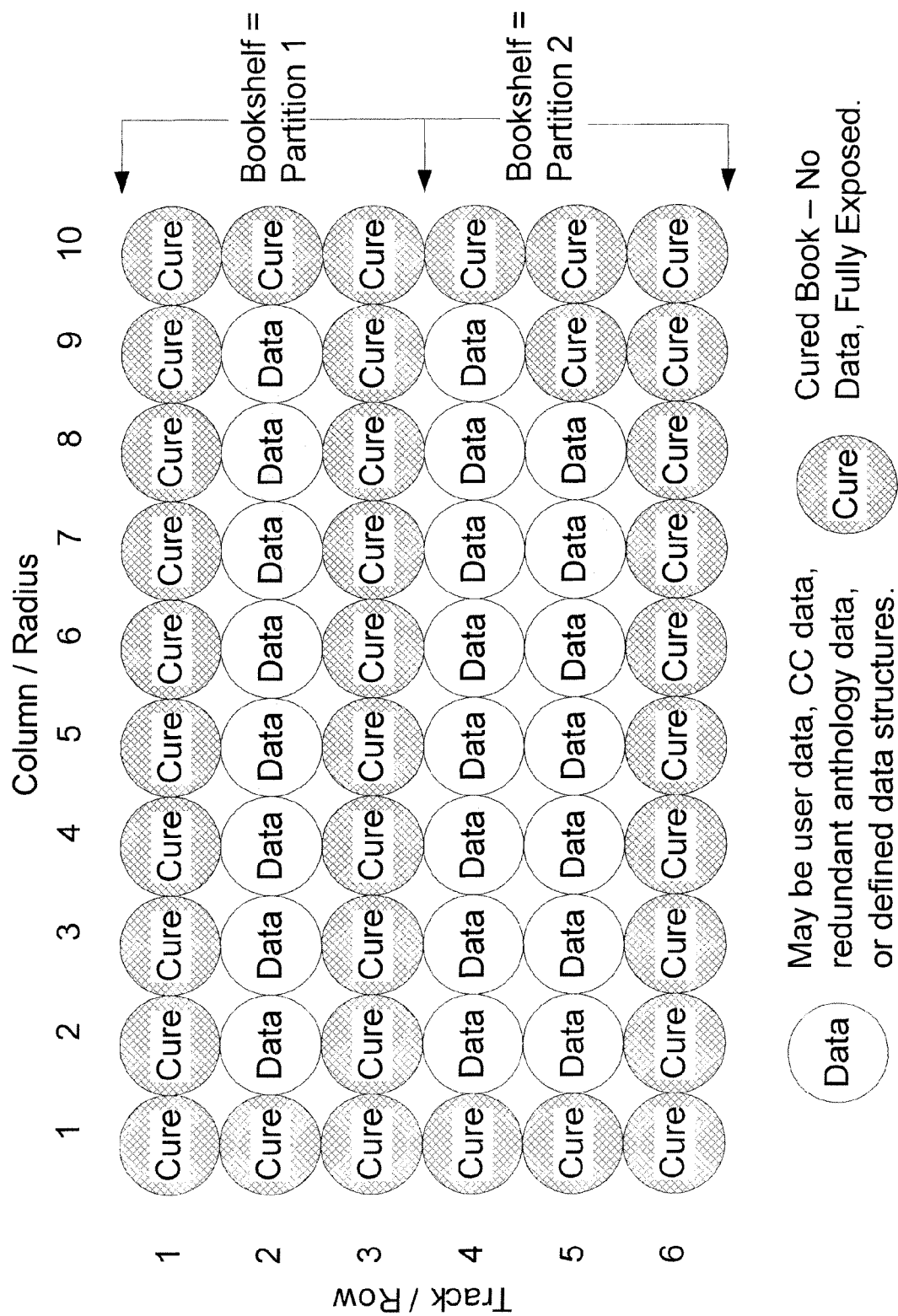
FIG. 7 is a schematic diagram showing an example layout of books written in 0x80 mode in accordance with one embodiment of the present invention.

FIG. 7 shows an example layout of partitions written in 0x80 mode. It shows 2 partitions of different sizes written next to each other. The cured books form a boundary around the actual data. The cured book locations contain filler pages, redundant library map information, or incoherent cured location—depending on the curing process selected by the system doing the writing.

During a 0x80 write session, the data books are written first. The cured book barrier is written last to complete the partition. For adjoining partitions, the cured books between the new session and an older session have already been written and don't need to be cured.

The method of writing a book is determined by the media type being used as defined in the library map. The media type dictates the pre-cure, post-cure, number of pages per book, and the write schedule. If there is not enough data to complete a book, extra pages that do not belong to a chapter are written per the write schedule to fill the book.

0x80 mode requires the entire partition to be written in 1 session. If there is not enough data to fill all of the books of the partition, books of filler pages that do not belong to any chapters are written until the partition is completed. Alternatively, the partition may be redefined to end where the bookcase ends and a new, empty partition created to save space.

Recording Mode 0x81 is described as Sparse, Strong Hologram—short books, multi-session, Fenced, No Servo Pattern. "Sparse" indicates no overlapped books. "Strong Hologram" indicates the books are short books i.e. fewer holograms are written per book using an extended write schedule to make them stronger. "Multi-session" indicates the partition supports multiple sessions, with each session surrounded by fencing. "Fenced" indicates that the data books written are surrounded in all directions by unused, cured books. These cured books do not include partition data, but are considered part of the partition.

The first session in a partition of type 0x81 is a write of at least 9 books, if only 1 book is data. The rest of the books are cured books for fencing. Each appended write consists of at least 1 data book and 5 additional cured books. This mode may be used for special data structures and the data for a single session often fits within a single book.

Figure 8:
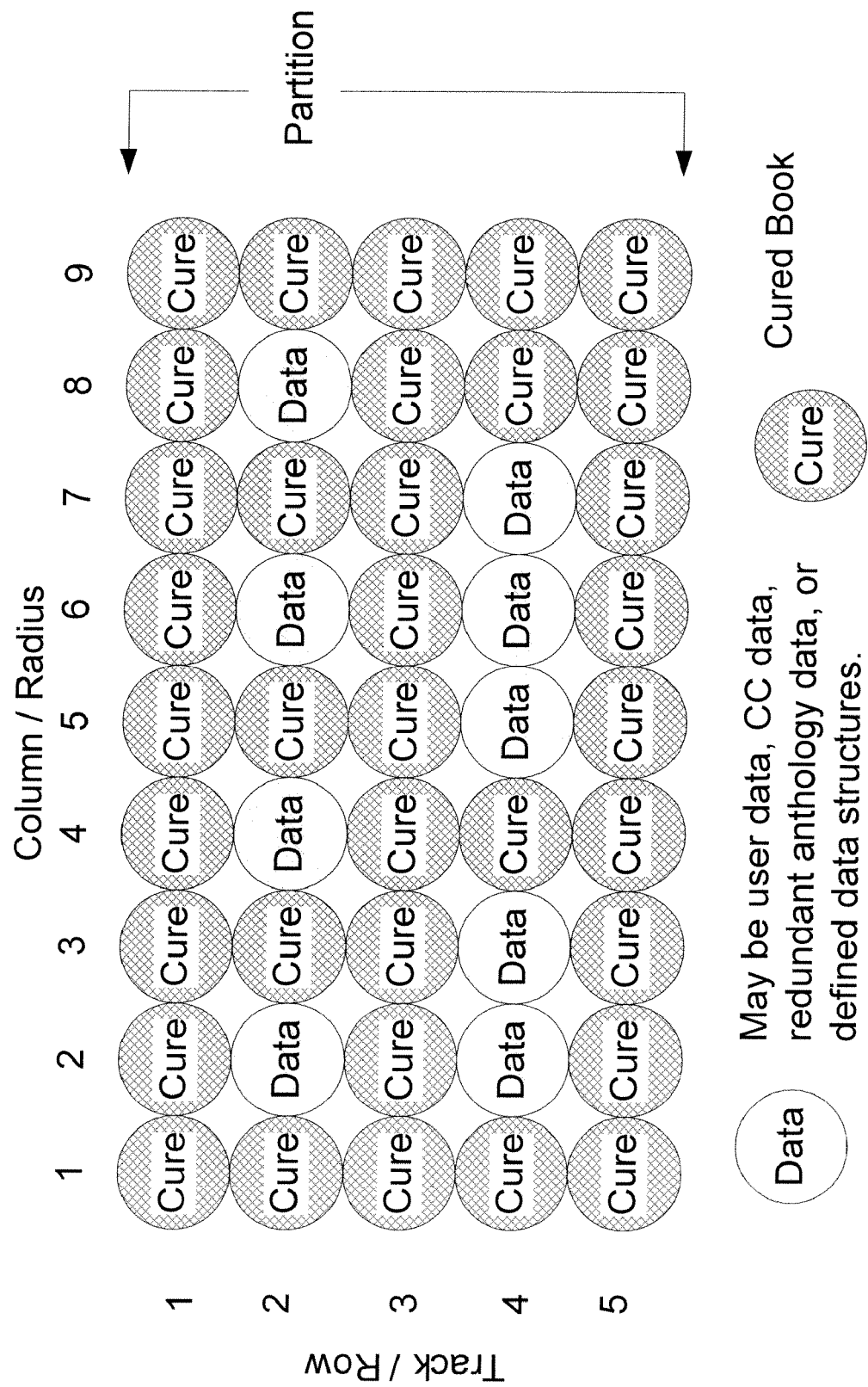
FIG. 8 is a schematic diagram showing an example layout of books written in 0x82 mode, a robust low density mode, in accordance with one embodiment of the present invention.

FIG. 8 shows an example of a 0x81 type partition which is a robust low density partition mode. In this case, a bookcase is the data book(s)+the surrounding cured book locations written in each session. The partition shown has 6 separate bookshelves, each bookshelf being the equivalent of a write session.

Figure 9:
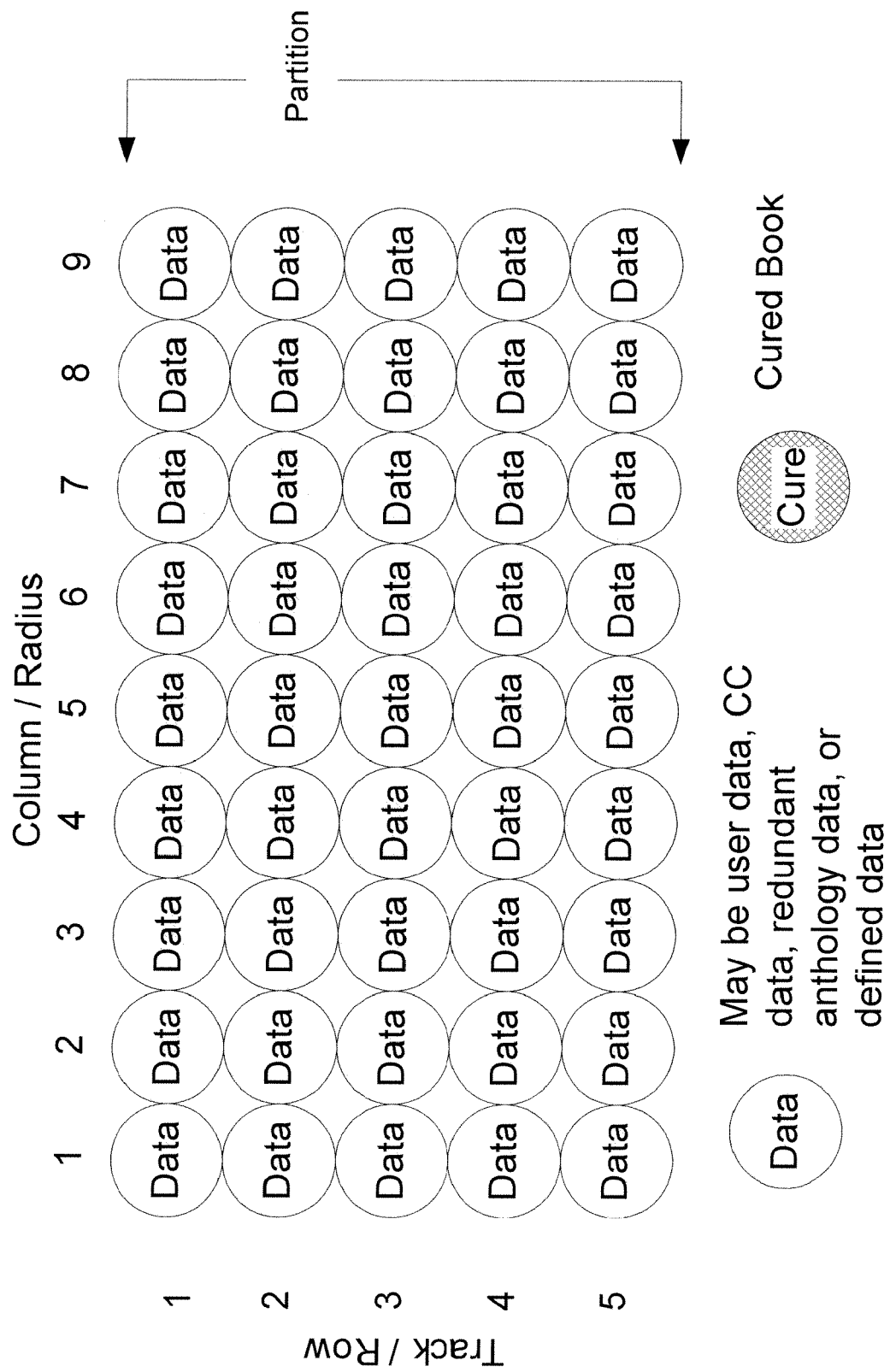
FIG. 9 is a schematic diagram showing an example layout of books written in 0x82 mode, a non-overlapped, full density mode, in accordance with one embodiment of the present invention.

Recording mode 0x82 is described as sparse, full books, multi-session, and not fenced. This is the same as recording mode 0x81, except there are no extra cured books between sessions. FIG. 9 shows an example of a 0x82 type partition.

Recording mode 0x83 is the same as mode 0x82 except fewer pages are written as stronger holograms. This increases the robustness of data recovery for this mode versus mode 0x82.

Figure 10:
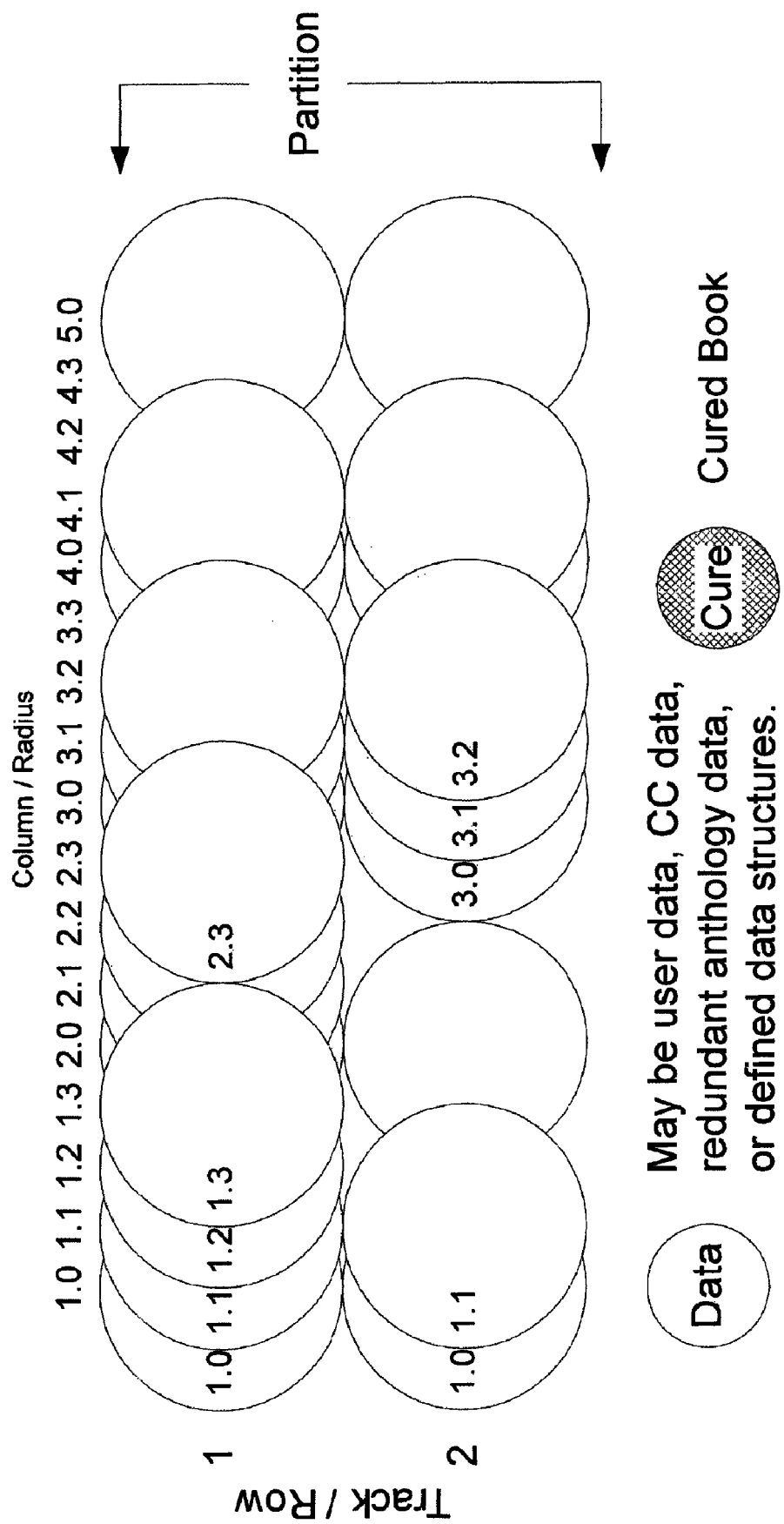
FIG. 10 is a schematic diagram showing an example layout of books written in 0x84 mode, a 1 dimensional polytopic mode, in accordance with one embodiment of the present invention.

Recording mode 0x84 is described as 1D Polytopic, full books, multi-session, not fenced. When recording in this mode, the books are overlapped in the bookshelf direction to increase the recording density. The overlap is defined by the factor N where N=the number of books recorded in the space of a single book at full density. In FIG. 10, N=4. this figure shows 3 sessions of books with the books in Track Row 1 comprising 1 session, books 1.0, 1.1, and 2.0 comprising a second session, and books 3.0, 3.1, 3.2, 4.0, 4.1, and 5.0 comprising the third session.

In mode 0x84, the sessions are finished by curing the total area covered by the books comprising the session. Some areas may need more cure time than others if they are not written to full density.

The recording order is very important in this mode. The books must be recorded so that the media is written uniformly. Wherefore, a book cannot be written until all of the books that it overlays (even partially overlays) are written. In the example of FIG. 10, session 2, book 1.1 cannot be written until both books 1.0 and 2.0 are written. For session 3, book 3.2 cannot be written until books 3.1 and 4.1 are written. Book 3.1 cannot be written until books 3.0 and 4.0 are written. Etc.

Figure 11:
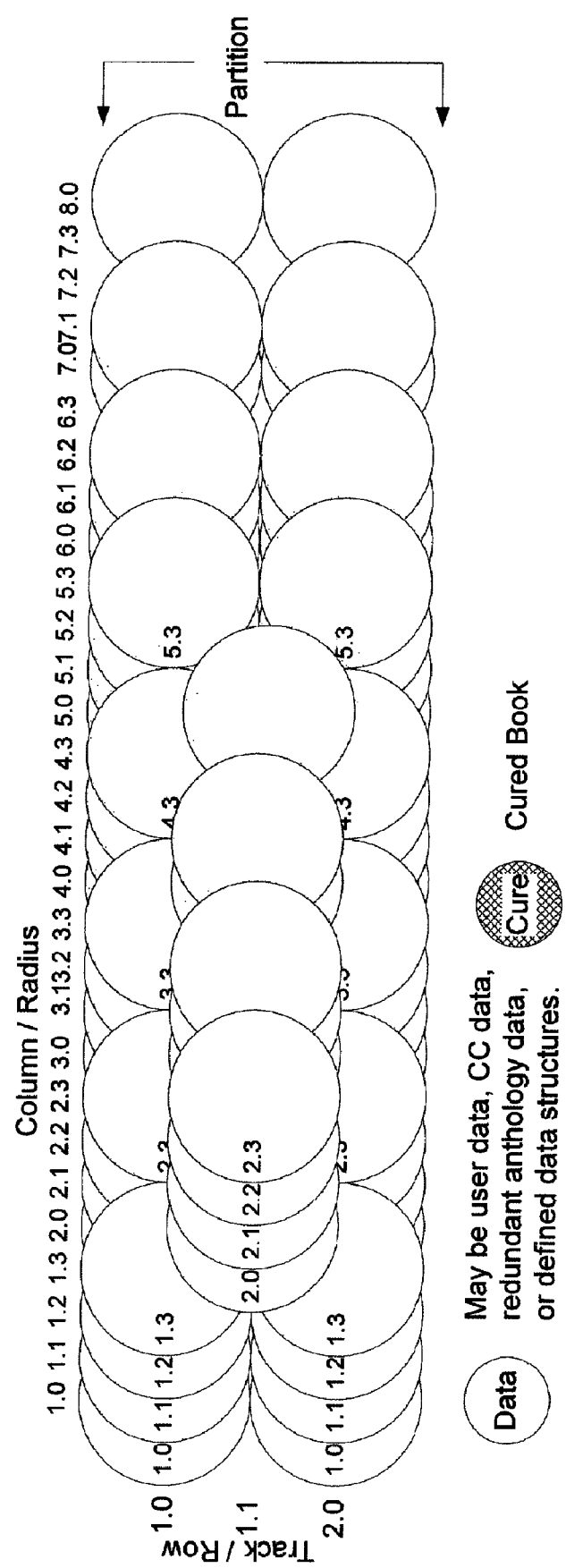
FIG. 11 is a schematic diagram showing an example layout of books written in 0x85 mode, a 2 dimensional polytopic mode, in accordance with one embodiment of the present invention.

Recording mode 0x85 is described as 2D Polytopic, full books, multi-session, not fenced. This is the 2D version of mode 0x84. In this case, the books are overlapped both in the bookshelf direction and between bookshelves. The overlap is defined by 2 parameters: N & M where N is the overlap in the bookshelf direction and M is the overlap across bookshelves. N*M=the total number of books recorded in the space of a single book. In FIG. 11, N=4 and M=2. This figure shows a single session. Additional sessions may be written in this mode, but they may not overlap spatially.

As for mode 0x84, a session is completed by curing the area covered by the bookcase. The areas that are not written at full density require more cure time than the areas that are written at full density.

As for mode 0x84, the recording order is important. The same rules apply where no book may be written until all books that it overlaps are written. In FIG. 11, the books in track 1.1 cannot be written until the book it overlaps in tracks 1 and 2 are written, respectively.

Example 5

For 1D polytopic multiplexing, the books are recorded in non-overlapped layer for uniform exposure of the medium. This process is also known as skip sorting. As an example, for the books recorded in FIG. 10, a possible recording order that meets this requirement is shown in Table A of FIG. 12. The addresses in the table match the books shown in FIG. 10. This is one possible write ordering that meets the requirements of uniform exposure using 1D polytopic overlap. In this scheme, each track is written separately. Also, each book is written 1 full book spacing away from the previous book. There are other schemes, but this scheme is advantageous in that it builds up to the deepest layering most quickly since it returns to the beginning of the row or track as soon as a lower layer is completed enough for a book to begin the next layer.

For 2D polytopic multiplexing, the same rule applies as far as uniform exposure and layering. An example book write ordering is shown in Table B of FIG. 12 that corresponds to the 2D polytopic recording shown in FIG. 11. This is one possible book write ordering that meets the requirements of uniform exposure using 2D polytopic overlap This example shows 8 layers. Only 1 book (address 1.1/2.3)_ is in the $8^{th}$ layer. This recording ordering also forces a full spacing for each new book write and also returns to the track row start as soon as possible to begin each new layer as soon as enough of the lower layers have been recorded. It is noteworthy that at the start of the bookcase, 4 books are lost in track/row 1.1 because the lower 4 layers built on tracks/rows 1.0 and 2.0 are not all present. If a full track is written in a disk format, it is possible to gain those 4 books back when the books to the left of books 1.0/1.0 and 2.0/1.0 are filled.

Example 6

Table 7 shows partition data types in accordance with one embodiment of the present invention.

TABLE 7

Partition Data Types

| Code | Description |
|---|---|
| 0x80 | User Data |
| 0x90 | Drive Data - Library Map, Media Information, Drive Information, Bad Map, Calibration, Interchange data, . . . |
| 0xA0 | Drive Firmware/Mode Parameters |
| 0xB0 | Spare Books |
| 0xF0 | Cured Filler Books - Used to fill out the extra books on the media. |

User data type 0x80 includes support for user data written in chanter format. The card catalog for this mode resides at the end of the user data and is also protected by chapter ECC. Anthology ECC is also supported for this type as an option. The Single Session Card Catalog format is used for user data type 0x80 partitions. FIG. 13 shows a single-session user data layout for short session 1302 and a single-session user data layout for a long session 1304. Sessions 1302 and 1304 are each made up of a card catalog books 1312, user data books 1314, and redundant books 1316.

For data type 0x80, the user data 1314 is written first followed by the card catalog 1312. As necessary, redundant anthology chapters 1316 are added during the write. After this write is completed, the session is closed and no appends are allowed to the partition. The library map is updated after every write session.

Drive data type 0x90 includes all internal drive information types. The library map portion of the drive data contains the library map structure+partition descriptors. The library map partitions may also include card catalog and drive emulation tables. Other data that is classified as drive data include media information, drive information, drive statistics, bad mapping, and interchange/calibration information. The drive data is arranged in well defined structures so that it can be decoded and listed in any order in a drive data partition.

Each update of drive data structures in a drive data partition supercedes previously written structures of the same type. For example, if there are multiple instances of the library map in the partition, the last library map is the most recent. Drive data may be written in a recording mode supporting multiple sessions in a partition such as recording mode 0x81.

Drive data is recorded in chapters with ECC protection. The chapter level redundancy is selectable based on the number of pages available in a book, the system type, and the format generation.

Drive data is for internal drive operation and is not accessible by the host except by special command.

Drive Firmware/Mode Parameters Type 0xA0 consists of different type of microcode or downloadable hardware images that may be used to program and operate the drive. Mode parameters may also be downloaded to the drive from the media. These parameters control the drive's operating mode and personality. This method may be used to upgrade drives or to customize them for specific customers and applications and to customize security features.

With respect to Spare Book Partition Type 0xB0, one or more partitions may be allocated to replace bad books that are found to be going bad during reading and may be used in a bad book mapping process.

Example 7

Table 8 shows a definition of a single session card catalog in accordance with one embodiment of the present invention.

TABLE 8

Single Session Card Catalog Definition

| Structures | Field | Size |
|---|---|---|
| Card Catalog Header | Card Catalog ID | 32 bits |
| | Card Catalog Header Length in Bytes | 8 bits |
| | Card Catalog Revision | 8 bits |
| | Partition Number | 8 bits |
| | Reserved | 8 bits |
| | Pointer to next CC in Partition | 32 bits |
| | Card Catalog Starting Book Address | 32 bits |
| | Card Catalog Last Book Address | 32 bits |
| | CC Starting Chapter Number | 32 bits |
| | CC Last Chapter Number | 32 bits |
| | CC Starting LBA | 32 bits |
| | CC Last LBA | 32 bits |
| | Total Number of Anthology Binding Entries | 16 bits |
| | Size of Each Anthology Binding Entry | 16 bits |
| | Total Number of TOC Entries in Card Catalog | 16 bits |
| | Size of each TOC Entry | 16 bits |
| | CC Header CRC | 32 bits |
| Anthology Binding Entries (1 per Anthology) | Anthology Binding Header | 16 bits |
| | Total Chapters in Anthology | 8 bits |
| | Number of Redundant Chapters | 8 bits |
| | Starting Chapter Number | 32 bits |
| Table of Contents Entries (1 per book) | TOC Header | 16 bits |
| | Status Byte | 8 bits |
| | Reserved | 8 bits |
| | Physical Book Address | 32 bits |
| | Number of Pages in the Book Written | 16 bits |
| | Page Address of first Full Chapter Start | 16 bits |
| | Chapter # of First Full Chapter | 32 bits |
| | First LBA Start in 1$^{st}$ Full Chapter | 32 bits |
| Card Catalog Footer | CRC over entire SSCC structure | 32 bits |

The Card Catalog ID is a unique pattern to identify the start of a card catalog data structure. The Card Catalog ID is not necessarily an SSCC and is encoded in ASCII as "CARD".

The Card Catalog Header Length in Bytes is the number of bytes in the card catalog header including the ID and CRC.

Card Catalog Revision is the revision number of this card catalog. For SSCC, the Revision=0x80.

The Partition Number refers back to the partition number this card catalog belongs to. The Partition Number is used as a check when pairing up PD's from the library map and card catalogs.

With respect to the Pointer to Next card catalog in Partition, if this card catalog is included in the library map, this is the byte offset from the start of this card catalog to the start of the next. If this card catalog is on the media, this is the physical address of the next card catalog. If this is the last card catalog in the partition, this field is 0.

The Card Catalog Starting Book Address is the first physical book address that has a table of contents entry in this card catalog. It usually is the first physical address in the partition, but it doesn't have to be if there is a reason that some of the addresses have been skipped.

The Card Catalog Last Book Address is the last physical book address that has been written belonging to this card catalog.

The Card Catalog Starting Chapter Number is the first chapter number recorded in the books described by this card catalog.

The Card Catalog Last Chapter Number is the last chapter written that belongs to this card catalog.

The Card Catalog Starting Logical Block Address is the first logical block address recorded in the books described by this card catalog.

The Card Catalog Last Logical Block Address is the last logical block address written that belongs to this card catalog.

The Total Number of Anthology Binding Entries is the number of anthology binding entries that immediately follow the card catalog header structure.

The Size of Each anthology binding entry is the number of bytes of each AB entry.

The Total Number of table of contents Entries is the number of table of contents entries that immediately follow the final AB entry. If there are no anthology binding entries, this follows the card catalog header structure.

The Size of Each table of contents entry is the size in bytes of each table of contents entry that follows.

The CARD CATALOG Header CRC is the 16 bit CRC of the card catalog header to check the validity of the contents. This is the same CRC method used for the Library map and partition descriptors.

The anthology binding header is the fixed value to indicate the start of an Anthology Binding entry. Set="AB".

The Total Chapters in Anthology is the number of chapters contained in the anthology including the redundant ones. The final chapter number in the Anthology can be calculated by adding the starting chapter number+the total chapters.

The Number of Redundant Chapters is the number of redundant or parity chapters in the anthology.

The Starting Chapter Number is the starting chapter number for this Anthology.

The table of contents Header is the field to identify the start of a table of contents entry. Set="TC".

The TOC Status Byte describes the status and contents of the book as shown in Table 9 below.

TABLE 9

| TOC Status Byte: | |
|---|---|
| Bit | |
| 7-4 | 3-0 (lsb) |
| Def Book Density | Book Status |

| | |
|---|---|
| Book Density: | 0 = Full Density for format |
| | 1 = Low Density for format |
| | 2-3 = Reserved |
| Book Status: | 0 = Unused/Unexposed |
| | 1 = Partially Filled - Data |
| | 2 = Fully Filled with data - no final cure |
| | 3 = Partially filled with data - Filled out and Cured. |
| | 4 = Fully filled with user data and Cured |
| | 5 = Mapped Out - Bad |
| | 6 = Cured Filler Book - No user data |
| | 7-15 = Reserved |

The Physical Book Address is the address of the book being described by this entry.

The Number of Pages in the Book is the number of informational pages recorded in the book. This includes filler pages that are in a chapter but does not include filler pages that are not part of a chapter. This assumes that the pages always begin recording at page address 0 in the book. This field is ignored if there is no data in the book.

The Page Address of First Chapter Start in the Book is the page number within the book where the first full chapter starts in the book. This is set 0xFFFF if there are no chapter starts in the book. This field is ignored if there is no data in the book.

The Chapter Number of the First Chapter Start in the Book is the first chapter number that starts in the book. If there are no chapter starts in the book, this field is set the chapter that is recorded in the book. If there are no chapters in the book, it is set=0xFFFF. This field is ignored if there is no data in the book.

The First Logical Block Address Started in the Book is the first logical block address in the first user chapter start. If there is no chapter start in the book or if all chapters in the book are redundant anthology chapters, this field is ignored and set=0xFFFFFFFF. This field is ignored if there is no data in the book.

The CRC For SSCC Structure is over the entire Card Catalog including the header and all table of contents entries. Same CRC polynomial as used for the Library Map. The Card Catalog is invalid if the CRC fails.

Example 8

Figure 14:
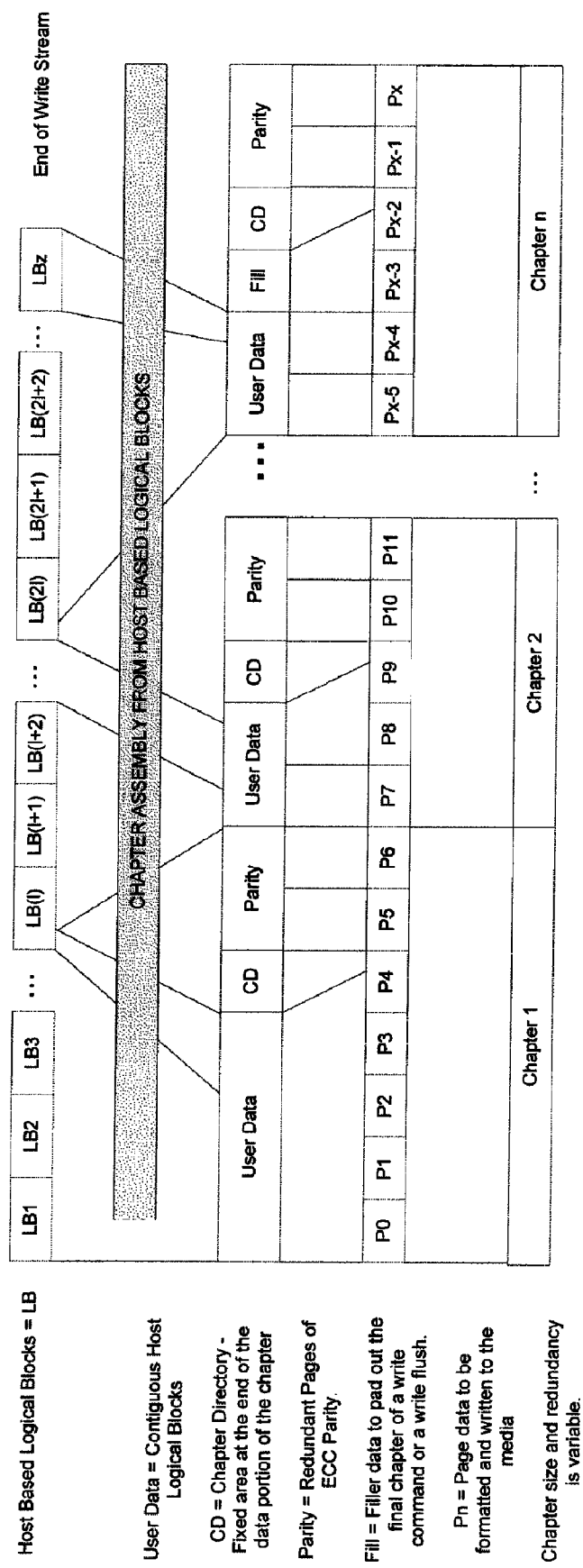
FIG. 14 is a diagram showing an example of the assembly of a chapter of user data assembled from host logical blocks in accordance with one embodiment of the present invention.

FIG. 14 shows an example of the assembly of a chapter of user data assembled from host logical blocks. Logical block data is mapped into a chapter sequentially until the chapter's user data space is filled except for the fixed area for the Chapter Directory. If there is not enough user data to fill a chapter, filler data is inserted to complete the chapter. The chapter directory is then added along with the parity pages. The entire chapter must be completed before it can be written to the media.

If there isn't enough data to fill a chapter and the current write command has completed (all of the write data has been transferred to the drive), the last unwritten chapter may stay in the buffer for a programmable amount of time awaiting another write request. If a flush or other command comes in causing the write buffer to be emptied, the chapter is completed with filler data and written. The amount of time the drive will wait with write data in the buffer is based on mode settings and media type.

Example 9

A chapter format, Chapter Format 0x80, according to one embodiment of the present invention uses Reed Solomon correction. Chapter lengths are variable and the redundancy is also variable. Chapter format 0x80 assumes that it is used with a page format that uses an ECC or outer code with one or more codewords at the page level that provide CRC erasure information. Page Formats 1 and 2 described below, using a Turbo Convolutional Code fit this requirement.

Long chapters are desirable from an overhead standpoint, but long chapters can lead to increased access time in the case when chapter level error correction gets invoked, since the entire chapter needs to be read in to perform correction before any user data is available.

Example 10

Figure 15:
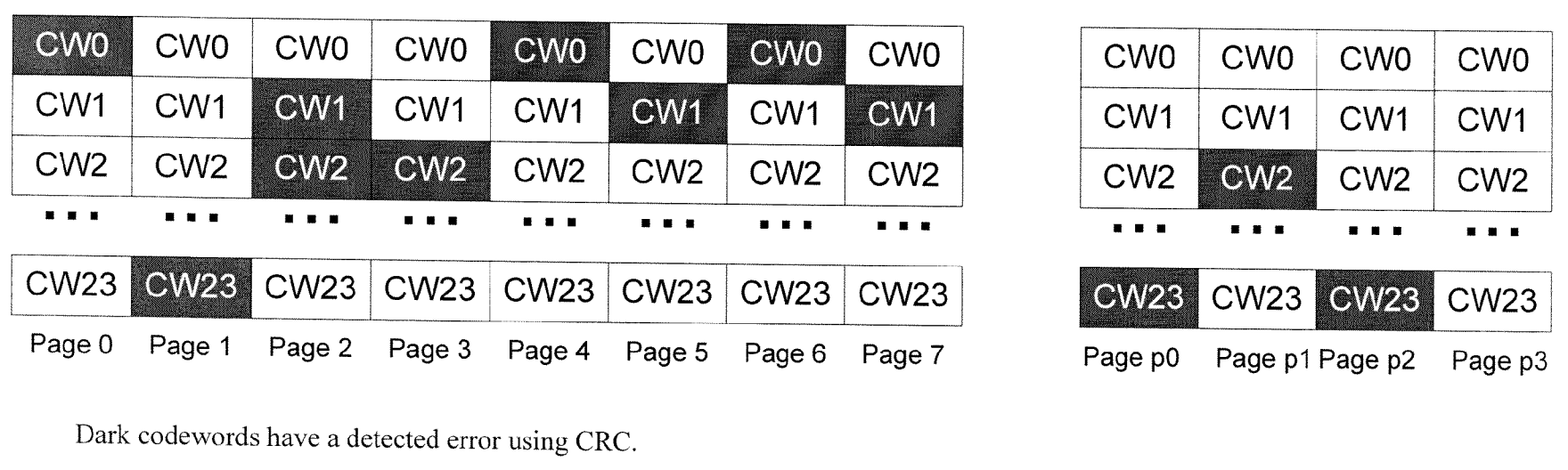

FIG. 15 illustrates an example of chapter ECC and the increase in correction power when using multiple page level codewords with their own erasure indicators.

In the example of FIG. 15, the chapter length is 12 pages including 4 parity pages. Each page is split up into 24 turbo convolutional code words of user data. The turbo convolutional code decoder provides a CRC at the end of each codeword on the page to provide an indication of whether that codeword has an error in it or not. If it was not correctable at the page level, the turbo convolutional code CRC failure is used as an erasure pointer. In the example, each red turbo convolutional code codeword is assumed to have an erasure error.

The example of FIG. 15 shows an error pattern through the chapter that is fully correctable via chapter level ECC even though only 1 page of the chapter was correctable at the page level. The reason it is fully correctable is that there are never more than 3 (P−1) codewords in error in each chapter level codeword. Chapter level codewords are built horizontally across this illustration.

In order to take advantage of the increased chapter correction power via multiple page level codewords, the chapter format layer requires knowledge about the number of page level codewords, their size, and erasure results from the current page format.

Example 11

In one embodiment of the present invention, chapter directories have a size that is a multiple of 512 bytes. When a chapter is started, the last 512 bytes of the chapter are reserved for the chapter directory. If the primary chapter directory is filled, the 512 bytes prior to the primary chapter directory are allocated. This process continues until the user data in the chapter meets the current chapter directory and fills up the chapter. The chapter directory format is shown in Table 10 below.

TABLE 10

Chapter Directory Definition
Chapter Directory Definition

| | Field | Size |
|---|---|---|
| CD Header | Chapter Directory ID | 32 bits |
| | CD Header Length in Bytes | 8 bits |
| | CD Revision | 8 bits |
| | Data Type | 8 bits |
| | Reserved | 8 bits |
| | Number of Block Descriptors | 16 bits |
| | Number of Bytes Per BD | 16 bits |
| | Chapter Byte Count | 32 bits |
| | Digital Rights Management | 64 bits |
| | Pointer to Next CD Field in this Chapter | 32 bits |
| | Chapter Number | 32 bits |
| | CD Header CRC | 16 bits |
| Block Descriptor(s) | Control Byte | 8 bits |
| | Reserved | 24 bits |
| | Logical Block Address | 32 bits |
| | Byte Offset into Chapter | 32 bits |
| | Size of Block | 32 bits |
| | Number of Blocks | 32 bits |
| CD Footer | CD Filler Bytes | N Bytes |
| | CD CRC | 16 bits |

There is one chapter directory header per chapter directory block. The values may be duplicated in each chapter directory header except for the Pointer to next chapter directory field.

Chapter Directory ID is the Fixed field to indicate that this is a chapter directory structure. Set="CDIR".

Chapter directory Header Length in Bytes is the number of bytes of the chapter directory Header from the directory ID through the chapter directory header CRC.

Chapter directory Revision is the revision of this chapter directory type which is 0x80.

Data Type is the type of data contained in the chapter. Data types may not be mixed within a chapter (or a partition). This field is used for the potential case that real time constraints or security policies are to be by the system based on data type. User Data=0

Number of Block Descriptors is the number of valid block descriptors contained in this chapter directory. This includes block descriptors in additional chapter directory structures within the chapter, if any. This can=0 if there are no valid logical blocks starting within this chapter.

Number of Bytes per BD is the number of bytes in each block descriptor.

Chapter Byte Count is the byte count of user or "useful" data within the chapter. It doesn't include filler bytes used to complete the chapter.

Digital Rights Management is a field that may be used to protect the content of this chapter through encryption, or limit access to the data by unauthorized users.

Pointer to Next chapter directory Field in this Chapter is a signed offset in bytes froin the beginning of this chapter directory header to the beginning of the next chapter directory header. This will often be a negative number (−512) since the chapter directory's grow from the end of the chapter.

Chapter Number is a 32 bit chapter number. The chapter number may correspond to the chapter number found in the page header for each page in the chapter.

Chapter directory Header CRC is 16 bit CRC to protect the chapter directory header. This is the same CRC as used for the Library Map and other structures used with this chapter directory.

There may be as many block descriptors within a chapter directory structure as will fit within the 512 byte boundary. If additional block descriptors are needed, a new chapter directory structure is allocated for them. The block descriptor is ignored and zero filled for redundant anthology chapters.

Each block descriptor defines the mapping of one or more logical blocks within the chapter. The block directories may be nested to allow for logical block mapping into compression blocks in the chapter.

Field Definitions

Control Byte defines the boundaries and information type of the logical block described by this block descriptor. Field definitions for the control byte are shown in Table 11 below:

TABLE 11

Field Definitions for Control Byte

| | Bit | | | |
|---|---|---|---|---|
| | 7 (msb) | 6 | 5 | 3-0 (lsb) |
| Def | Start | End | In Compr | Info Type |

Start: 1 = Data defined by this block descriptor starts in this chapter.
End: 1 = Data defined by this block descriptor ends in this chapter.
In Compr: 1 = Data defined by this block descriptor is the logical block address mapping within a compression block.
Info Type: 0 = User Data, non real time
1-15 = Reserved for other user data types (May include real time, copyright protected, . . . )
16 = Padding
17 = Filemark
18 = Compression Type 1
19 = Compression Type 2
20-31 = Reserved Logical Block Address is a host defined logical block address. This is the first LB that starts in the chapter. If no logical blocs start in the chapter, then it is set to the logical block address of the block that is in the chapter. The maximum number of logical block addresses supported is 4 G. This field is ignored if there isn't any user data referenced by this block descriptor (i.e. padding).

Byte Offset Into Chapter is the start of the logical block being described from byte 0 of chapter. This field is ignored if the block doesn't begin in the current chapter.

Size of Block is the size of the logical block or compression block being described. It may span into the next chapter. For fixed block mode, this will always be on a 512 byte boundary. For variable block mode, this can be any value. Maximum block size supported is 4 GB.

Number of Blocks is the number of contiguous blocks of the same size and type in the chapter. The last block may span into the next chapter.

The chapter directory footer completes the chapter directory structure and is used to align the chapter directory on a 512 byte boundary.

chapter directory Filler Bytes are the filler bytes to fill out the 512 byte structure from the last block descriptor to the chapter directory CRC field. Only full block descriptors are allowed in a chapter directory, so if a block descriptor is available, but cannot fit in this space, filler bytes are used. These are all set=0.

chapter directory CRC is 16 bit CRC to protect the chapter directory structure. This may be the same CRC as for the Library Map used with the chapter directory.

When additional chapter directories are required to describe a chapter, the full chapter directory structure+new block descriptors are used including filler to fill out the 512 byte structure.

Example 12

In one embodiment of the present invention, the chapter number field resides in the page header. The chapter number field is 32 bits long with the top 8 bits describing the chapter type and the lower 24 bits the chapter count.

The chapter count starts at 0 in the beginning of each non-linked partition.

The chapter type field is redundant with card catalog information and may not be used, but is helpful for recovery if the card catalog, partition descriptor, or the library map is corrupted and unrecoverable. It may also be helpful to the lower level channel it different data types are to be treated differently. In general, the logical portion of the drive requests data by the lower 24 bit chapter number. The chapter type field is defined in the Table 12 below.

TABLE 12

Chapter Types
Chapter Bit Field Definition

| Type | 31-24 | 23-16 | 15-8 | 7-0 |
|---|---|---|---|---|
| User Data | 0 | Chapter Number (Big Endian) | | |
| Redundant Anthology Chapter | 1 | Chapter Number (Big Endian) | | |
| Filler Chapter | 2 | Unused - set = 0 | | |
| Library Map Chapter | 3 | Unused = 0 | Library Map Counter | |
| Card Catalog Chapter | 4 | Chapter Number (Big Endian) | | |
| Data Chapter without CD | 5 | Chapter Number (Big Endian) | | |
| Reserved | 0x6-0x7F | Unused - set to any value | | |
| Data Page Not Part of a Chapter | 0x7F | Unused - set to any value | | |
| Invalid | 0x80-0xFF | Upper bit must always be = 0 (Barcode header limitation). | | |

Redundant anthology chapters follow the chapters that they are protecting. They are numbered sequentially with user chapters. The card catalog helps the drive locate and skip these chapters unless they are needed for recovery.

Filler chapters may be used when curing using data pages or filling out the data portion of an anthology.

Library Map chapters contain the library map. The counter is incremented from 0 following each library map update on write once media. This counter is used to help determine the most recent library map version.

Reserved chapter numbers are used to indicate pages that aren't part of a chapter. An example is pages that are parts of multi-page writes used for testing purposes that don't include chapter protection.

Example 13

A page format, Page Format 1, of the present invention is based on a 1280×768 pixel SLM (A Spatial Light Modulator from the Manufacturer Displaytech™ This page format designed conservatively with a high code rate and large margins at the edges of the page. The components of the page format include: page layout, page header, data areas and tiling, ECC code and interleaving, and randomization.

Figure 16:
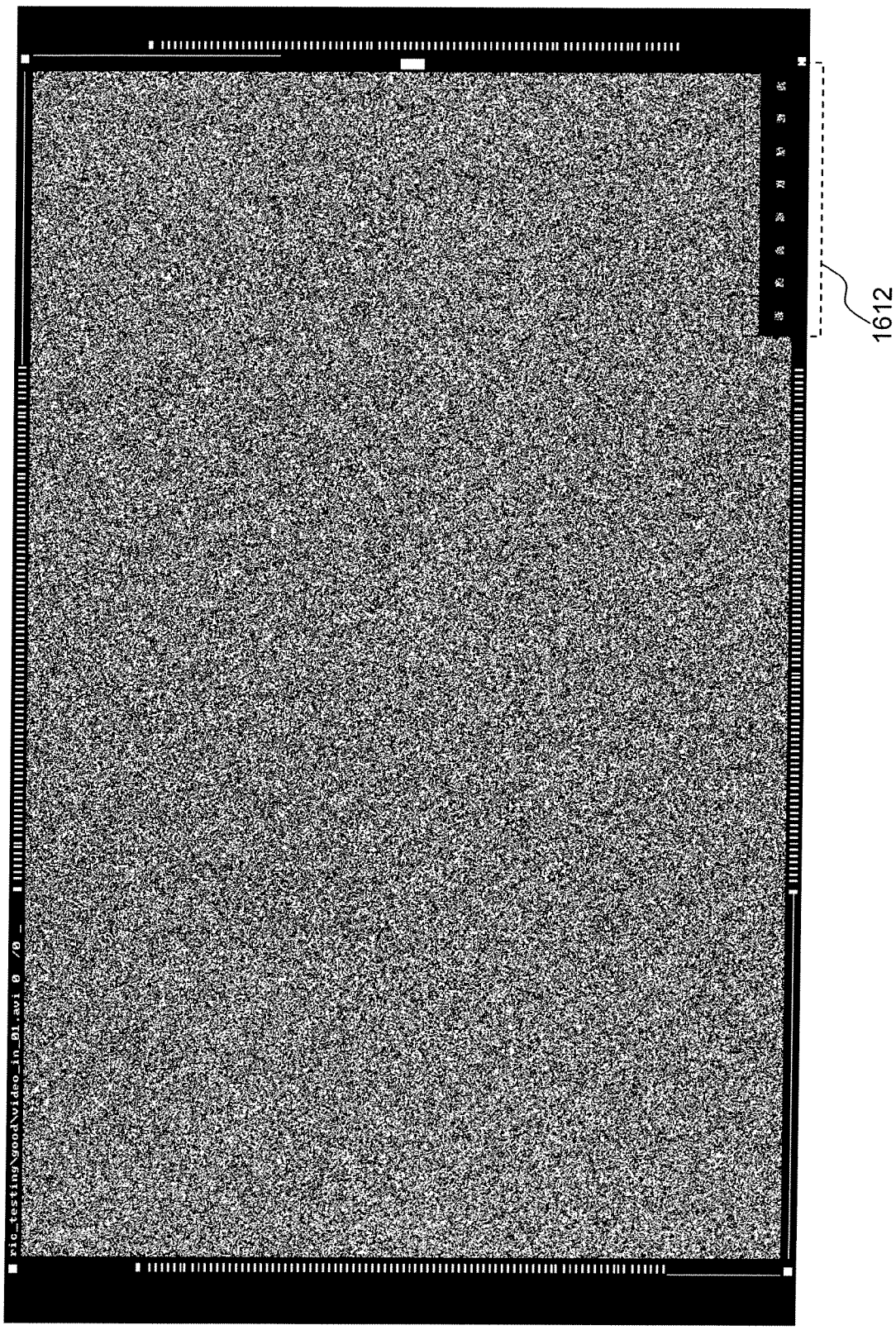
FIG. 16 is an image of a full page format in accordance with one embodiment of the present invention.

FIG. 16 shows an encoded page for the page format of this example. The encoded page consists of a 16 pixel border on the top and bottom of the image and a 64 pixel border on the left and right sides. Alignment marks, filename & page address, and the encoded page headers are located in the border areas. The data area is made up of 820, 32×32 tiles.

Figure 17:
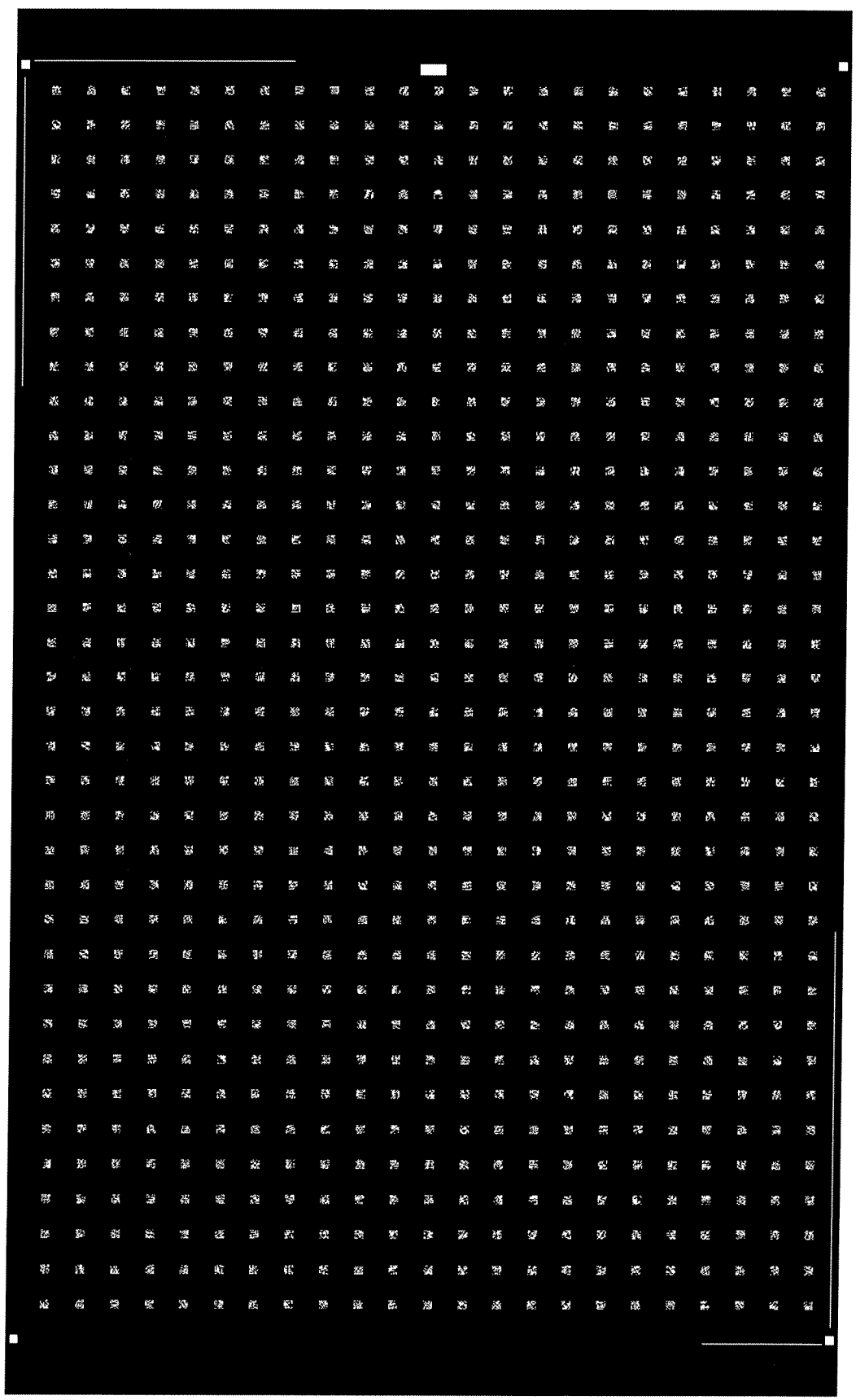
FIG. 17 is a skeleton image of a page format in accordance with one embodiment of the present invention.

FIG. 17 shows the base "skeleton" image layout. The page starts out with this image as a background and the filename, book/page number, page header, and encoded data is overlaid onto the skeleton image.

The components of the data page format for this example are described below.

Referring to FIG. 17 the alignment marks are shown in the borders of the image. These alignment marks are used only for visual alignment using bio-feedback. They are not used by the system for data page alignment or recovery.

The alignment marks consist of 8×8 squares located at 48,4; 1223,4; 48,755; and 1223,755. There are also single pixel vertical and horizontal lines coming off of the upper right and lower left alignment marks. There is also a 10×24 fiducial at 1217,372.

FIG. 16 shows the source filename and book/page address written in an 8×8 font in the upper left corner of the image. This data is encoded and added by the software/firmware when the page is formatted. Again, this data is used only for visual information and identification of the hologram. It is not used in the page decoding process. The source filename and path can be up to 32 characters. If the pathname/filename is longer than that, it is truncated from the left. The book/page address can be up to 999/999. This doesn't limit the actual address since it is in the header—it is just the limit of the fields reserved for this information.

The page header is used for page identification to ensure the physical address of the page matches the drive's version of the physical address. It also indicates the page format type being used and provides the information to place the page within the chapter. The page headers are located in the border areas of the page.

The page headers are differentially encoded and located in all 4 of the page margins (see FIG. 16). This header format has been dubbed "barcode". There are 2 separate barcode fields that are duplicated for redundancy. The top and left headers are the same as are the bottom and right headers.

All of the barcode headers are encoded in the same way. The only difference is the definition of the data fields within them.

A barcode header is 512×8 pixels (8 rows tall for horizontal headers and 8 columns wide for vertical headers). Each row (column) is redundant to allow the header to be read with extreme misalignment.

Each header begins with an 8 pixel start block. The start block is use to detect the start of the header and for gross alignment of the page. Even numbered pages have a start block of 11110000 and odd numbered pages have a start block of 00001111. These alternate to avoid fixed patterns on the SLM and to reduce the correlation noise between these pixels in adjacent pages.

The next 504 pixels of the header is the data field. There are 84 bits of data encoded as 6 pixels per bit. Each bit is encoded as follows:

00—spacing from the previous bit/field
    0011=0
    1100=1

For odd pages, these bits are all inverted (including the spacing). This is done for the same reason as inverting the start block.

The 84 data bits are defined as follows:
    64 encoded bits used for header data
    16 encoded bits for CRC
    4 encoded bits set=0 to round out the header to an even 512 pixels The top barcode header is located at the following coordinates: 416, 4; 927, 4; 416, 11; 927, 11. The left bar code is located at: 50, 128; 57, 128; 50, 639; 57, 639. The 64 bit information field+CRC in the top/left barcode is formatted as big Endian and defined in Table 13 below:

TABLE 13

Top/Left Header Fields
Page Header

| Field | Bits | Description |
|---|---|---|
| Page Format Code | 8 | Page Format Version (= 0), The MSB is supposed to be set = 0, so only page formats 0-127 are valid. |
| Page within Book/Write angle | 16 | Page Number in book |
| Book Number | 16 | Book number on media given by media type. |
| Randomizer Seed | 16 | Lower 16 bits of seed consisting of the following subfields:<br>1st 8 bits are an incrementing image tag (mod 256 starting from the first page written since last drive reset)<br>Next 4 bits = 0.<br>Last 4 bits = Slibrary map Buffer Number that was used (mod 16). |
| Data Type | 8 | Normal User Data = 0. This field is used by the channel to determine how to treat the data. This can be used to denote real time data or security features that are implemented at the physical level of the holographic storage device. An example is limiting retries or performing faster, less robust recovery algorithms on real time, lossy data. |
| Header CRC | 16 | CRC-16 over entire header field |
| Total Header Size | 80 bits | Corresponds to 480 pixels |

The bottom barcode header is located at the following coordinates: 416, 756; 416, 763; 927, 756; 927, 763. The right barcode is located at: 1228, 128; 1235, 128; 1228, 639; 1235, 639.

The 64 bit information field plus 16 bit CRC in the bottom/right barcode is formatted as big Endian and defined in Table 14 below:

TABLE 14

Bottom/Right Page Header
Page Header

| Field | Bits | Description |
|---|---|---|
| Chapter Number | 32 | This field is defined for this chapter, see Table 12 of Example 11, for example. The MSB must always be 0. So, in the chapter type field, only values 0-127 are valid |
| Total Pages in Chapter | 8 | Maximum = 256 |
| Page Number in Chapter | 8 | Count starts at 0 |
| Number of Parity Pages | 8 | Parity pages included in this chapter |
| Unused | 8 | Set = 0 |
| Header CRC | 16 | CRC-16 over entire header field |
| Total Header Size | 80 bits | Corresponds to 480 pixels |

Figure 18:
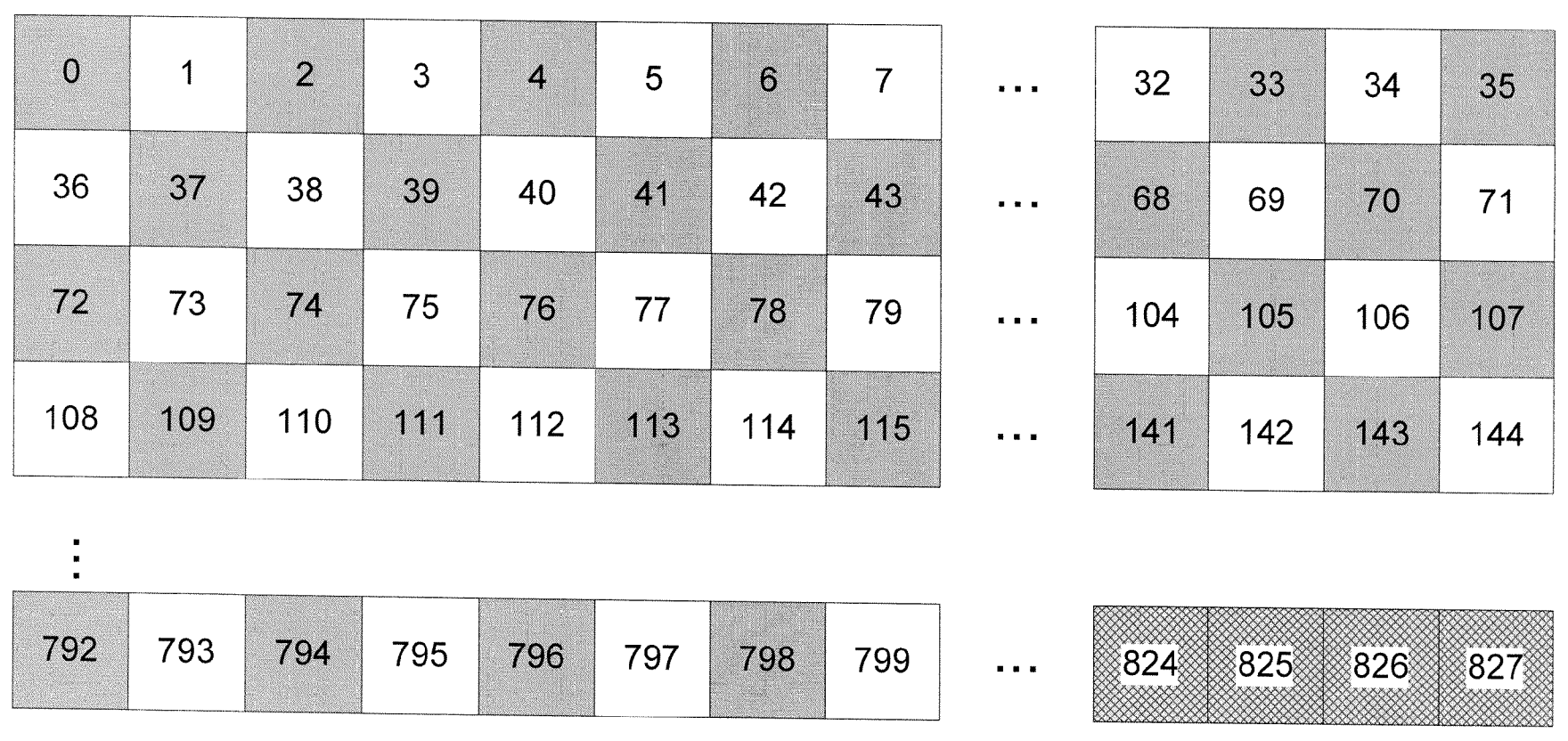
Figure 19:
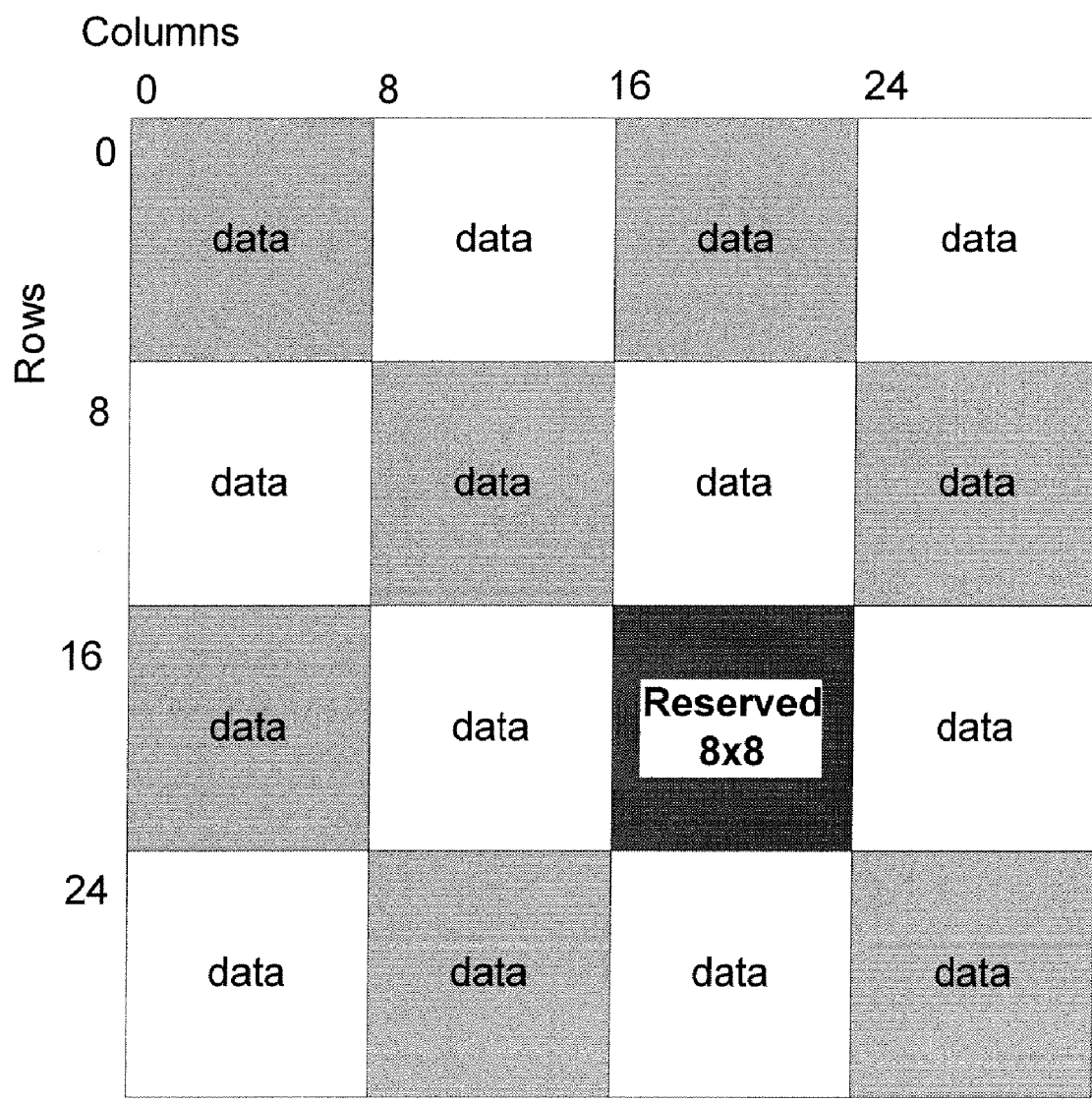
FIG. 19 is a diagram showing a tile format in accordance with one embodiment of the present invention.

The data area consists of 828, 32×32 tiles. The tiles are arranged left to right, top to bottom starting from tile 0 to 827. There are 36 tiles per row and 23 rows of tiles. The last 8 tiles are unused. The page tile layout is shown in FIG. 18. Each tile contains an 8×8 reserved block with the remainder of the tile filled with data bits. FIG. 19 shows the tile format.

Each reserved block contains a 64 bit pattern consisting of 32 1's and 32 0's. The pattern is generated from a random generator and is different for each tile on a page. The right half of the reserved block is an inverted, flipped, mirror image of the left half as shown in FIG. 20.

The random number is generated using the Park and Miller generator $I_{j+1}=16807*I_j \pmod{2^{31}-1}$, with a Bays-Durham shuffle, as described by the function ran1( ) in "Numerical Recipes in C", 2nd. ed., Press et al., pp 280-290. The shuffle table initialization is primed with 8 warm-up cycles for each new seed.

The starting seed index for each page is encoded in the lower 4 bits of either the page number field, the page format of the present example, or the seed field, the page format of Example 14 below, in the page header barcode. This index is used to access a lookup table for the seed to be used by the random number generator. The random number generator is incremented for each reserved block row and for each tile within a page and re-seeded for each page. This results in 828 unique reserved blocks on a page, with 16 unique reserved block sets that typically repeat every 16 pages within a hook. The reserved block seeds are shown in Table 15 below.

TABLE 15

Reserved Block Seeds

| Index | Seed |
|---|---|
| 0 | 12345 |
| 1 | 457123 |
| 2 | 37 |
| 3 | 789434 |
| 4 | 3457 |
| 5 | 89734 |
| 6 | 12987 |
| 7 | 67853 |
| 8 | 673 |
| 9 | 87311 |
| 10 | 23 |
| 11 | 89343 |
| 12 | 6477 |
| 13 | 873 |
| 14 | 614879 |
| 15 | 1235555 |

The data portions of the tiles contain data encoded using turbo convolutional code (Turbo Convolutional Code). The code rate is ½ and the codeword length is 32768 bits. There are 24 codewords on a data page. There are 16384 bits of user data per turbo convolutional code codeword. The last 32 bits of the codeword is a CRC to provide erasure indicators to the chapter level.

The codewords are interleaved across the page at the bit level. Bit 0 of each codeword correspond to the first 24 bits of row 0 of the first tile in the image. Bit 1 of each codeword then follows for the last 8 bits of row 0 of the first tile continuing into the first 16 bits of the next row. The reserved block areas are skipped, resulting in a total of 960 bits in each tile, 40 bits from each codeword. Each tile is identically constructed, starting at the bit position where the previous tile left off. The tiles are created from left-to-right then top-to-bottom across the page.

There are 8 tiles remaining at the end of the image without data since there are not enough data bits available to fill out an additional codeword. An example of the 8 unused tiles can be seen in the lower right corner of FIG. 16 as enclosed dashed box 1612.

In order to ensure an approximately 50% distribution of 1's and 0's on a page, the user data are randomized prior to encoding, and subsequently de-randomized following decoding.

The randomization de-randomization operations are performed by exclusive OR-ing the data with the least significant 16 bits of the randomizer described by the polynomial:

$$x^{32}+x^{22}+x^{21}+x^{20}+x^{18}+x^{17}+x^{15}+x^{13}+x^{12}+x^{10}+x^{8}+x^{6}+x^{4}+x^{1}+x^{0}.$$

The randomizer LFSR is advanced by 16 cycles between each data word on the page. At the end of each codeword, the generator is advanced by an additional 32 cycles, effectively skipping the 32 CRC bits, in order to preserve the same randomizer values for CRC and non-CRC protected user data at the codeword boundaries.

The randomizer is seeded with a starting value which varies for each page. The lower 16 bits of the randomizer seed is specified in the page header definition. The upper 16 bits are always set=0xFFFF.

Example 14

Another page format, Page Format 2, is identical to page format of Example 12 in every respect except the following: 1. The lower 4 bits of the randomizer seed used to indicate the source SLM buffer are used to select one of the 16 reserved block pattern pages. Page format 1 uses the lower 4 bits of the page number instead; and 2. The Page Format code in the top/left page header is set=2 instead of 1 to indicate this change in the usage of the randomization seed.

Example 15

Curing of a holographic storage medium of the present invention is done using a reference beam in a book location. The reference beam is swept at a given frequency through the full angle range for a specified amount of time. The sweep frequency, angle range, and cure time are defined by the system type and the media type. Curing can also be done using a separate light source (like an LED) that is apertured and imaged onto the media.

Other systems of the present invention may incorporate other curing methods including, potentially, a separate curing LED. From a format/operation perspective, this operation is similar in that a book to be cured is addressed and cured for the amount of time dictated by the media formulation type field.

Example 16

Table 16 below shows an example of a bad book map tracking structure.

TABLE 16

Bad Book Map Structure
Bad Book Map Table Definition

| Structures | Field | Size |
|---|---|---|
| Bad Map Header | Bad Map Header Identifier | 32 bits |
|  | Bad Map Header Length | 32 bits |
|  | Bad Map Table Revision | 8 bits |
|  | Number of Entries | 16 bits |
|  | Total number of bytes in the table | 32 bits |
|  | Header CRC | 16 bits |
| Pre-write Bad Map Table Entries (1 per bad book) | Type | 8 bits |
|  | Bad Physical Address | 32 bits |
| Recovered Book Table Entries (1 per bad book) | Type | 8 bits |
|  | Bad Physical Address | 32 bits |
|  | Replaced Physical Address | 32 bits |
| Bad Map Footer | Overall Table CRC | 32 bits |

The Bad Map Header Identifier identifies the beginning of a bad map structure. Set="BADM".

The Bad Map Header Length is the number of bytes in the header including the ID and the CRC.

The Bad Map Table Revision is the revision of this bad map format.

The Number of Entries is the number of bad map descriptors following the header.

The Total Number of Bytes in the Table is the total bytes including header, descriptors, and footer.

The Header CRC covers a bad map header, similar to what is done for a Library Map as described above.

When Type is 0, this indicates a pre-write bad book entry. This entry is 40 bits long and just defines the physical address of the bad book. When Type is 1, this indicates a post-write bad book entry. This entry is 72 bits long and defines the physical address of the bad book and the physical address of the reconstructed book.

The Overall Table CRC is a CRC over the entire bad map structure including the header.

Example 17

Format 0 is an example of a format generation for use with a WORM archival product. This product uses disk media with RFID in the cartridge.

This format supports multiple partitions of different data types and densities. It also supports multiple write sessions within each partition.

The initial media information including media type and parameters is written into the RFID at manufacturing time so that the media is not exposed until the initial customer usage. As a part of the format process, the media information is transferred to the media so that the RFID can be used for library map storage.

The media geometry supported is 0x82 disk. The medium formulation supported is 0x82.

The disk is mapped into 2 major zones that are variable in length. 1 zone is for user data and is written at high density. The other zone is reserved for special drive data and is written at low density.

The user data zone begins at book 0, track 0. Track 0 is the outer track. The data is written in 2D polytopic recording mode (0x85). The user data continues being written from the outer track to the inner track. It may consist of multiple write sessions and multiple partitions that may or may not be linked. The data types allowed in this zone are user data of multiple security levels and drive firmware and mode data.

The drive data zone begins at book 0, track N for an N track disk. Assuming track N has M books, books, 0, and book M/2 are reserved for the disk's final library map when it is completed. Drive data writing is started at book 1, track N. The initial library map is always found there. Multiple logical format structures may be found in each book including library maps, partition structures, card catalogs, drive emulation tables, media information structures, drive calibration structures, and interchange areas. The drive data zone is written in non-overlapped book mode. The books are written at low density. Initially, this area is split into 2 partitions—one for the primary library map information starting at track N, book 1 and one for the redundant library map information starting at track N, book M/2+1. Additional drive data partitions may be created, if desired. There are no card catalogs for these partitions since they contain drive information.

The drive data zone continues to grow around track N and proceed into track N-1 and so on until the user data and drive data zones meet. At that point, the media is filled and book 0 track N and book M/2/track N are filled with the final library map information.

The disk capacity is reduced by the number of write sessions, and write interchanges since this requires write session completion and additional drive data information to be written to the disk.

Book addressing starts at the theta disk index mark for position 0. Books are addressed from 0 to X clockwise on a track with X varying on each track due to the decreasing circumference. Book addresses are spaced by a full book size which is dictated by the system's reference beam projection for a full book. For polytopic areas, overlapped books are addressed as book N.0, N.1, ... N.OT-1 where position N.0 is the nominal book location and book N.O is the last book location prior to nominal book position N+1.0. OT (Overlap Theta) is defined by the amount of polytopic overlap in the theta direction.

Track addressing is similar to book addressing with tracks numbered 0 to N from the outer track to inner track. The nominal track spacing is the width of a book in the radial direction. For polytopic regions, the tracks are addressed as track M.0, M.1, ... M.OR-1 where M.0 is the nominal track location and M.1-M.OR are the overlapped track positions. OR (Overlap Radial) is defined by the amount of polytopic overlap in the radial direction.

For format 0x00, OT=4 and OR=2.

The formatting process is described next. For a blank disk, the RFID contains the media descriptor that is written at the factory. When inserted, the drive recognizes this descriptor and determines that it has a blank disk. When a format operation is requested by the host, the media descriptor is read out of the RFID and the initial library map is created. At this time, 2 partitions are created. These are the primary and secondary library map partitions located at track N, book 1, and the track N, book M/2+1, respectively. Next, the media is scanned for bad areas and a bad map table is created in the drive.

Figure 21:
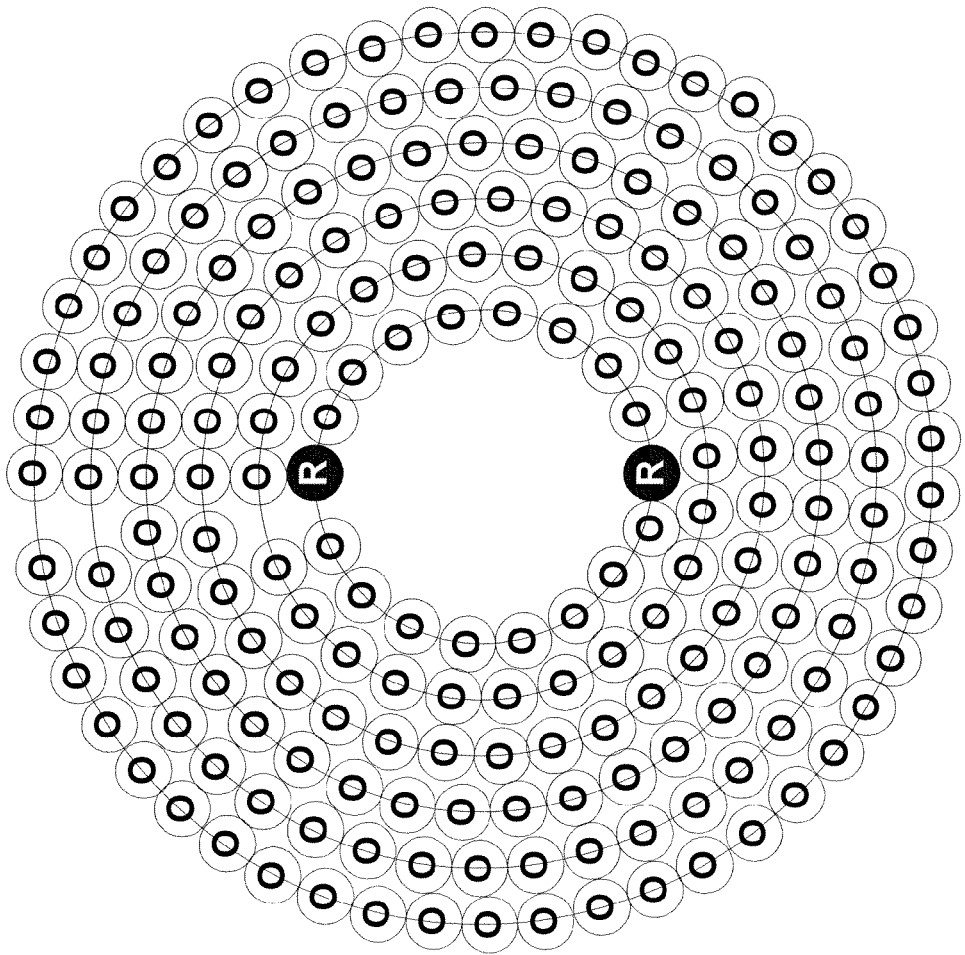
FIG. 21 is a diagram showing the beginning of a first write session for digital storage medium in accordance with one embodiment of the present invention.

At this point, the media is formatted, but has not been written to. All of the data about the media is stored locally in the drive, but the media still is in a "new" state. It remains this way until the first data is written. If the media is ejected or a power failure occurs at this point, the media reverts to a "new" unwritten state. FIG. 21 shows the disk after format.

When successfully formatted media is in the drive, write sessions may begin. The host starts the first write session by creating a partition of the desired type. This partition will begin at location track 0, book 0. When the first write command is received from the host, a write session is opened, the RFID data is replaced with the initial library map, and the user data is written to the media.

The write session may continue until the disk is full. It can include as many write commands as desired. If the host wishes to close the write session or if writes are not received for a long time (specified by a programmable timer), the write session is closed.

Figure 22:
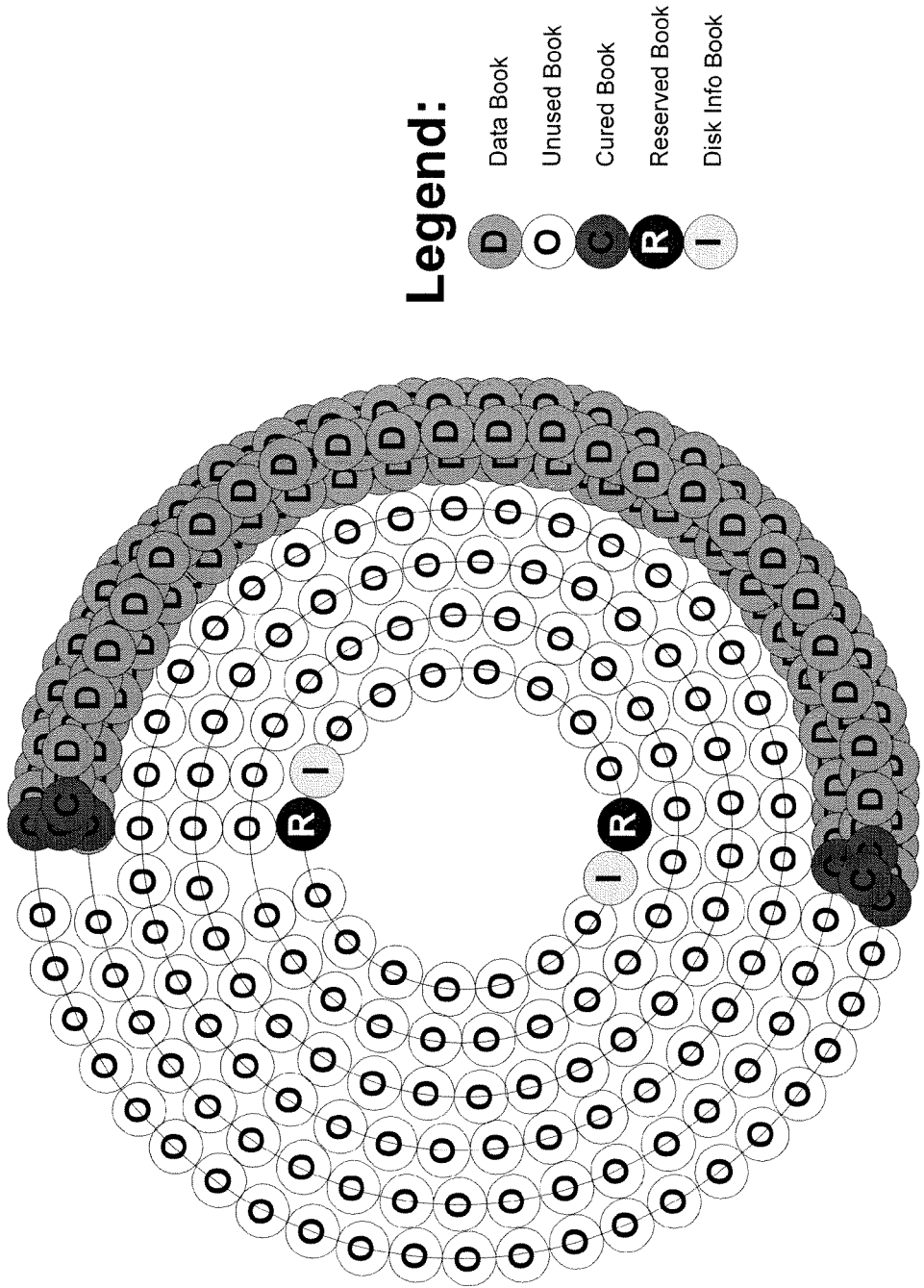
FIG. 22 is a diagram showing data written for first session of FIG. 21.

The process for closing a write session that doesn't fill the media includes the following steps. Flush any partial chapters in the buffer to the media. Append any write session related data required including a card catalog and drive emulation tables. These are written as short chapters. Fill the remainder of the currently open data book with filler pages. Fully cure the entire area used for the write session. This requires cure operations at the start and end of the physical boundaries of the write session. Mark the session closed and update the library map to show that the session is closed. Write all of the drive data to the first library map partition. This includes the library map, all partition descriptors, the card catalogs, the media information, drive information, and the bad book map. Repeat this write in the second library map partition. For each of these writes, fill the remainder of the book being written and cure it. Write as much of the library map as possible to the RFID. FIG. 22 shows a disk with a single write session completed.

Figure 23:
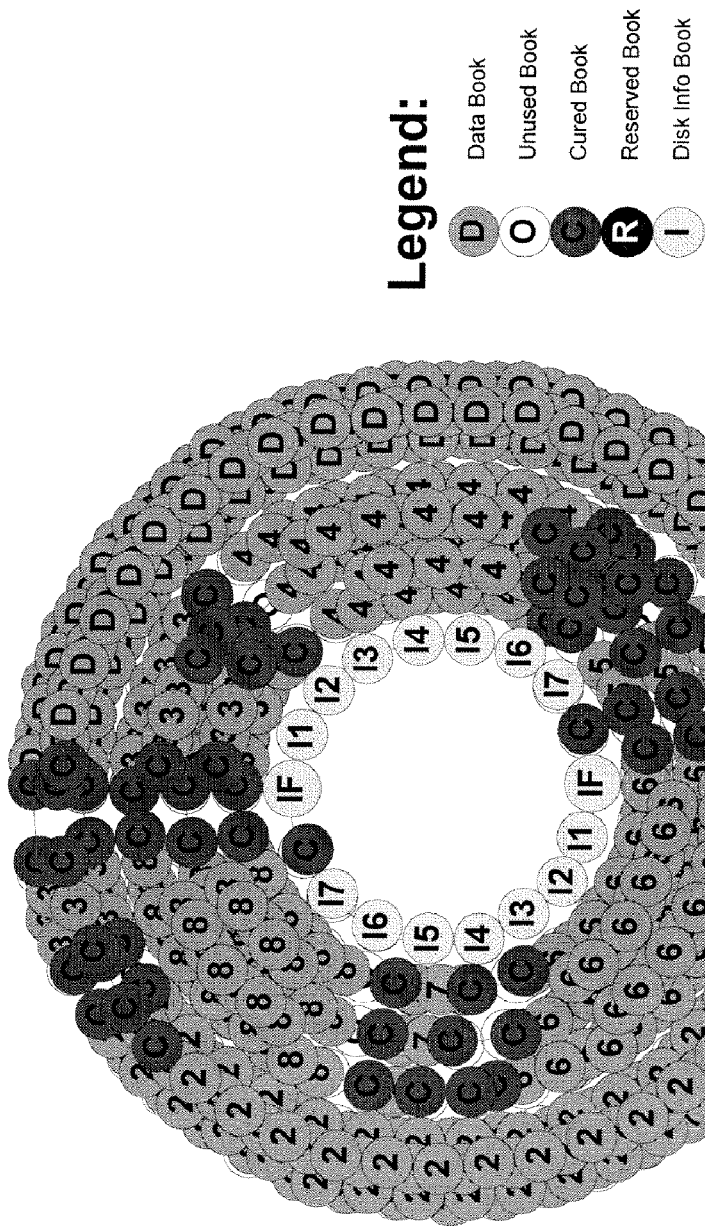
FIG. 23 is a diagram showing the medium of FIGS. 21 and 22 as a completed, multi-session disk.

Additional write sessions can be appended to the media. Between write sessions, the host has the option of closing the current data partition and creating a new one. These partitions may contain different types of data and may be linked to other partitions. New write sessions always start at the first open book location following the previously closed write session. When starting a new write session, the library map is updated to show that the active partition is out of sync and written to the RFID. The closure process for each write session is the same as for the first write session. The only difference is that if the library map information becomes larger than a book, the bad map is no longer written to attempt to keep the amount of wasted media down. If enough write sessions are completed to fill track N with library map data, and track N-1 has not yet been written to, both of the library map partitions are closed and new ones are opened on track N-1. This tile they are opened at book locations 0 and M/2. FIG. 23 shows an example of a full disk comprising multiple sessions.

The media is filled when the inner track is filled with library map books and the user data extends to inner track-1. It is also filled if the user data extends to the inner track and leaves only room for the final library map. The disk may also be completed by user request.

When completing the media, the drive ensures that all sessions and partitions are flushed and completed, the library map is updated, the final library map and drive data is written to the disk in the reserved book areas, and the entire media is fully cured.

The following example details the application of the different levels of the format hierarchy to a format generation of the present invention, format generation 0.

The Library Map version 8.0 is used.

The library map includes the following fields having the indicated values: Library Map Length in Bytes is 72-324 and depends on the length of the Volume ID. The Library Map Revision is 0x80. It is assumed that any pre-cure/post-cure requirements on data books is taken care of in the process of writing the books. Address Pointer to Media Based Library Map is the physical address of the current library map on the medium. The Pointer to Redundant Copy of Media Based Library Map is the physical address of the second copy of the current library map on the medium. The Pointer to Previous Media Based Library Map is the physical address of the previous library map written to the medium—if any. It is assumed that any pre-cure/post-cure requirements on data books is taken care of in the process of writing the books. The Format Generation is 0x82. The Media Geometry Code is 0x82.

Media Formulation Code=0x82 (May support others)
System Type=0x84

The Media Status is 0x0, 0x1, or 0x4 indicating the formatted and secure bit fields not supported. The Unsynchronized Partition is supported. The Time of First Media Write is the Recording time of first session. The Volume ID is a unique serial number for the data storage medium.

Along with the 3 partitions created during format, the host may choose to add partitions while writing. The host uses a special command to create a new write partition. This can only be done when the last bookcase of the previous partition is completed. The new partition is created and starts immediately after the previous partition. The previous partition is marked as full and complete and can no longer be written to. Optionally, the host may link the new partition to a previous partition. By doing this, the partitions appear to be contiguous to the host can make it look like there are 2 or more active partitions being appended to at once.

Format 0 uses Partition Descriptor type 0x80. The Partition Descriptor Length in Bytes=64. The Partition Start Address=Starting Track Book address for partition. This is the lowest numbered book address in the partition. The Partition End Address is the address of the highest numbered written book location within the partition. This is a cured book. The Partition Data Type Code is 0x80 indicating the data type is User Data, type 0x90 indicating drive data, or 0xF0 i.e. Cured Filler Books. The Partition Recording Mode is 0x82, 0x83, 0x84, or 0x85. The partition may be linked to a previous partition or a subsequent partition. The secure feature is not supported and is 0. The valid bit is 0 for a partition currently being written and 1 before it is written and after the partition is completed, assuming there were no errors during the write session. If there was an error during the write session that would have caused the partition or card catalog to be corrupted, this bit is set to 0. In this case, the data in this partition is not readable in future sessions and cannot be recovered. The valid status field values are: Empty (=0), appendable (=2), and Full (4).

Time of first partition write is the time when writing of the first book of data was written to the media. The Time of last Partition Update is the time when the final book is cured to complete the partition/ write session.

The Partition Card Catalog Location is 1. The Card Catalog succeeds the PD in the Library Map structure. The card catalog is also appended to the write session for recovery purposes. If it is needed, the drive will have to search through the chapters in the partition to find it. The Pointer to Card Catalog is the number of bytes from start of this PD to the next byte after it—64.

The Starting LBA for this partition is the next logical block address after the last one recorded in the previous partition. The Starting Chapter Number for Partition is the next chapter number after the last one recorded in the previous partition. The Offset to the next partition descriptor is the number of bytes from the start of this PD to the end of the card catalog that immediately follows this PD.

The Card Catalog is written after each bookcase is completed. The Single Session Card Catalog format (SSCC=version 0x80) is used. It is appended to the PD in the Library Map of the drive data partitions as well as to the end of the data in the partition. There is no card catalog created if a final partition is created to fill the disk with cured filler books.

With respect to the Card Catalog: The card catalog Header Length in Bytes is 24. The Partition Number is the current partition being described. The card catalog Starting Book Address is the address of the first book of the partition. The Total number of anthology binding entries depends on mode settings. If the anthology is enabled, then this is dependent on the number of chapters in an anthology and the total number of chapters in the partition data. The Total Number of TOC Entries is number of books in the partition including the cured fencing books.

The anthology binding fields self-explanatory based on the mode parameter settings used during the write session. The final anthology may be shortened if there are not enough data chapters to complete an anthology, but tire number of redundant chapters will be the same for all anthologies.

The TOC fields are: Status Byte, where Allowed Book Density is 0 and Allowed Book Status is 0, 2, and 4. The Number of Pages in the book is 0 to the maximum number of paged based on media type. The Page Address of First Chapter Start is 0 to the maximum page address based on media type or 0xFFFF. The Chapter Number of First Chapter Start is 0 to the maximum chapter number based on media type or 0xFFFF. The First Logical Block Address in a Book is the logical block address or 0xFFFFFFFF.

The anthology structure may be used optionally based on mode parameters. The length and redundancy of the anthology is programmable.

The book in the format is defined by the media type, media formulation code, and system code. There are associated write schedule and page location tables based on the configuration.

The chapter length and redundancy is variable based on mode parameters. It is legal to write chapters with 0 redundancy. Chapter type 0x80 including chapter directories is used.

The chapter directory field usage is as described above with the following modifications: the Digital Right Management field is unused. Only fixed logical block sizes are supported. However, the logical block sizes may change within and across chapters. Compression is not supported.

The page format used is Page Format 2 of Example 14.

A fixed logical block size of n*512 is supported. The default is 4 k bytes. This can be changed via mode parameter settings. Any file system supporting removable, write once media may be used. The file system is embedded within the logical block data.

The load process is as follows: The user (or library) inserts the cartridge into the drive. The drive detects the cartridge presence and loads it onto the spindle, opens the shutter, and into the OMA. The RFID contents are read to determine the media state. If it is blank, it returns that status and waits for a format command. If it is not blank, it reads the library map structure from the RFID to determine the media type and state. It moves the media to the home position. Next, it performs calibration sequences in the areas where the drive information records are located to optimize the drive's ability to read and write the media. It then reads any additional drive information from the drive data records that is available.

The unload process is as follows: If there is an open write session, it rejects the unload If there is no open write session, it ensures that the latest library map and drive information have been written to the media and the RFID as described in the media management section command. It requires a write session flush command prior to unload. Next, it unloads the cartridge, closes the shutter, and ejects it.

Bad Mapping is supported via a scanning algorithm that maps out bad areas of the media on a full book basis.

If media is loaded with an unsynchronized partition, the drive will scan the end of that partition to look for a card catalog. If found, it will update the library map and allow further operations. If it is not found, it will attempt to recreate the card catalog based on the data found in the partition. If it comes to an area that appears unrecorded, it will attempt to reconstruct the card catalog and close off the partial session including additional curing and buffering. If the recovery is unsuccessful, it will mark the media as full and allow read access to all previous write sessions.

After a book is written, a quick check of the book quality is performed. If it is bad, the book is rewritten at the next location and that book i9s marked bad in the bad map and the card catalog. Also, if a shock or other write error is detected during a page write, the page write is repeated at the next available address until it is successful. Rewritten pages may not be at contiguous addresses.

Read ahead caching is supported as a mode parameter. This can be enabled and controlled via the host. The default is "on" with a read ahead of 5 chapters.

Example 19

Format 40 is used for ROM media. In this example, the media is in a card format. This format supports all of the features supported in format 0x0 except that the ROM media is replicated in the factory. Therefore, there is only a need to reserve 2 book addresses for the drive data records. Also, there is no RFID required for ROM media.

The media has 2 reserved book addresses for drive information at the lower left and upper right corners. These books are written in recording mode 0x83 (sparse, strong).

The remainder of the media is written in recording mode 0x84 (2D polytopic). If the data doesn't fill the disk, filler books may be written to use up all the media. However, the filler books are not necessary since the media is flood cured at the end of the replication operation.

Addressing of the media is in rows and columns using x,y coordinates denoting full book locations. See FIG. 24 for an example of a fully filled ROM in card format. There are redundant disk information books used for locating data on the media.

Format 40 uses library map format 0x80. It is used the same as for format generation 0.0 except: that the Pointer to Previous Media Based Library Map=0xFFFFFFFF, the Media Geometry Code=0x40, the Media Formulation Code=0x81, the System Type=0x40, and the Media Status=0x8F (the secure field may be supported. Always full and formatted). The unsynchronized partition field is not used since ROM never has an unsynchronized partition.

Format 40 uses partition descriptor 0x80. It is used the same as for format generation 0.0 except: For partition status, the linked bit is valid, the Secure bit is not used and the rest of this field is always set=0x0F=full.

The card catalog is used the same as for format 40.

The anthology structure may be used optionally based on mode parameters. The length and redundancy of the anthology is programmable.

Drive emulation is optionally supported in this format. If the drive emulation type requires a drive emulation table, it is stored at the end of the last CC in the library map. There is only 1 copy of the drive emulation table per library map.

The load process is as follows: The user inserts cartridge in the drive, the drive detects the cartridge presence, the drive homes the media. Next, the drive performs calibration sequences in the areas where the drive information records are located to optimize the drive's ability to read and write the media. It then reads all of the drive information from the drive data records that is available. It is now ready to read.

For the unload process, the cartridge may be ejected or removed at any time. The drive will detect a cartridge removal and appropriately error out any commands that are in process.

For ROM media, multiple sessions and partitions are supported logically. However, since ROM media is replicated, multiple write sessions are not physically performed.

Example 20

Format 60 supports a rewritable product example. This product uses disk media that has an RFID memory tag in the cartridge. This format is implemented very similarly to format 0.0 until the disk is filled or finished. When the disk is to be reused, the entire disk is logically erased and the library map is cleared. The library map keeps a count of the number of erase cycles that the media has been through and also keeps track of the maximum number of cycles allowed. When the limit is reached, the media is finished for the final time and no more erase cycles are allowed.

Erasure may be done in bulk during an erase command or it may be done incrementally as new media is required for new write sessions in a subsequent usage of the media.

As for 0.0, this format supports multiple partitions of different data types and densities. The initial media information including media type and parameters is written into the RFID at manufacturing time so that the media is not exposed until the initial customer usage. As a part of the format process, the media information is transferred to the media so that the RFID can be used for library map storage.

Media management including recording order and library map recording is done the same way as for format 0.0. Additionally, the load/unload, write processes, write sessions, and partitions are all handled the same as for format 0.0.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for storing data comprising the steps of:
   (a) providing data stored as data books on a holographic storage medium; and
   (b) recovering one or more of the data books when one or more of the data books is corrupted or missing, wherein each data book comprises a plurality of data pages organized into one or more chapters, wherein the one or more chapters comprise a plurality of chapters arranged in an anthology, and wherein each data page of the plurality of data pages includes:
      a page header providing a physical address for the data page and a position of the data page within a chapter of the one or more chapters; and
      page user data comprising the holographic data; and
      page level error correction codes for allowing the data page to be recovered or reconstructed when the data page includes errors, and wherein the anthology includes:
      a plurality of redundant chapters for allowing one or more of the plurality of chapters to be recovered or reconstructed when the anthology includes errors, and wherein step (b) comprises recovering one or more of the plurality of chapters using one or more of the redundant chapters.

2. The method of claim 1, wherein step (b) comprises recovering one or more of the data books using an error correction code based on a forward error correction code technique.

3. The method of claim 2, wherein the forward error correction code is based on a Reed-Solomon code, a Low Density Parity Check code, or a Turbo Convolutional code.

4. The method of claim 1, wherein the one or more data books comprise one or more of the one or more chapters, and wherein step (b) comprises using redundant chapters of an anthology to recover one or more unrecoverable chapters of the anthology.

5. The method of claim 1, wherein the error correction codes comprise modulation codes.

6. The method of claim 1, wherein the error correction codes comprise write and read equalization codes.

7. The method of claim 1, wherein the error correction codes comprise feedback compensation.

8. The method of claim 1, wherein the error correction codes comprise predictive alignment compensation.

9. The method of claim 1, wherein the error correction codes comprise exposure compensation.

10. The method of claim 1, wherein one or more of the one or more chapters each span more than one book of pages.

11. The method of claim 1, wherein one or more of the chapters each span more than one book of pages.

* * * * *